(12) United States Patent
Lange

(10) Patent No.: US 7,643,025 B2
(45) Date of Patent: Jan. 5, 2010

(54) METHOD AND APPARATUS FOR APPLYING STEREOSCOPIC IMAGERY TO THREE-DIMENSIONALLY DEFINED SUBSTRATES

(76) Inventor: Eric Belk Lange, P.O. Box 3136, Corrales, NM (US) 87048

( * ) Notice: Subject to any disclaimer, the term of this patent is extended or adjusted under 35 U.S.C. 154(b) by 66 days.

(21) Appl. No.: 10/956,963

(22) Filed: Sep. 30, 2004

(65) Prior Publication Data
US 2005/0117215 A1 Jun. 2, 2005

Related U.S. Application Data

(60) Provisional application No. 60/507,727, filed on Sep. 30, 2003.

(30) Foreign Application Priority Data
Sep. 30, 2003 (GB) .................... 0322840.0

(51) Int. Cl.
G06T 15/00 (2006.01)
(52) U.S. Cl. .............. 345/419; 348/42; 382/154
(58) Field of Classification Search .............. None
See application file for complete search history.

(56) References Cited

U.S. PATENT DOCUMENTS

| 5,940,167 | A | | 8/1999 | Gans | |
|---|---|---|---|---|---|
| 5,959,663 | A | * | 9/1999 | Oba et al. | 348/46 |
| 6,108,005 | A | * | 8/2000 | Starks et al. | 345/419 |
| 6,118,584 | A | | 9/2000 | Van Berkel et al. | |
| 6,215,516 | B1 | * | 4/2001 | Ma et al. | 348/43 |
| 6,441,815 | B1 | | 8/2002 | McDowall et al. | |
| 6,545,650 | B1 | * | 4/2003 | Yamada et al. | 345/7 |
| 6,987,861 | B2 | * | 1/2006 | Rhoads | 382/100 |
| 2002/0191841 | A1 | * | 12/2002 | Harman | 382/154 |

FOREIGN PATENT DOCUMENTS

| EP | 1085769 | 3/2001 |
|---|---|---|
| WO | WO/03/046472 | 6/2003 |

OTHER PUBLICATIONS

Europe PCT/GB2004/004155, Search Report.
Fangi, G., et al., (2002) "Fast and Accurate Close Range 3D Modelling by Laser Scanning System". In Albertz, J. (Editor) *Surveying and Documentation of Historic Buildings-Monuments-Sites: Traditional and Modern Methods, Proceedings of the XVIIIth International Symposium of CIPA*, Potsdam (Germany), Sep. 18-21, 2001. The ICOMOS/ISPRS Committee for Documentation of Cultural Heritage, Berlin.

(Continued)

Primary Examiner—Ulka Chauhan
Assistant Examiner—Daniel F Hajnik
(74) Attorney, Agent, or Firm—V. Gerald Grafe

(57) ABSTRACT

The invention represents a new form of stereoscopically-rendered three-dimensional model and various methods for constructing, manipulating, and displaying these models. The model consists of one or more stereograms applied to a substrate, where the shape of the substrate has been derived from the imagery or from the object itself, and the stereograms are applied to the substrate in a specific way that eliminates parallax for some points and reduces it in others. The methods offered can be (conservatively) 400 times more efficient at representing complex surfaces than conventional modelling techniques, and also provide for independent control of micro and macro parallaxes in a stereoscopically-viewed scene, whether presented in a VR environment or in stereo film or television.

35 Claims, 15 Drawing Sheets

OTHER PUBLICATIONS

Gruen, A. (1996) "Development of Digital Methodology and Systems." In Atkinson, K.G. (Editor) *Close Range Photogrammetry and Machine Vision,* pp. 78-104. Whittles Publishing, Caithness, Scotland.

Kern, F. (2002) "Supplementing Laserscanner Geometric Data with Photogrammetric Images for Modeling." In Albertz, J. (Editor), *Surveying and Documentation of Historic Building-Monuments-Sites: Traditional and Modern Methods, Proceedings of the XVIIIth International Symposium of CIPA,* Potsdam (Germany) Sep. 18-21, 2001. The ICOMOS/ISPRS Committee for Documentation of Cultural Heritage, Berlin.

Lingua, A., et al. (2002) "The Statue of Ramsete II: Integration of Digital Photogrammetry and Laser Scanning Techniques for 3D Modelling." In Albertz, J., (Editor) *Surveying and Documentation of Historic buildings-Monuments-Sites: Traditional and Modern Methods, Proceedings of the XVIIIth International Symposium of CIPA,* Potsdam (Germany), Sep. 18-21, 2001. The ICOMOS/ISPRS Committee for Documentation of Cultural Heritage, Berlin.

Lipton, L. (1991) *The CrystalEyes Handbook,* StereoGraphics Corporation, San Rafael, California.

MulkensrE. et al., (2001 "Effects of display Geometry and Pixel Structure on Stereo Display Usability." In Proceedings of SPIE, vol. 4297, *Stereoscopic Displays and Virtual Reality Systems, VII.*

Schenk, A., (1996) "Automatic Generation of DEMs," In Grove, C. (Editor) *Digital Photogrammetry: An Addendum to the Manual of Photogrammetry,* pp. 145-150. American Society for Photogrammetry and Remote Sensing, Bethesda, Maryland.

Schouteden, J., et al., (2002) "Image-Based 3D Acquisition Tool for Architectural Conservation." In Albertz, J. (Editor) *Surveying and Documentation of Historic Buildings-Monuments-Sites: Traditional and Modern Methods, Proceedings of the XVIIIth International Symposium of CIPA,* Potsdam (Germany), Sep. 18-21, 2001. The ICOMOS/ISPRS Committee for Documentation of Cultural Heritage, Berlin.

Vince, J. (1995) *Virtual Reality Systems.* Addison-Wesley Publishing Company, Wokingham, England.

\* cited by examiner

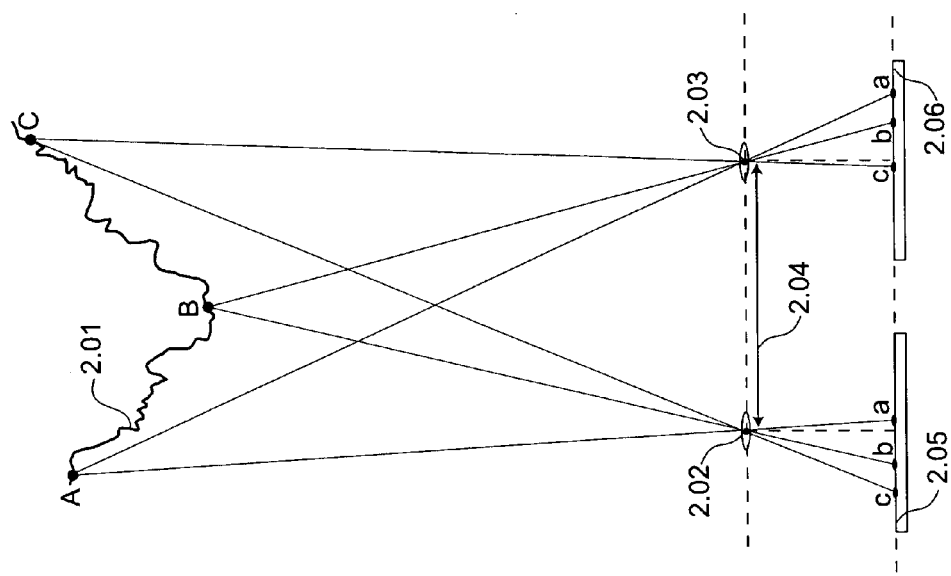
FIG. 1
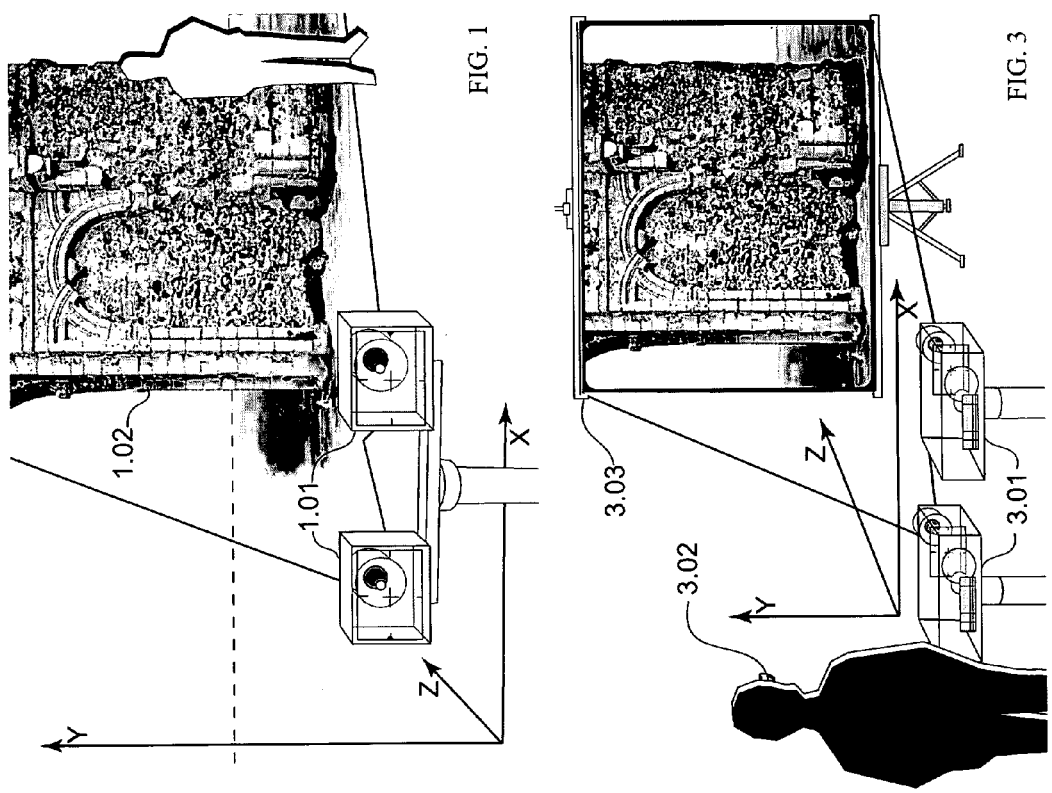
FIG. 2
FIG. 3

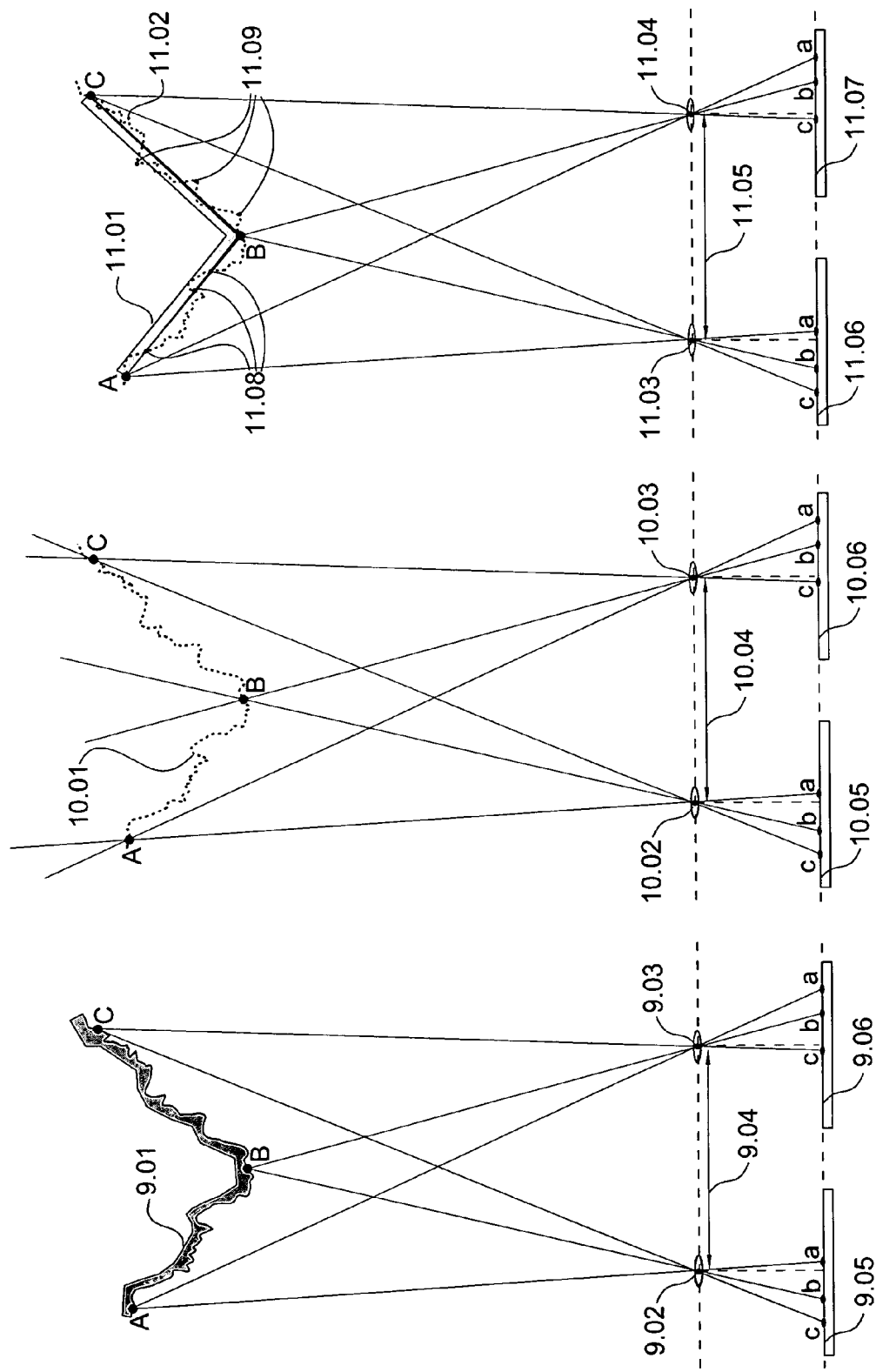

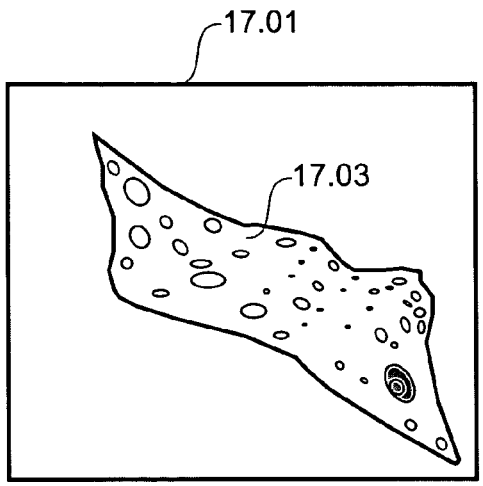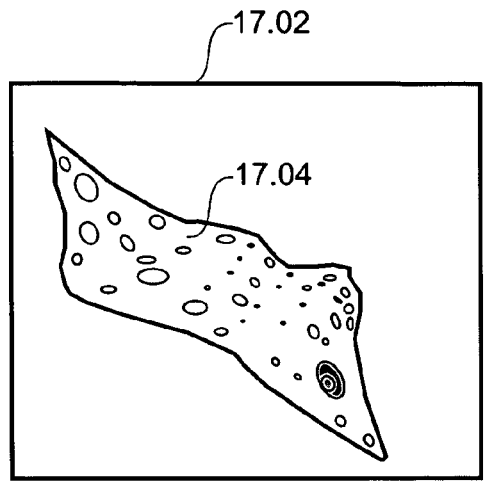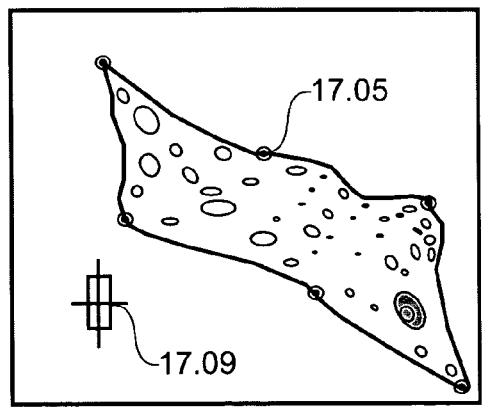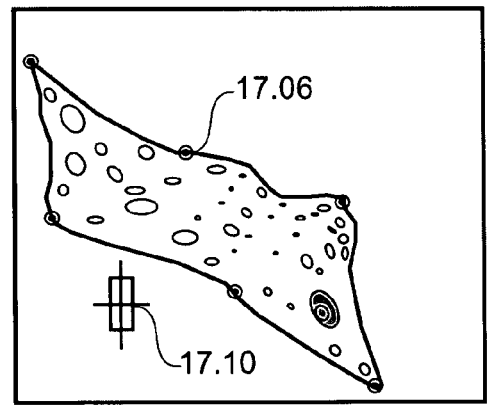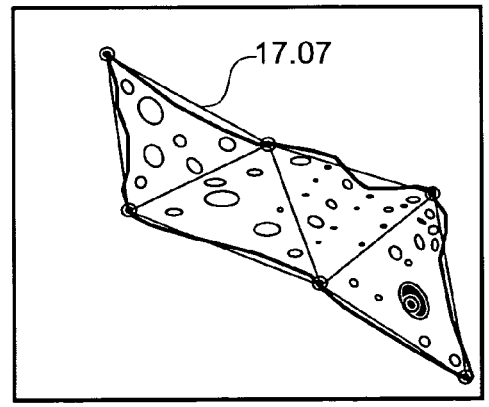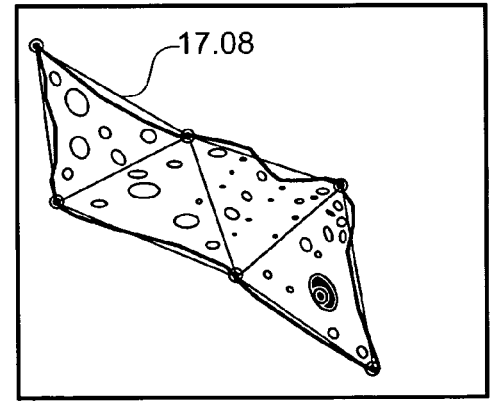
FIG. 17

METHOD AND APPARATUS FOR APPLYING STEREOSCOPIC IMAGERY TO THREE-DIMENSIONALLY DEFINED SUBSTRATES

BACKGROUND OF THE INVENTION

Field of the Invention

The invention pertains mainly to the fields of photogrammetry, stereoscopic imaging, three-dimensional interactive computer graphics, and virtual reality (VR) systems.

Substantial prior art exists with regard to the general fields of photogrammetry, stereoscopic imaging, 3D computer graphics technology, and virtual reality systems. The author does not intend to provide a complete review of the extensive prior art related to these areas, but rather seeks to provide a background sufficient to allow an understanding and appreciation of the proposed invention's various components, methods, and functions, as well as the advantages it provides with respect to conventional techniques.

Since humans normally experience and understand the world in three dimensions, there has always been the need to communicate in a visual and three-dimensional way. For most of the past four thousand years, the principal method of spatial and visual three-dimensional communication has been the use of physically built three-dimensional models. The idea of manipulating two-dimensional data to create an illusion of three dimensionality, by presenting slightly different left and right images to the left and right eyes of the viewer, seems to date back at least to the 16th century, when hand-drawn stereograms appeared.

In the 19th century, photographic stereograms of exotic locations and other topics of interest were widely produced and sold, along with various hand-held devices for viewing them. A century later, the concept of the stereogram was extended to "moving pictures," and millions of movie-goers watched monsters or aliens "jump" out of the screen as they sat in theaters wearing specially colored cardboard glasses that restricted the left view to the left eye and the right view to the right eye.

Although much has changed in the last 400 years, certain fundamental limitations of stereograms remain. The first is the need for a specialized viewing apparatus, although much research and development has occurred in this area. Improved forms of stereo eyewear, such as CrystalEyes™ liquid crystal shutter glasses, are widely available, and the recently developed autostereoscopic displays (e.g. U.S. Pat. No. 6,118,584), though still very expensive, completely eliminate the need for special glasses. The most significant limitations, however, arise from the ways in which artificial stereo viewing differs from natural stereo viewing. Prolonged viewing of stereo imagery, whether static images or film/video, can cause eye strain and headaches, as the brain is forced to resolve degrees of parallax which exceed its normal thresholds (Lipton 1991).

In Victorian times, stereograms were usually taken with a fairly small base separation between the cameras—about 2.5", replicating the distance between human eyes. However, current practitioners often increase the range of parallax within the image in order to increase the three-dimensional effect, even though this can cause serious eye strain and discomfort to the viewer after a fairly short period of time. In order to present stereo imagery safely, so that it can be viewed for many hours, the apparent range of depth needs to be very mild, resulting in an artificially flattened appearance—thereby largely negating the purpose of having a 3D stereoscopic display. Now that the technology for a glasses-free delivery system has been developed, it is perhaps this issue of viewer comfort which, more than any other, hampers the commercial viability of stereo film and television (Mulkins 2002).

In the 20th century, interest in three-dimensional communication has once again turned to the three-dimensional model—built not in physical space but in "virtual" space. A "virtual reality" system may be defined as a computer graphics hardware and software system capable of producing real-time rendered perspective left and right views (displayed using an appropriate stereo viewing apparatus) to enable the stereoscopic perception of depth from a modelled scene or environment.

In a standard 3D computer graphics system, a model consists of: a set of vertices with xyz coordinates; sets of instructions for organizing the vertices into polygons, and the polygons into larger geometries; and sets of instructions for shading and rendering the geometries (e.g., lighting, shading, fog, reflection, texture and bump mapping, etc.). The basic task carried out by 3D graphics hardware and software is to draw geometrically modeled, projected, and shaded polygons to a view screen or display.

In order to determine the view that should be presented to the user, a "virtual camera" is invoked, with a mathematically defined perspective center and view plane. The camera is oriented with respect to the model, and various rays are mathematically projected from the surface of the object through the perspective center of the virtual camera and onto the 2D view plane. The basic process for converting these mathematically calculated projections and transformations into pixels on a screen is called rendering. Hardware and software systems do this by determining what color each screen pixel should be, based on the final summation of all of the various instructions for that point, such as lighting, shading, texturing, etc.

Some systems can render fast enough (about 30 frames per second) that a user with a joystick or other input device can change the viewpoint of the virtual camera, giving the effect of the viewer moving within the space. Interactive computer gaming is a good example of this type of system. A true VR system uses two virtual cameras, side by side, to present separate left and right perspective views to the user, via an appropriate stereo viewing device (Vince 1995).

However, graphics hardware is limited (by processing speed and bandwidth) to rendering a finite maximum number of polygons per second. No matter what the current capability of graphics processing hardware and software, there is always the need to be able to process more and more shaded polygons per second. The ultimate goal for many applications is to present interactive scenes modeled to a density and fidelity equivalent to our natural visual experience. However, for real-time systems there is huge gap between the number of shaded polygons required to effect a life-like representation of complex scenes and objects, and the number of polygons that can practically be rendered in a given time.

Quite often the main task for preparing various 3D data sets for VR visualizations is to devise ways of reducing the number of polygons used to describe a surface, so that a particular frame rate of rendering can be maintained. Even when techniques such as texture mapping are used, which apply various images to the surfaces of the geometrical substrate, VR models still tend to appear artificial or overly simplified. Many techniques and methods have been incorporated into the basic graphics rendering pipeline to make the rendering of various geometries and polygons as efficient as possible. However, the generally considered solution to the limitations of graphics hardware in representing complex objects is to just wait for faster, cheaper and more capable hardware to be developed which can process larger numbers of polygons in less time.

Attempts to incorporate 2D photographic stereograms into 3D VR environments have to date met with limited success, due to inherent issues of incompatibility. Conventional 3D VR environments comprise explicitly modeled geometries, with known spatial data, whereas stereograms present apparent 3D features that are perceptually deduced by the viewer. This general incompatibility is highlighted by McDowell et al, U.S. 2002/0030679 A1, where a stereogram is inserted into a VR scene, but is only visible through a window or portal which provides an explicit boundary between the two forms of representation.

One of the most advanced and active application areas for digital three-dimensional recording and modelling systems has been in recording historic buildings and archaeological sites. For such applications, large sites need to be three-dimensionally recorded to spatial resolutions of the order of 1 mm across the entire surface of a site. The goal of many recording projects has been to provide off-line or real-time visualizations of the various surfaces of historic sites that are spatially accurate and are able to display very fine and complex features pertaining to the state of preservation of the site. Although there is a strong need in many fields for such capabilities, attempts at recording complex surfaces over a proportionately large area at sufficiently high resolutions have in general proved to be impractical, expensive, and time-consuming, and often do not fulfill the expected requirements.

Although there are many techniques for recording large complex surfaces, there are two primary methods used to effect a high density of digital 3D recording on a large scale. One involves the use of various "machine vision"—based photogrammetric techniques (Gruen 1998) to automatically extract three-dimensional information from overlapping photos (often, but not always, stereograms). The second method involves the use of various laser scanning systems to generate a high density of three-dimensionally sampled points. Both methods tend to impart a high degree of signal noise that is difficult to separate from the intended surface (Fangi 2002; WO 03/046472AZ). Various smoothing algorithms can be used on these data sets, but they tend to remove most of the small or fine three dimensional features that we are interested in representing. There is also a relatively high incidence of grossly incorrect three-dimensional values for various point positions (Lingua 2002; Schouteden 2002).

Consequently much of the dense data sets that are generated by these two key processes require extensive manual editing to create natural-looking representations (Kern 2002). Many further processes are needed to turn these data sets into acceptable polygonal surfaces and VR models, all requiring extensive manual intervention. These so-called "automated" techniques therefore create a great deal of manual work and are very time consuming and expensive to implement. Each 100% increase in desired resolution results in a 400% increase in the amount of data generated, and the number of man-hours required to implement it. There are also fully manual techniques for the extraction of three-dimensional points from photogrammetric stereograms that can achieve a very high precision and accuracy, but these processes are slow and are not able to achieve the density of recording required. The 1 mm resolution required for the three-dimensional recording of a large architectural or archaeological site therefore presents an amount of data that is impractical to process using conventional or current technology.

It is a basic assumption and expectation of many practitioners of conventional 3D recording systems is that it will one day be possible to automatically record very high densities of three-dimensional data over large areas, through progressively improved accuracy and resolution of various laser scanning devices, or through the improvement of various machine vision algorithuns, coupled with on-going improvements in computer processing power. However, much research has gone into various automated 3D point extraction algorithms (from photographs) over the past 25 years, with only marginal improvements (Schenk 1996). Laser scanning techniques, especially scanners designed to work on an architectural scale, are generally limited by basic physical and mechanical phenomena that are very difficult to overcome or improve upon.

In summary, great technical advances have occurred in recent years with regard to various methods of capturing, processing, and presenting three-dimensional information. However, there are fundamental problems in each approach which have yet to be overcome. These include: limitations in the ability of current hardware and software to process the number of polygons necessary to produce realistic three-dimensional models; viewer discomfort caused by unnatural levels of parallax in stereoscopically viewed media; and the inaccuracy and inefficiency of many automated 3D data extraction systems.

The current invention offers a solution to each of these problems by supplying methods for processing and presenting stereoscopic three-dimensional models which are vastly more efficient than conventional techniques and which also allow parallax in stereo imagery to be optimized within safe ranges, thus enabling extended viewing, with very little reduction in the perception of three-dimensional detail.

REFERENCES CITED

Fangi, G., Fiori, F., Gagliardini, G., Malinverni, E. (2002) "Fast and Accurate Close Range 3D Modelling by Laser Scanning System." In Albertz, J. (Editor), *Surveying and Documentation of Historic Buildings-Monuments-Sites: Traditional and Modern Methods, Proceedings of the XVIIIth International Symposium of CIPA, Potsdam (Germany), Sep.* 18-21, 2001. The ICOMOS/ISPRS Committee for Documentation of Cultural Heritage, Berlin.

Gruen A. (1996) "Development of Digital Methodology and Systems." In Atkinson, K. B. (Editor), *Close Range Photogrammetry and Machine Vision*, pp. 78 to 104. Whittles Publishing, Caithness, Scotland.

Kern, F. (2002) "Supplementing Laserscanner Geometric Data with Photogrammetric Images for Modeling." In Albertz, J., (Editor), *Surveying and Documentation of Historic Buildings-Monuments-Sites: Traditional and Modern Methods. Proceedings of the XVIIIth International Symposium of CIPA, Potsdam (Germany). Sep.* 18-21, 2001. The ICOMOS/ISPRS Committee for Documentation of Cultural Heritage, Berlin.

Lingua, A., Rinaudo, F. (2002) "The Statue of Ramsete II: Integration of Digital Photogrammetry and Laser Scanning Techniques for 3D Modelling." In Albertz, J., (Editor), *Surveying and Documentation of Historic Buildings-Monuments-Sites: Traditional and Modern Methods, Proceedings of the XVIIIth International Symposium of CIPA, Potsdam (Germany). Sep.* 18-21, 2001. The ICOMOS/ISPRS Committee for Documentation of Cultural Heritage, Berlin. Lipton, L. (1991) *The CrystalEyes Handbook*. StereoGraphics Corporation, San Rafael, Calif. Mulkens, E., Roberts, J. (2001) "Effects of Display Geometry and Pixel Structure on Stereo Display Usability." In *Proceedings of SPIE, Vol. 4297, Stereoscopic Displays and Virtual Reality Systems VII.*

Schenk, A., (1996) "Automatic Generation of DEMs," In Greve, C. (Editor), *Digital Photogrammetry: An Addendum to the Manual of Photogrammetry*, pp. 145-150. American Society for Photogrammetry and Remote Sensing, Bethesda, Md.

Schouteden, J., Pollefeys, M., Vergauwen, M., van Luc, C. (2002) "Image-Based 3D Acquisition Tool for Architectural Conservation." In Albertz, J. (Editor), *Surveying and Documentation of Historic Buildings-Monuments-Sites: Traditional and Modern Methods. Proceedings of the XVIIIth International Symposium of CIPA, Potsdam (Germany). Sep.* 18-21, 2001. The ICOMOS/ISPRS Committee for Documentation of Cultural Heritage, Berlin.

Vince, J. (1995) *Virtual Reality Systems.* Addison-Wesley Publishing Company, Wokingham, England.

LIST OF FIGURES

FIG. 1 shows a system for stereo recording of a complex object using left and right cameras.

FIG. 2 is a top-down sectional view of a stereo-recorded object, showing the relationship between object points and image points.

FIG. 3 shows the stereo projection and viewing of left and right images of a stereogram.

FIG. 9 illustrates a theoretical "perfect" substrate positioned to eliminate surface parallax for all corresponding pairs of image points.

FIG. 10 shows the theoretical intersection points for three pairs of mathematically projected stereo rays.

FIG. 11 illustrates the elimination of surface parallax by calculation of zero parallax points, and the generation of an apparent residual parallax surface.

Figure 14:
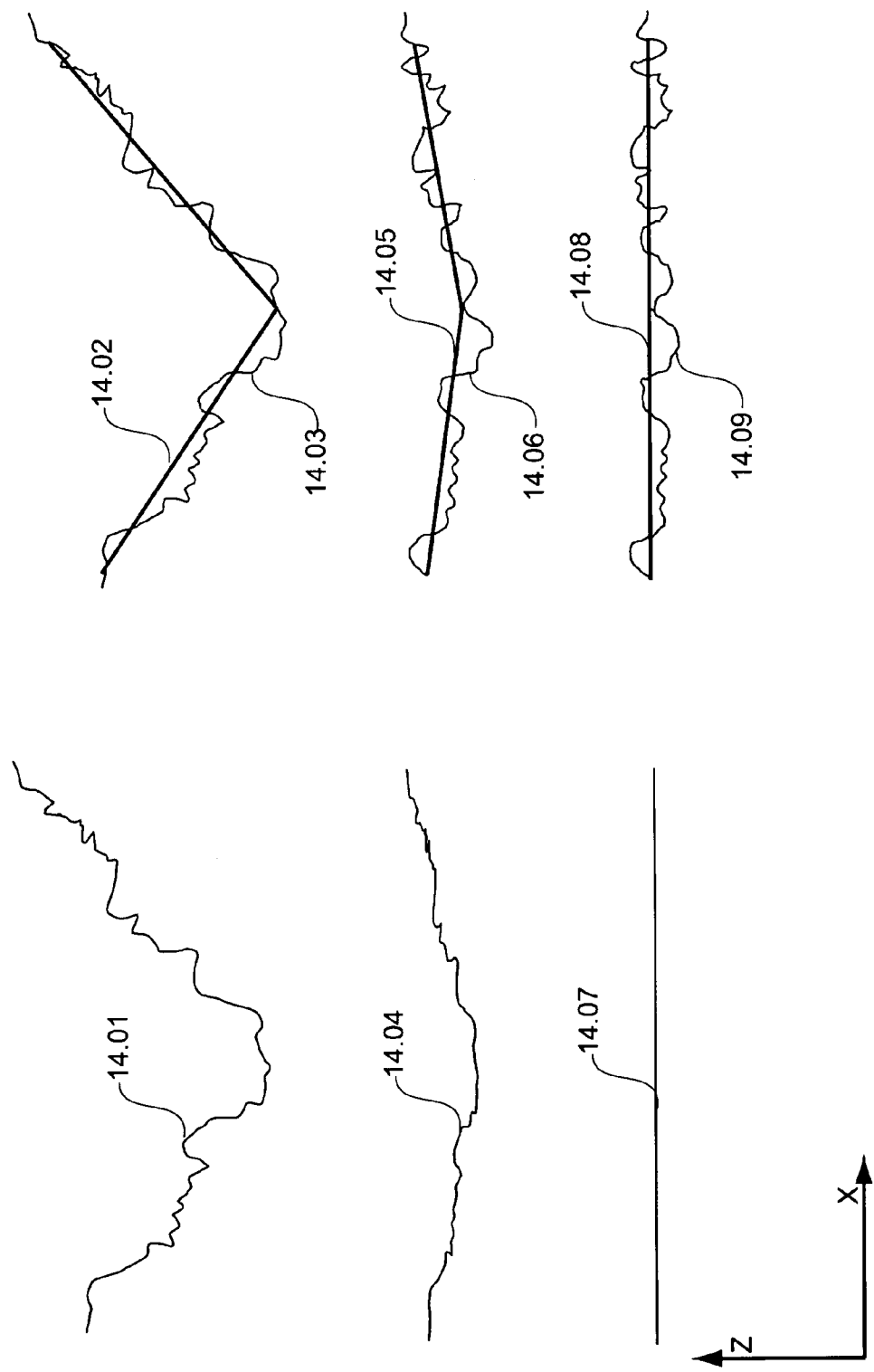

FIG. 14 compares the effects of reducing overall depth (macro parallax) in conventional models and in coherently stereo-textured models.

Figure 15:
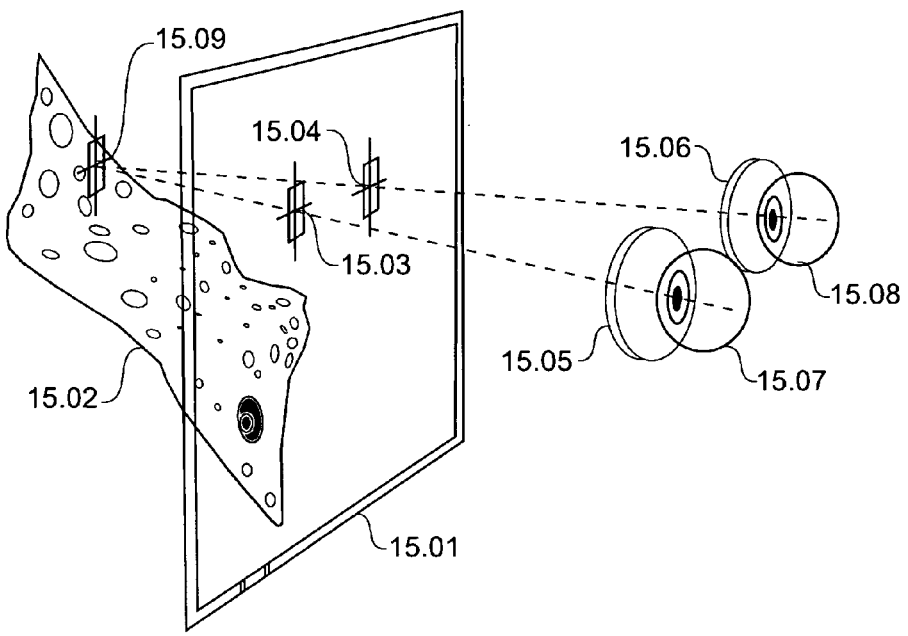

FIG. 15 illustrates the plotting of apparent stereoscopic features using a stereo cursor.

Figure 16:
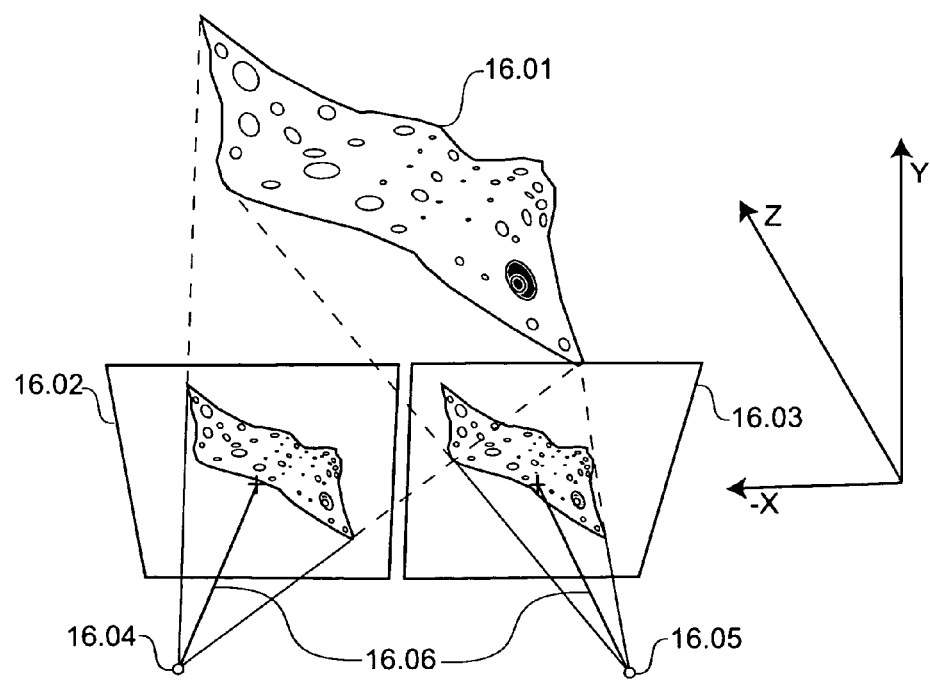

FIG. 16 illustrates the stereo-photographic recording of a fragment of a complex surface.

FIG. 17 shows the progression of steps for stereo-plotting left and right flat polygonal meshes.

Figure 18:
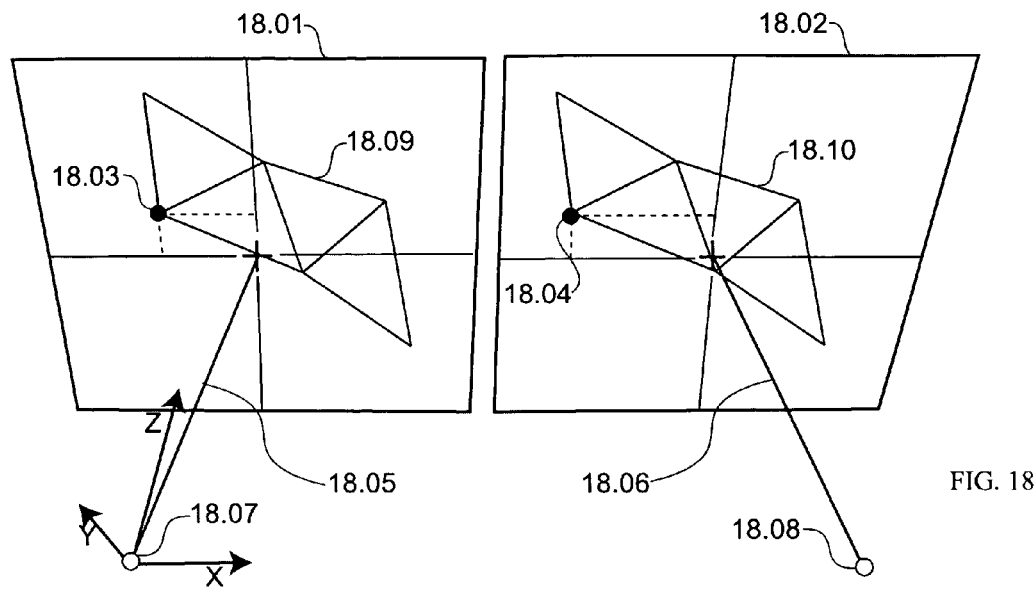

FIG. 18 illustrates the relationship between the vertices of the flat meshes with their respective image coordinate values.

Figure 19:
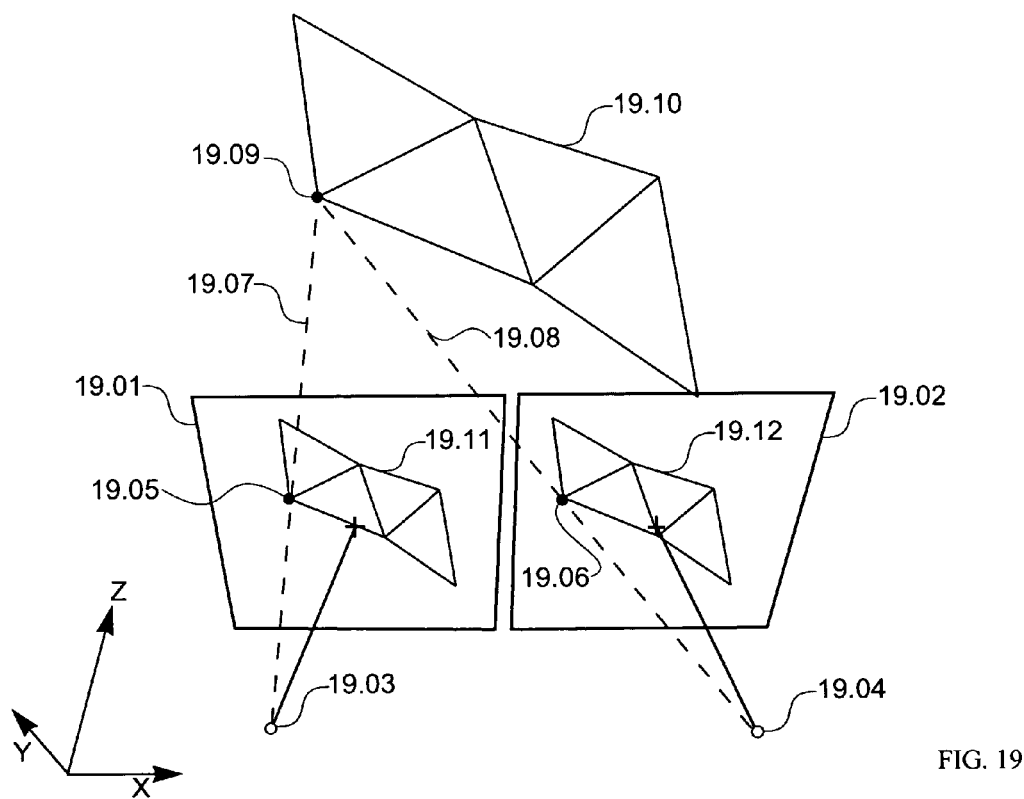

FIG. 19 represents the calculation and construction of a three-dimensional substrate from the stereo corresponding left and right flat meshes.

Figure 20:
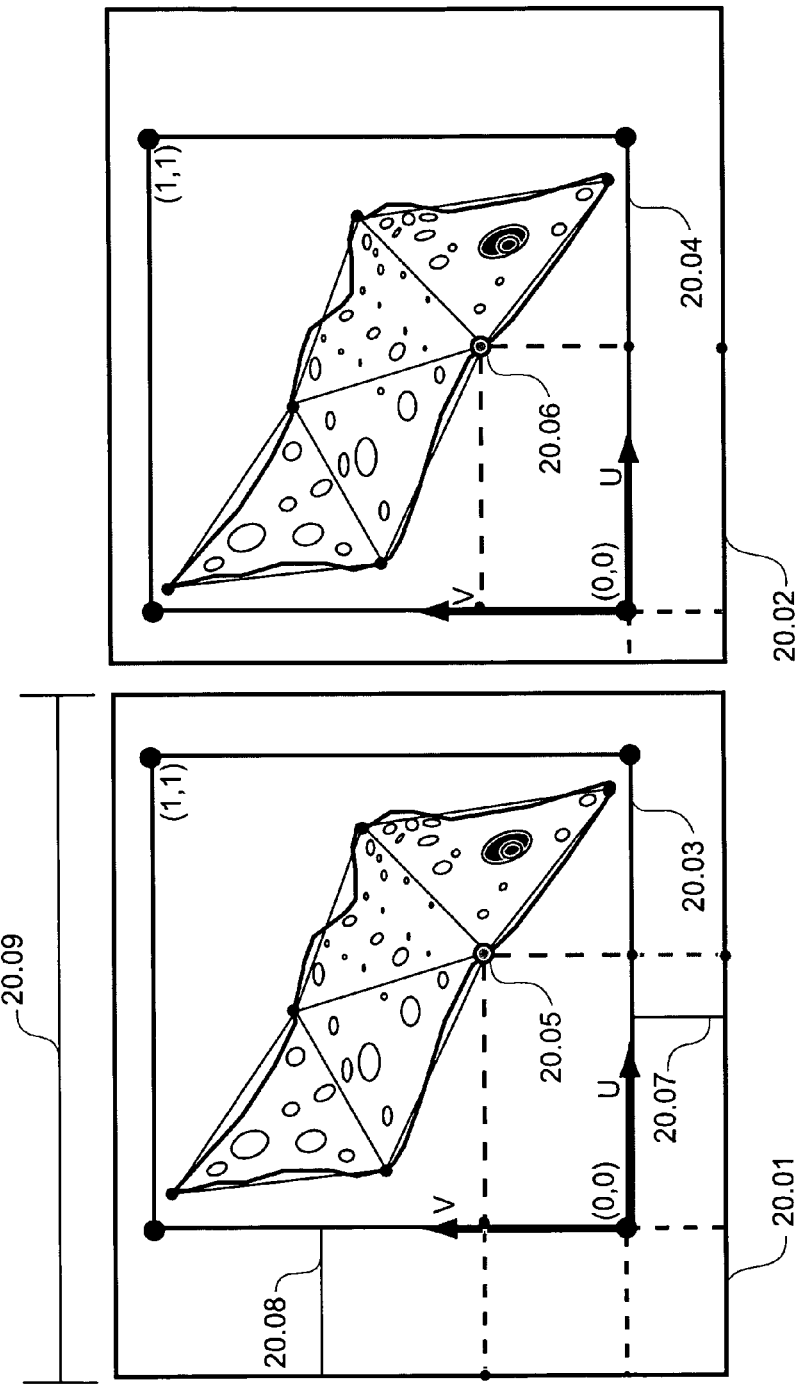

FIG. 20 illustrates the relationship between stereo plotted image coordinates, the left and right flat meshes, and the left and right sets of texture mapping coordinates.

Figure 21:
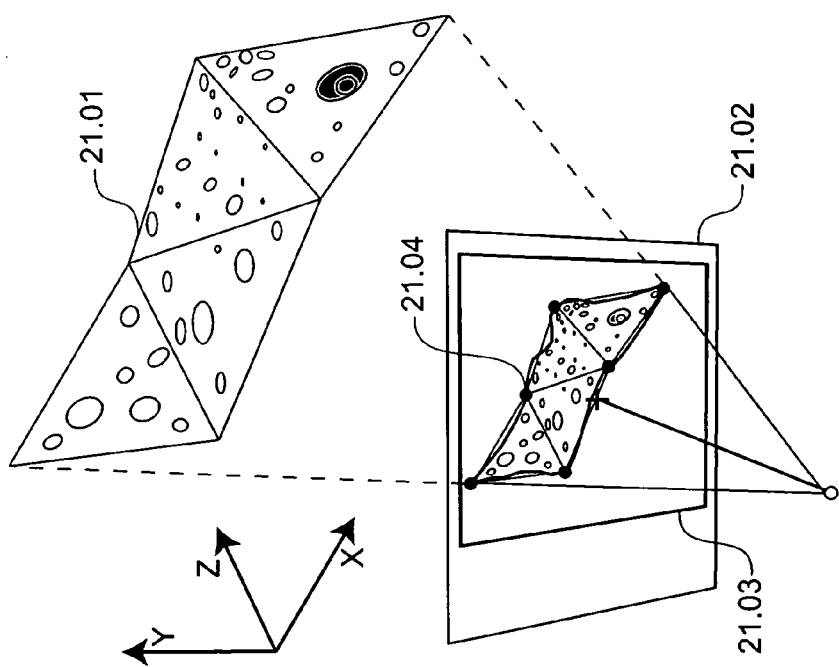

FIG. 21 shows the projective mapping of a single (monoscopic) texture image map onto a three-dimensional polygonal substrate.

Figure 22:
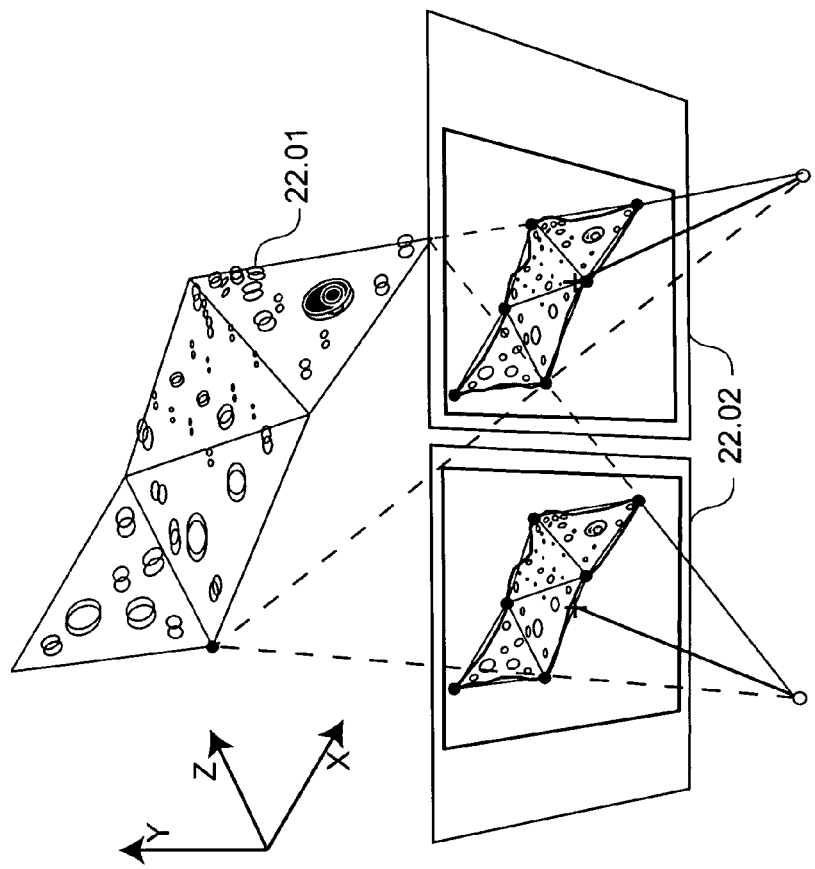

FIG. 22 shows the projective mapping of a corresponding pair of (stereoscopic) texture image maps onto a three-dimensional polygonal substrate.

Figure 23:
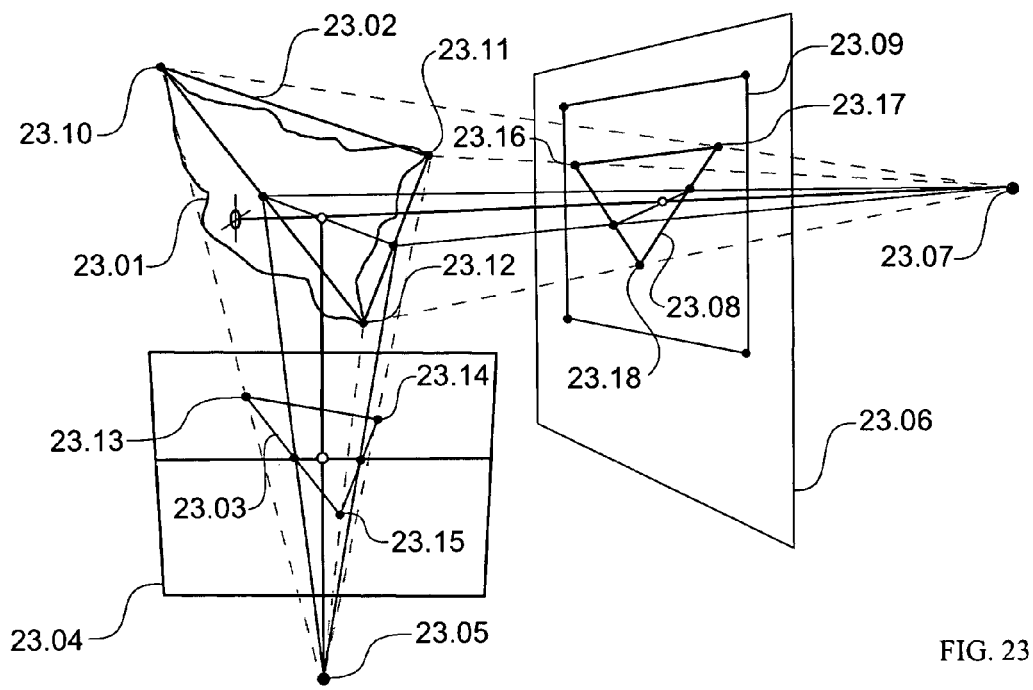

FIG. 23 illustrates the relationship between rendered screen space, 3D VR object space, true object space, and 2D texture image space.

Figure 24:
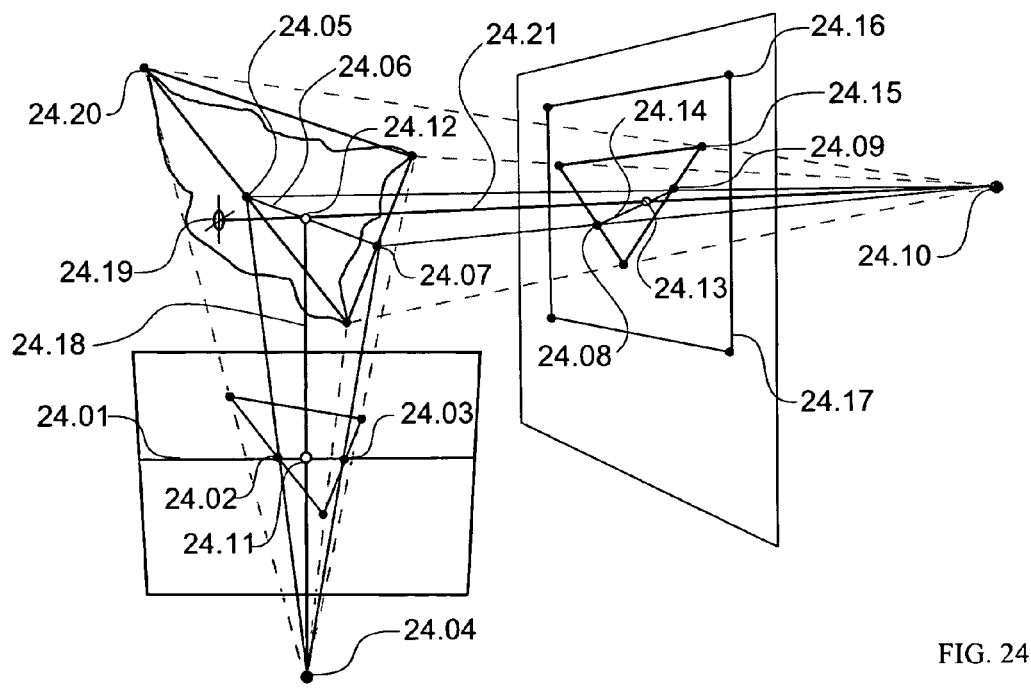

FIG. 24 illustrates the process of correctly sampling texture data.

Figure 25:
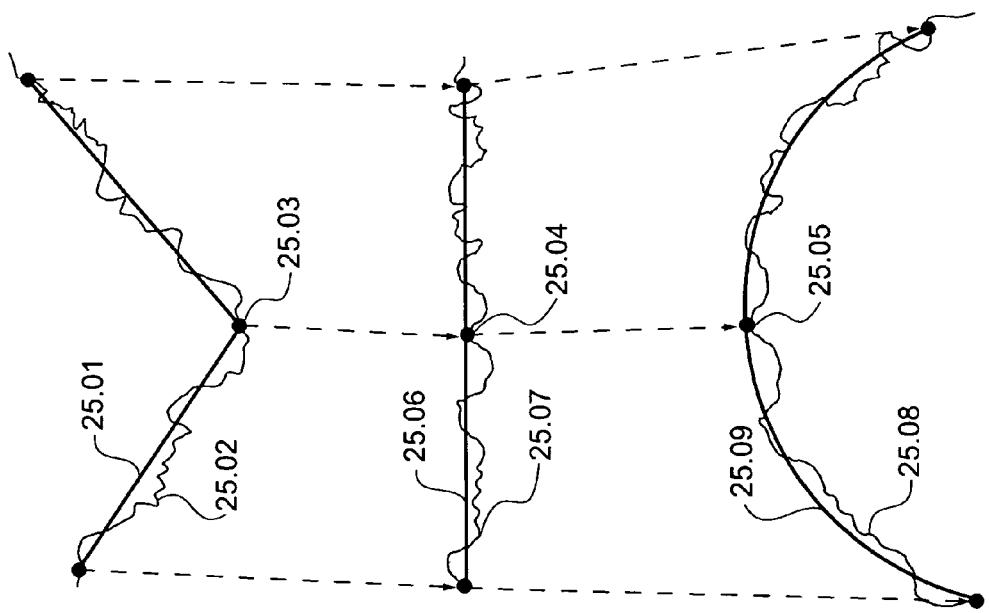

FIG. 25 shows the progression of various user specified spatial deformations of a coherently stereo-textured model.

Figure 26:
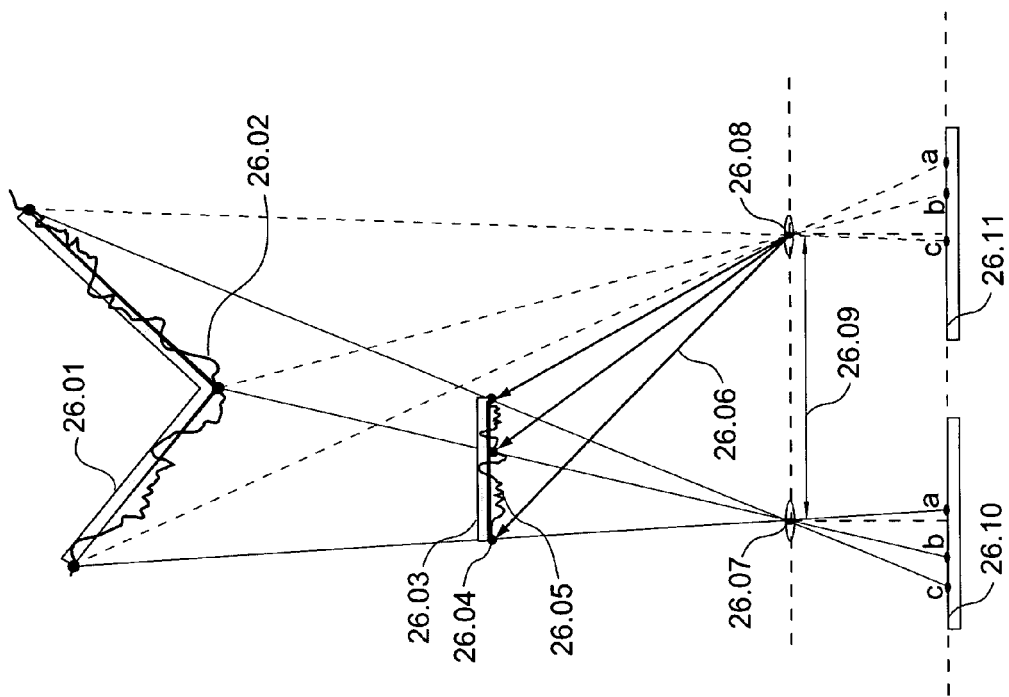

FIG. 26 illustrates the spatial relationship between a coherently stereo-textured model with an image-derived substrate and one using an arbitrary substrate.

Figure 27:
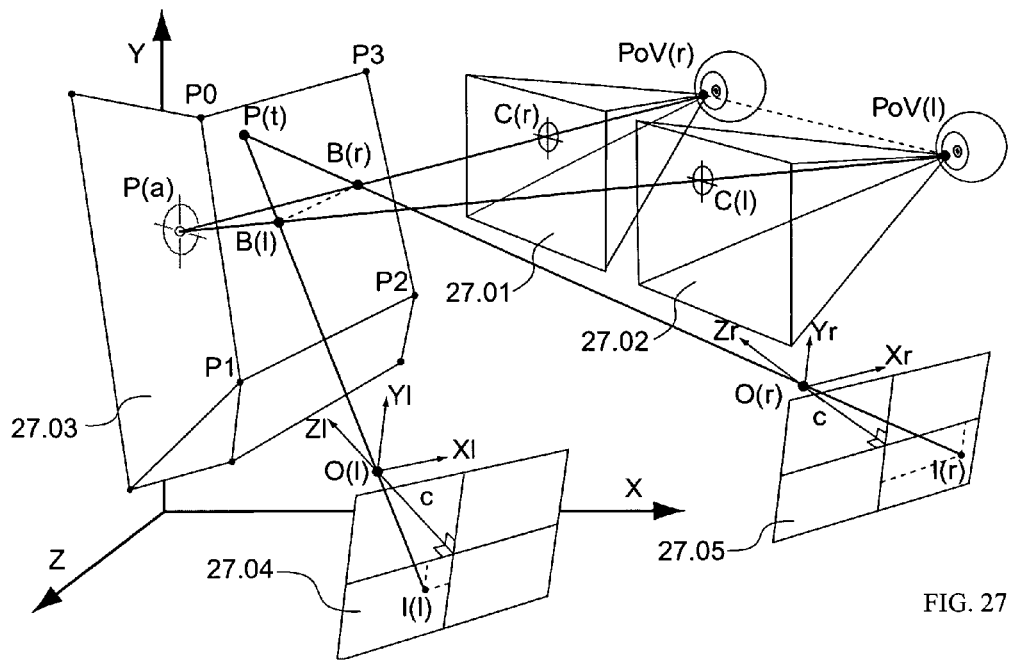

FIG. 27 illustrates a method of extracting true 3D measurements from the apparent surface of a coherently stereo-textured model.

Figure 28:
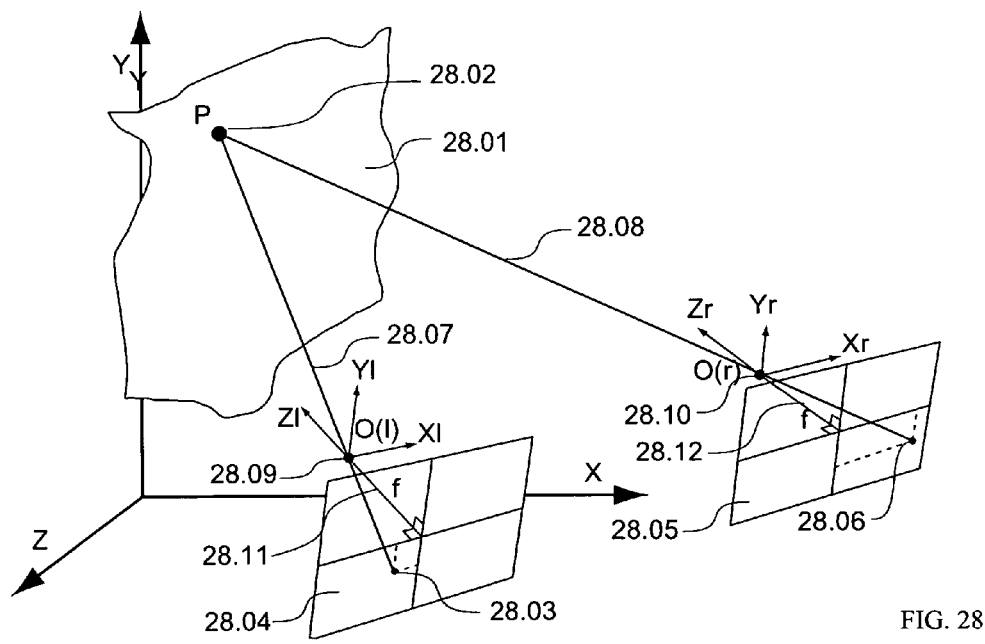

FIG. 28 shows the photogrammetric relationships and parameters for stereo recording of a 3D object.

Figure 29:
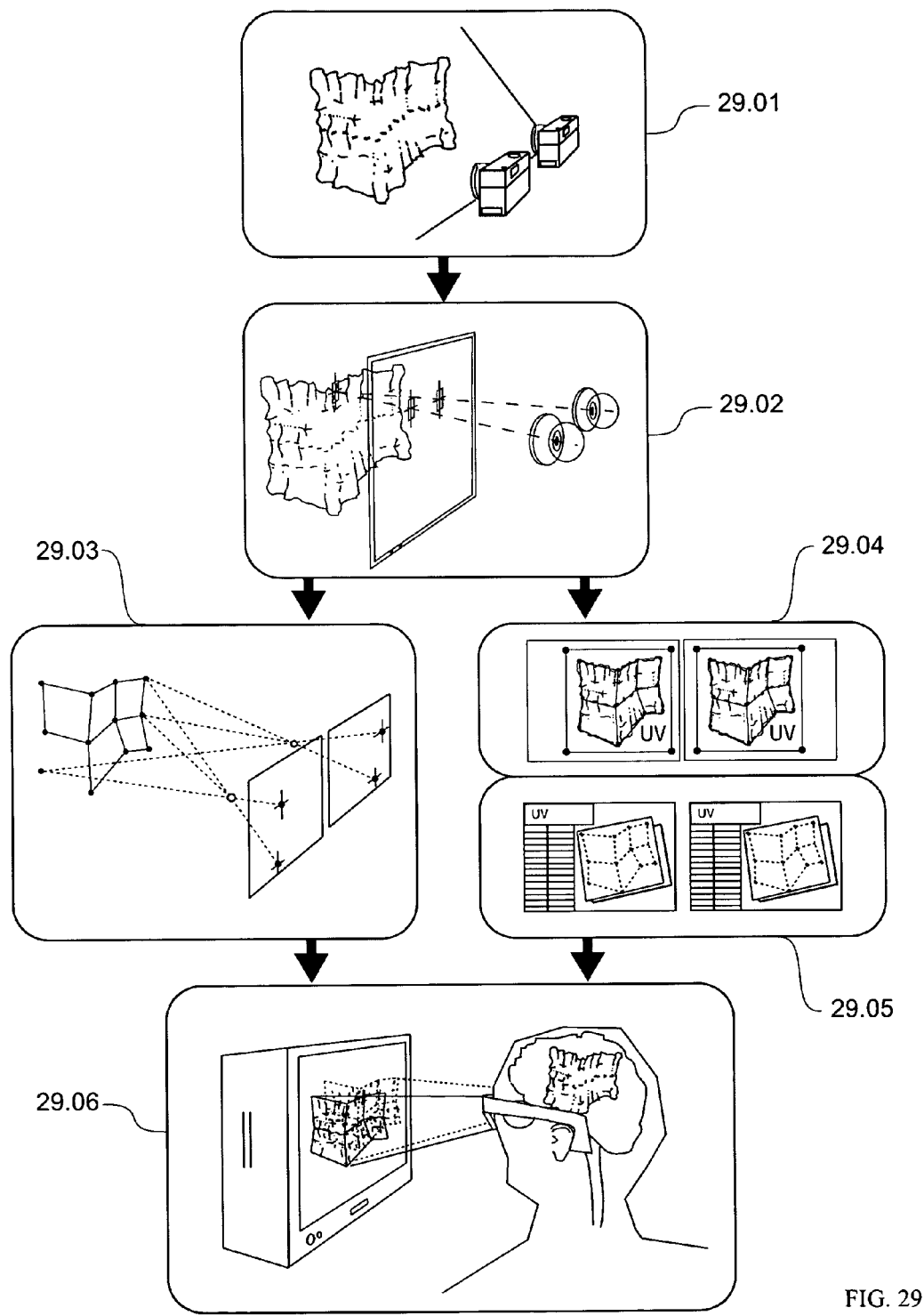

FIG. 29 presents the basic processes in the creation of a coherently stereo-textured model using data derived from the stereo images.

STATEMENT OF THE INVENTION

In accordance with a first aspect of the present invention, there is provided a method for forming a stereoscopic representation of a three-dimensional object, comprising the steps of: (a) providing a stereogram comprising first and second views of the object; (b) selecting a plurality of pairs of corresponding image points from the first and second views which represent a basic shape of the object; (c) providing a substrate; and (d) applying the first and second views to the substrate such that surface parallax is substantially eliminated for each selected pair of corresponding image points, and residual surface parallax occurs for at least some nonselected pairs of corresponding image points.

In this way, a stereoscopic representation of an object (hereinafter referred to as a "coherently stereo-textured model" of an object) may be provided which, as explained below, offers many important advantages over stereoscopic representations produced in accordance with techniques previously known in the art.

The three-dimensional object to be represented (hereinafter referred to as the "stereo-recorded object") may be one of a plurality of objects forming a scene or may be a single isolated object. The three-dimensional object may also be a three-dimensional surface of an object. For example, the three-dimensional object may be a textured surface (e.g. textured surface of an oil painting or the like).

The object may be a real (e.g. physical or tangible) object or a virtual (e.g. digital or computer-generated) object. The first and second views of the object may be produced using any conventional recording technique. For example, in the case of a real object, the stereogram may be recorded by a device or system capable of recording patterns of radiant energy (e.g. light) in any spectra or wavelength (e.g. a real camera). In the case of a virtual object, the stereogram may be produced by a system capable of producing computer-rendered stereo imagery of a computer-modelled scene or object (e.g. a virtual camera).

The plurality of pairs of corresponding image points (hereinafter referred to as "left and right stereo-corresponding image points") may represent any visible part of the object. The left and right stereo-corresponding image points may be selected using any known manual or automated plotting or selection techniques or a combination thereof. In the case of a stereogram recorded using non-digital methods, the stereogram may be digitized to allow selection or plotting of pairs of left and right stereo-corresponding image points.

The density of selected left and right stereo-corresponding image points chosen (each point being hereinafter referred to as a "left or right plotted image point") to represent the basic shape of the stereo-recorded object will depend upon the level of detail required. However, as described below, impressive stereoscopic images may be achieved without a high density of image points.

The substrate may be a real substrate (e.g. a tangible entity existing in physical space) or may be a virtual substrate (e.g. a digital or computer-generated entity). The stereogram may be applied to the substrate using any suitable technique. For example, the stereogram may be projected onto (or from) the substrate, or rendered, mapped or printed onto the substrate. For example, the method may further comprise physically printing the stereogram onto the substrate.

Whilst surface parallax for each pair of selected left and right stereo-corresponding image points is eliminated, some or all of the remaining pairs of nonselected left and right stereo corresponding image points will result in residual surface parallax which creates an apparent three-dimensional surface corresponding the three-dimensional features of the stereo-recorded object.

In order to be correctly viewed, the coherently stereo-textured model is displayed such that the first (e.g. left) image of the stereogram applied to the substrate is apparent only to a first eye of a viewer (e.g. left eye) and the second (e.g. right) image of the stereogram applied to the substrate is apparent only to a second eye of a viewer (e.g. right eye).

The substrate may be a three-dimensional substrate representing the basic shape of the object, the substrate having a surface (e.g. nonplanar surface) defining a set of coordinates in three-dimensional space, each coordinate being associated with a respective pair of corresponding image points; and the first and second views may be applied to the substrate with each pair of corresponding image points applied to their respective coordinates. The nonplanar surface of the substrate may be a crude approximation of the object. For example, the nonplanar surface of the substrate may be based on a low density set of left and right stereo-corresponding image points or on a subset of thereof.

The substrate may comprise a plurality of discrete surface elements. At least one discrete element may be planar. In the case of a substrate comprising a three-dimensional or nonplanar surface, the substrate may comprise a plurality of non-coplanar planar elements. At least one discrete surface element may comprise a vertex. At least one discrete surface element may be a polygon. At least one coordinate in the set may be located at a vertex of a discrete surface element. For example, the surface may comprise a plurality of polygonal surface elements each having at least three vertices, with each coordinate of the set located at a vertex of a polygonal surface element.

The surface of the substrate may be created by virtue of deliberate undersampling of the continuum of available three-dimensional data derived from the stereogram or from the object itself. The step of providing a substrate may comprise determining a perspective centre of each of the views of the stereogram (e.g. rear nodal point of a camera lens used to each image of the stereogram).

The substrate may be created using data derived from the stereogram. For example, the substrate may be created by: a) determining a set of points in three-dimensional space at which pairs of mathematically projected rays passing respectively from each pair of corresponding image points, and through their respective perspective centers, intersect in three-dimensional space; and (b) using the determined set of points in three-dimensional space to create the surface of the substrate, whereby the determined set of points on the surface correspond to the set of coordinates.

The substrate may also be created using data derived directly from the object. For example, the step of selecting a plurality of pairs of corresponding image points may comprises (a) determining the position and orientation of the substrate with respect to the perspective center of each of the first and second views; and (b) selecting the plurality of pairs of corresponding image points by mathematically projecting rays from each of the coordinates defined by the surface of the substrate and through the respective perspective centers of the first and second views. In this way, the substrate may be a scale model of the object (e.g. a scale mode of a basic shape of the object). The object may be measured using any standard surveying techniques, laser scanning or the like and may have a three-dimensional reference system. If the camera position relative to the object is known when the stereogram is created, the relationship between the substrate and the cameras may be calculated by finding a common reference system. For example, this may be based on GPS coordinates or visible targets which were placed on or around the object and recorded in the stereogram. In another embodiment, the relationship is determined by finding common points in a laser scan and in both views of the stereogram, and using these points to determine an angle and position of the cameras. In this way, the spatial relationship between the cameras and the substrate may be calculated without need to reference the object.

The object may be a virtual object (e.g. digital or computer-generated entity). The stereogram may be created (e.g. generated) by rendering (e.g. synthetic rendering) of the first and second views. The object may be rendered using 3D modelling software of the type known in the art which features a virtual camera (sometimes referred to as a "viewing frustum"). The location of the virtual camera determines the view a user will see of the stereoscopic representation. The stereoscopic representation may be rendered by using two virtual cameras simultaneously or by using one virtual camera to render a first view and then moving the virtual camera by a designated base separation and rendering a second view.

The substrate may be tangible entity existing in physical space (e.g. a real entity). The substrate may be formed using any conventional technique and using any conventional materials.

The substrate may be configured to present a stereoscopic representation of the object to a user without using stereoscopic eyewear. For example, the substrate may comprise material configured for such a purpose. In one embodiment, the substrate may comprise a lenticular screen.

The substrate may be a virtual substrate (e.g. digital or computer generated substrate). The method may further comprise the step of providing a set of user controls allowing a view to adjust the base separation between the rendered left and right views. For example, the stereogram provided may have a first base separation (e.g. the base separation of cameras recording the stereogram); and the method may further comprise the step of digitally rendering the stereoscopic representation of the object using first and second virtual cameras having a second base separation. In this way a user may adjust the base separation of the rendered left and right views to a value which is different to the first base separation.

The stereogram may be one of a plurality of stereograms of a given view of the object (e.g. one of a plurality of stereograms showing a substantially similar view of the object), each stereogram of the plurality having a different base separation; and the method may comprise further providing a set of image coordinates for applying each stereogram of the plurality to the substrate. The method may further comprise the step of providing a set of user controls allowing a viewer or user to select which of the stereograms should be applied to the substrate.

The stereogram may be provided with a first base separation which exceeds a range of parallax normally considered comfortable for human viewing; and the method may further comprise the step of: applying the stereoscopic representation of the object using first and second application means (e.g. cameras) having a second base separation which produces a range of parallax considered comfortable for human viewing. For example, the stereoscopic representation of the object may be digitally rendered using first and second virtual cameras having a second base separation which produces a range of parallax considered comfortable for human viewing. The stereoscopic representation of the object may then be recorded as a new stereogram. The new stereogram may be stored (e.g. for later viewing). In this way, there is provided a method of forming a stereoscopic representation which provides film and video makers with the ability to shoot a film with a wide base separation to provide fine detail and texture, and then resample the footage by creating stereoscopic representations of the footage with a lower macro parallax value. As a result of the residual surface parallax (e.g. micro parallax) in the stereoscopic representation, surface complexity recorded in the footage is substantially retained.

The method may further comprise displaying the stereoscopic representation of the object using a system allowing selection of at least one additional pair of corresponding image points. The at least one additionally selected pair of corresponding image points may be used to create a new coordinate on the surface of the substrate to further define the surface of the substrate. The at least one additionally selected pair of corresponding image points may also be used to derive measurements from points on the substrate corresponding to surface features of the object.

The method may further comprise the step of displaying the stereoscopic representation of the object using a system allowing at least one of manipulation and annotation of the stereoscopic representation in the three dimensions.

The method may further comprise the steps of: (a) providing a first set of image coordinates for applying the first view of the stereogram onto the substrate; and (b) providing a second set of image coordinates for applying the second view onto the substrate. In one embodiment, the stereoscopic representation is rendered such that the first set of coordinates is used to apply the first view to the substrate when the first view is displayed, and the second set of coordinates are used to apply the second view to the substrate when the second view is displayed. In another embodiment, the substrate comprises first and second substrate components, each substrate component representing a basic shape of the object and having a surface defining a set of coordinates in three-dimensional space, and the step of applying the first and second views of the stereogram to the substrate comprises applying the first view to the first substrate component (e.g. using the first set of image coordinates) and applying the second view to the second substrate component (e.g. using the second set of image coordinates).

In another embodiment, the second view is manipulated (e.g. warped and mapped) such that each selected image point is made to coincide positionally with its corresponding image point in the first view; a set of image coordinates is provided for applying the first view of the stereogram onto the substrate; and the stereoscopic representation is rendered such that both the first view and the warped second view are applied to the substrate using the image coordinates of the first view.

Where necessary, the method may further comprise repeating as necessary any steps for real-time rendering using a simulation loop.

The substrate may have an arbitrary shape. For example, the substrate may have a shape bearing no spatial correlation to the basic shape of the object. For example, the substrate may comprise a planar surface. The first and second views of the stereogram may be mapped onto the substrate to force the creation of zero-parallax points on the surface of the substrate. For example, the method may further comprise the step of providing a set of image coordinates for applying the first and second views of the stereogram onto the substrate such that surface parallax is substantially eliminated for each selected pair of corresponding image points.

The substrate may be subjected to a spatial transformation to provide a new shape.

In accordance with a second aspect of the present invention, there is provided a method for forming a series of temporally sequenced stereoscopic representations of an object, comprising the steps of: (a) providing a plurality of stereoscopic representations each formed in accordance with any of the previously defined method embodiments of the first aspect of the inventing; and (b) arranging the plurality of stereoscopic representations in a sequence for viewing at a specified frame rate.

A single substrate may be used for forming a plurality of representations (e.g. for use in scenes in which a view of an object does not change or does not change substantially over a series of frames).

In accordance with a third aspect of the present invention, there is provided a stereoscopic representation of an object made in accordance with any of the previously defined method embodiments.

In accordance with a fourth aspect of the present invention, there is provided a computer program comprising program instructions for causing a computer to perform any of the previously defined method embodiments.

The computer program may be embodied on one or more of: a record medium, a computer memory, a read-only memory and an electrical carrier signal.

According to a fifth aspect of the present invention, there is provided apparatus for forming a stereoscopic representation of an object, comprising: (a) means for generating a stereogram comprising first and second views of the object; (b) means for selecting a plurality of pairs of corresponding image points from the first and second views which represent a basic shape of the object; (c) means for generating a substrate; and (d) means for applying the first and second views to the generated substrate such that surface parallax is substantially eliminated for each selected pair of corresponding image points, and residual surface parallax occurs for at least some nonselected pairs of corresponding image points.

Apparatus embodiments of this aspect of the invention may comprise features associated with previously defined method embodiments.

In accordance with a sixth aspect of the present invention, there is provided apparatus for forming a stereoscopic representation of an object, comprising: (a) a stereogram comprising first and second views of the object; (b) a substrate; and (c) means for applying the first and second views to the substrate such that surface parallax is substantially eliminated for preselected pairs of corresponding image points from the first and second views which represent a basic shape of the object, and residual surface parallax occurs for at least some other pairs of corresponding image points.

Apparatus embodiments of this aspect of the invention may comprise features associated with previously defined method embodiments.

SUMMARY OF THE INVENTION

The invention consists of a new type of three-dimensional stereoscopic entity, to be referred to as a coherently stereo-textured model (CSTM), and the process by which the CSTM is created, rendered, and displayed, to be referred to as coherent stereo-texturing. The basic components of the CSTM are (1) one or more stereograms, (2) a three-dimensional substrate, and (3) a set of coordinates, here referred to as zero parallax points, which determine (in whole or in part) the structure of the substrate and the relationship between the substrate and the imagery which is applied to it.

A stereogram is a related pair of images, which have been captured or created in such as way as to give the appearance of depth when seen through an appropriate stereo viewer. The term substrate, as it is used here, refers to the digital or analog surface onto which the stereo imagery is mapped, rendered or projected. A CSTM can consist of a single stereogram-plus-substrate, or a series of stereograms and substrates that fit together to form a larger model. Multiple temporally-sequenced CSTMs can be also be created, using imagery generated by processes such as stereo film and videography, time-lapse stereo photography, stop motion animation sequences filmed in stereo, etc.

The invention has a number of embodiments, both digital and analog, but the one which may find the most widespread application is the use of CSTMs in interactive computer graphics systems capable of stereo rendering and display—i.e., true "virtual reality" (VR) systems. Due to the unique way in which the substrate is generated and the imagery is applied to it, coherent stereo-texturing can be (conservatively) 400 times more efficient than conventional techniques, in terms of computational processing time, at representing complex three-dimensional surfaces. Furthermore, this technique can significantly reduce the eye strain and discomfort which often accompanies prolonged stereo viewing.

The CSTM is especially suited to the recording and representation of real-world objects, but can also be applied to synthetically-generated models (i.e., those produced by 3D modelling software and/or particle rendering systems). CSTMs are capable of rendering a broad range of objects and surfaces, including non-solid complex surfaces such as hair and fur, as well as complex particle-based phenomena such as fluids, gases, fire, explosions, etc. It can also represent surfaces that are transparent or opalescent and can be constructed from stereo imagery recorded in nonvisible spectra such as x-rays, ultraviolet, and infrared.

General Description of the Invention

A conventional stereogram, when viewed with an appropriate stereo viewer, creates an illusion of three-dimensionality even though the component images and their substrate are only two-dimensional. However, since conventional stereograms can present only one point of view (the position of the cameras when the image pair was recorded), the illusion of three-dimensionality is essentially static and the viewer is restricted to this one viewpoint regardless of his or her position in relation to the image.

A coherently stereo-textured model differs fundamentally from a standard stereogram in that a CSTM is a true three-dimensional object, and thus allows true perspectival viewpoints from a multitude of different orientations. Whereas a viewer looking at a conventional stereogram of a building would see the same view of the building no matter where he moved relative to the image, a viewer looking at a CSTM of the same building could move in virtual space and his view of the building would change accordingly. This effect is possible because the substrate of a CSTM is itself a three-dimensional facsimile of the original object, constructed using measurements derived either from the stereo imagery or from the object itself. The stereograms are then mapped onto this facsimile by matching a specific subsample of stereo image points to their corresponding points on the facsimile. The process of generating the substrate and applying the imagery to it is referred to as coherent stereo-texturing.

In order to understand the nature, significance, and effect of this coherence between imagery and substrate, one must first understand the underlying principles of stereo imaging. FIG. 1 represents the most basic system for creating a photographic stereogram, where two cameras (1.01) are used to record a three-dimensional object (1.02). In FIG. 2 this system is represented as a simple projective ray geometry. The cameras are set up so that their perspective centers (2.02, 2.03) lie in the same horizontal plane, separated by a horizontal distance (2.04) known as the "base separation." Each point on the object (e.g., 2.01A) gives rise to a pair of rays that project in three-dimensional space through the perspective centers of the left and right cameras (2.02, 2.03) and terminate at the image planes of the respective cameras (2.05, 2.06), resulting in a left and right image point for each object point (e.g., 2.05a, 2.06a). The degree of depth which can be perceived in the resulting stereogram is a function of the distance between the perspective centers of the cameras (2.04) and the distance between each image point and its corresponding object point (e.g., from 2.01A to 2.05a).

Figure 4:
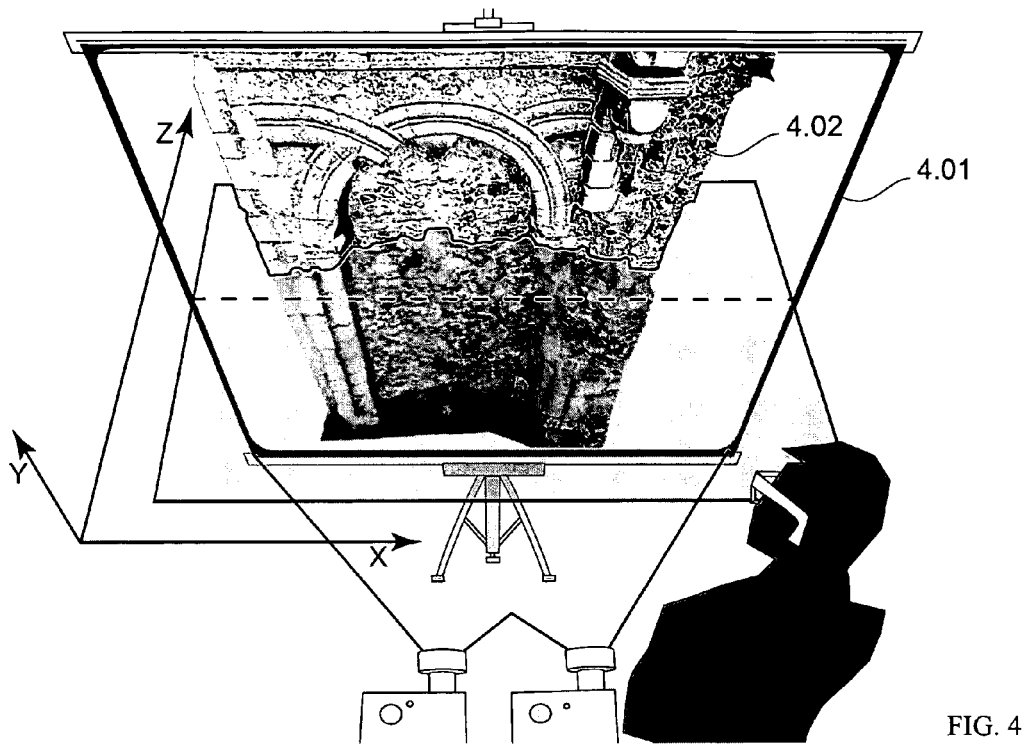
FIG. 4 illustrates the apparent depth in the projected stereogram perceived by the viewer.
Figure 5:
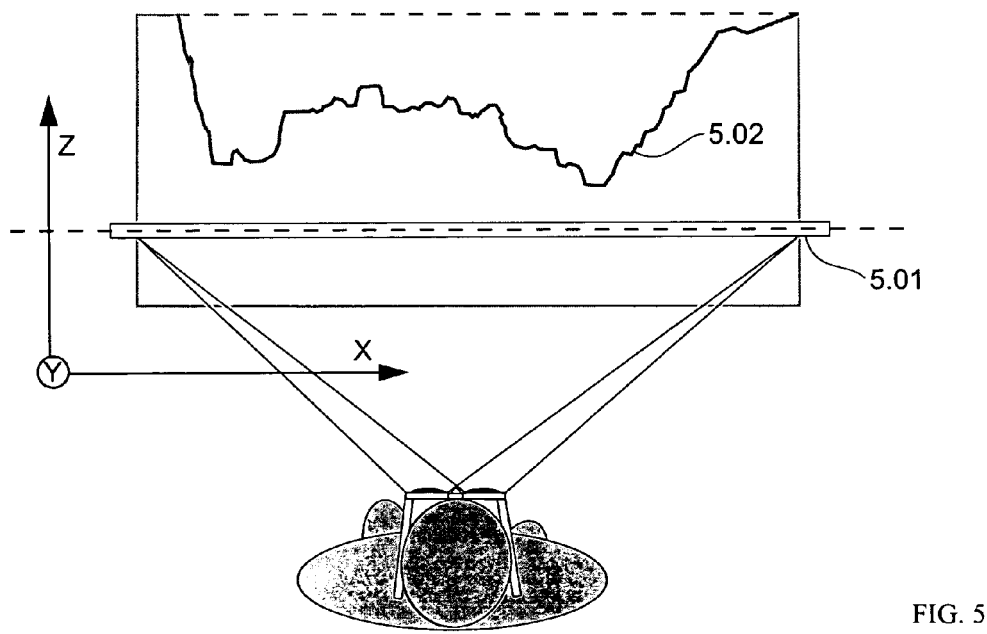
FIG. 5 is a top-down sectional view of the apparent depth in the projected stereogram perceived by the viewer.

Viewing the stereogram requires an apparatus which restricts the left image to the left eye and the right image to the right eye. When the stereo imagery is correctly aligned, the natural faculties of human stereopsis allow the observer to perceive various parts of the stereo-recorded object as occurring at various depths. One method of viewing stereograms, illustrated in FIG. 3, involves the use of two projectors (3.01) aligned in such a way that when the two images are projected onto a flat screen (3.03) an observer using stereo glasses (3.02) can perceive various parts of the object as occurring at various depths beyond the plane of the screen. FIGS. 4 and 5 illustrate this point, where 4.01 and 5.01 indicate the location of the screen, and 4.02 and 5.02 indicate the apparent position of the stereo-recorded object as perceived by the viewer. It is also possible to create effects where the object appears to lie in front of the screen or partly in front and partly behind it.

It is important to note that although in this instance the screen operates as a substrate for projection, the visual texture of the projected patterns dominate over the very minor visual texture of the screen's actual surface so that, for all practical purposes, the screen is invisible to the viewer. In other words, the viewer perceives the apparent surface of the object in the projected image rather than the actual surface of the screen onto which it is projected. This principle is known as "textural dominance" and is one of the central concepts exploited by the proposed invention.

Figures 6, 7, 8:
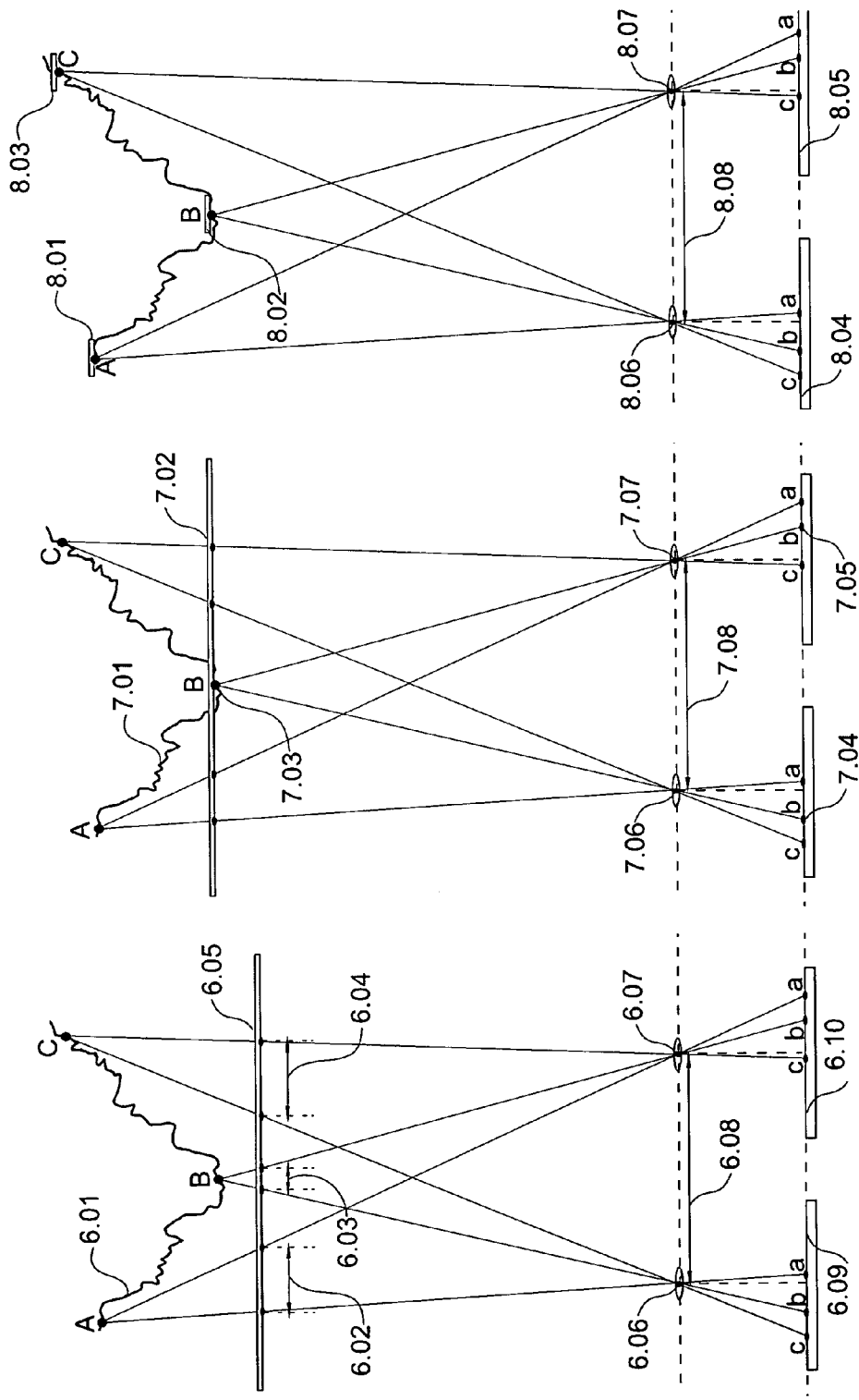
FIG. 6 illustrates the surface parallax for various pairs of image points.
FIG. 7 shows a screen positioned so as to eliminate surface parallax for the image points corresponding to an apparent point (B).
FIG. 8 shows the positioning of three individual screens to eliminate surface parallax for three specified pairs of corresponding image points.

FIG. 6 represents the projection onto a flat screen (6.05) of the stereogram captured in FIG. 2. Note that points 6.01A, B, and C lie in an apparent three-dimensional space beyond the plane of the screen. The apparent depth is determined by the horizontal distance between each pair of corresponding image points on the screen (6.02, 6.03, 6.04), called the surface parallax. As the surface parallax between a pair of stereo image points increases, so too does the apparent depth of the perceived three-dimensional point. Conversely, a reduction in surface parallax results in a reduction of apparent depth. The varying degrees of parallax between pairs of corresponding image points is largely governed by the shape of the original object recorded by the stereogram: the farther an object point was from the stereo cameras, the greater the parallax value for the corresponding pairs of image points.

There are various methods by which surface parallax can be "globally" controlled. For example, adjustments in the distance between the left and right projectors, or between the projectors and the screen, can change all surface parallaxes for the total set of stereo points by a constant factor. This provides a useful technique for controlling the apparent position of an object in space with reference to the plane of the screen. It is possible to arrange the projectors and the screen in such a way that the closest apparent image point coincides with the plane of the screen; this is called the "zero parallax setting" for the apparent point of interest.

Compare FIG. 6 to FIG. 7, where the position of the screen has been adjusted so that the rays projecting from one pair of left and right image points (7.07b 7.08b) corresponding to object point 7.01B now converge perfectly at the surface of the screen, reducing the surface parallax for that point pair to zero (7.03). If this single large screen were to be replaced by a series of small screens, each set at the exact location where a specially selected pair of corresponding image rays intersect in three dimensional space, then each of these specially selected pairs of points would have their surface parallaxes eliminated. FIG. 8 illustrates this effect for a set of three points (8.01A, 8.02B, 8.03C).

Now consider the same arrangement of projectors and imagery, but instead of projecting onto a single large flat screen, or a series of small flat screens, the images are projected onto a screen or substrate which matches exactly the three-dimensional shape of the original object (FIG. 9). Assuming that the geometry of the cameras that took the stereogram matches the geometry of the projectors, and that the method of projection is not hampered by the effects of distortion or a limited depth of field, this three-dimensional screen (9.01) would effectively eliminate the surface parallax not just for a few points (9.0A, B, C) but for every pair of corresponding rays that make up the entire stereo projection. If all parallax is eliminated, the use of a stereogram becomes redundant—in order to represent the form and color of the original object, all that would be required is a perfect substrate and a projection or mapping of a single image.

This concept—applying a single (monoscopic) image to a detailed three-dimensional substrate—is in fact the basis for most conventional methods of rendering 3D graphics. Unfortunately, the more three-dimensionally complex the object or surface is, the more computational speed and power are required to model and render it. Due to the limits of current technology, conventional systems for modelling three-dimensional objects therefore generally rely on a fairly crude substrate combined with a single (monoscopic) image, the assumption being that significant increases in perceived realism can only be achieved in conjunction with geometric increases in computational power and speed.

The coherently stereo-textured model takes an entirely different approach. Rather than trying to achieve a perfect substrate at vast computational expense, it exploits two phenomena briefly discussed above—textural dominance and surface parallax—to create the illusion of a perfect substrate, therefore achieving a very similar effect with vastly less effort. The invention accomplishes this through a technique which both simplifies the substrate and registers the stereo imagery to the substrate in such a way as to increase the realistic perception of depth while vastly reducing the computational processing time necessary to create and render the model.

Since the most common application of the CSTM will be in 3D computer graphics, it may be helpful to visualize the substrate as a polygonal mesh which is formed into an approximation of the original object and to which the stereo imagery is applied. For most embodiments of the invention, the first step in defining the substrate is to select, from all of the possible pairs of corresponding image points in the stereo imagery, a subsample of pairs of corresponding image points which will most efficiently and effectively describe the three-dimensional shape of the original object. For each selected image point (e.g. 10.05a, 10.06a), a ray is then projected through the respective camera's perspective center (10.02, 10.03), and calculations (see Eqns 1.5-1.30) are performed to determine the point at which the rays from corresponding left and right image points would intersect in three-dimensional space (e.g. 10.01A). This hypothetical value is referred to here as the stereo ray intersection point, and in theory it represents the location on the original stereo-recorded object (10.01) which gave rise to the pair of corresponding image points in the stereogram.

Thus for every pair of corresponding stereo image points, there is a hypothetical location in three-dimensional space (corresponding to the location of the original object point) where the distance between the projected points would be zero (e.g., 10.01A, B, C), and for each point on a screen or substrate there is a hypothetical point in three-dimensional space (the zero parallax point) where the substrate could be placed so as to eliminate surface parallax for the corresponding pair of stereo image points (e.g., 9.01A, B, C). The key feature of the coherently stereo-textured model is that each vertex in the substrate is placed at the hypothetical stereo ray intersection point for a pair of specially selected corresponding stereo image points, with the result that each vertex in the substrate serves to eliminate surface parallax for that pair of image points. Furthermore, each vertex in the substrate will accurately represent the relative position of the corresponding object point in the original stereo-recorded object or scene (the degree of accuracy being dependent on the level of photogrammetric rigor applied when recording the original stereograms).

In most applications, the stereo ray intersection points will be calculated from specially plotted points in the stereo imagery, and these values will determine the placement of the vertices in the three-dimensional substrate, so that each vertex represents a zero parallax point. However, it is also possible to construct the substrate first, based on data from sources other than the stereo imagery, and then use the vertices (which have been chosen to serve as zero parallax points) as the hypothetical location of the stereo ray intersection points, from which the location of the corresponding image points can be calculated (or, in some applications, "forced"

into compliance). Depending on the complexity of the original object, and the level of detail desired in the final effect, every vertex (zero parallax point) in the entire substrate can be used as a registration point, or a further subset of these vertices may be selected.

FIG. 11 illustrates in a very schematic way a small section of a coherently stereo-textured model, which utilizes three specifically selected zero parallax points (11.01A, B, C). Note that these points have been placed at the locations where pairs of stereo corresponding rays intersect in three-dimensional space, and also that the position of the vertices accurately reflects the position of the original object point on the surface of the stereo-recorded object (11.02). Since this substrate (11.01) is only an approximation of the original object, the surface parallax has only been eliminated for some of the pairs of image points, i.e., those whose rays meet at the surface of the substrate. This includes those points which have been specifically calculated as zero parallax points (11.01A, B, C) as well as others which just happen to intersect at the surface of the substrate (e.g. 11.08), which may be referred to as "incidental" zero parallax points. However, there are many more pairs of image points whose rays would intersect at various points in front of or behind the substrate (e.g. 11.09). The distance between these points where they meet the substrate (i.e, the surface parallax) has been reduced (by virtue of the substrate being a closer approximation to the original object than a flat screen would be) but it has not been eliminated. This small amount of "left-over" parallax is referred to as the residual surface parallax for each pair of projected points.

Figure 12:
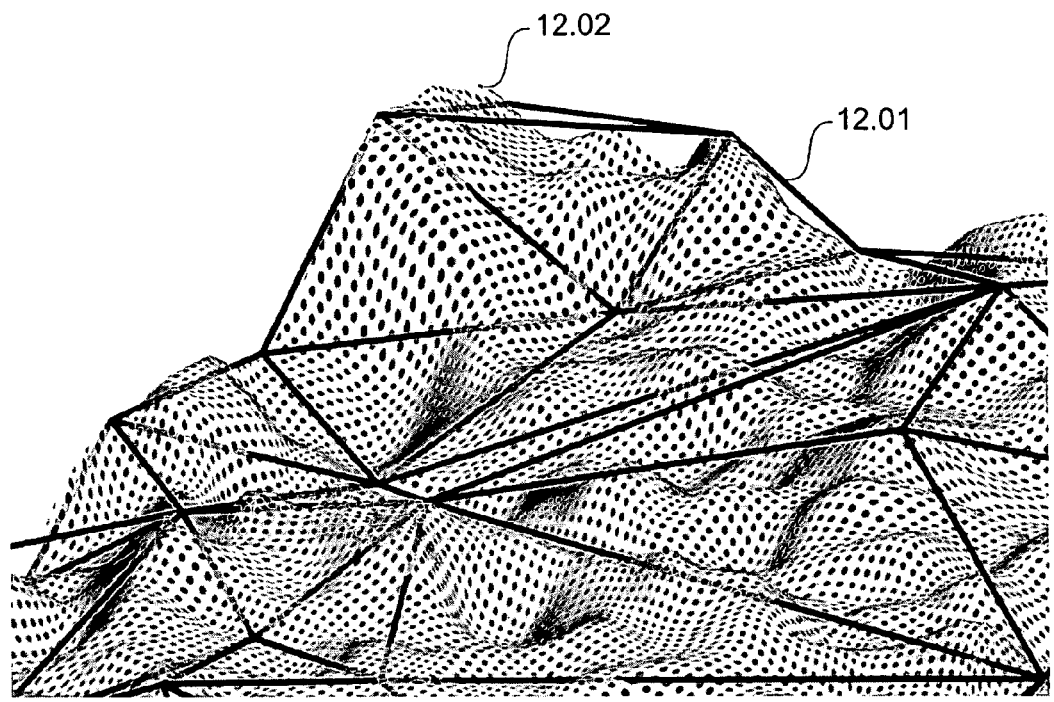
FIG. 12 is a perspective view of the relationship between the substrate and the stereogram, where selected pairs of stereo ray intersection points have been mapped to the vertices of the substrate.
Figure 13:
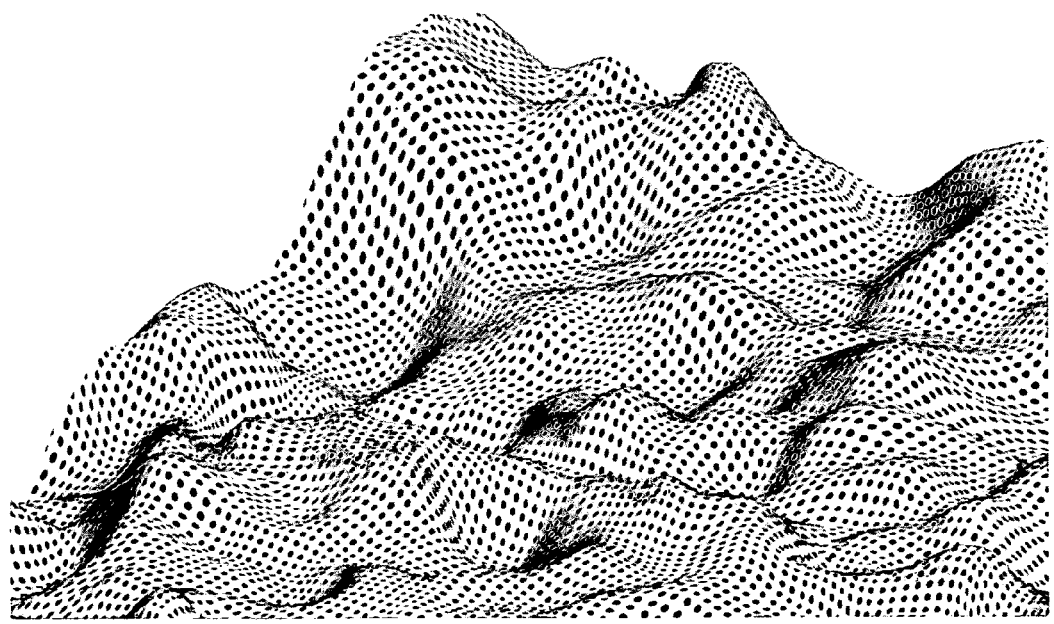
FIG. 13 illustrates the principal of textural dominance, whereby the viewer perceives only the apparent surface and not the substrate.

As described earlier, parallax is what creates the perception of depth in a stereoscopic viewing environment. In the example given here, each polygonal facet of the CSTM substrate effectively acts as a mini "screen" onto which sections of the stereogram are mapped or projected. FIG. 12 illustrates this effect, where each vertex of the polygonal substrate represents the zero parallax point calculated for a specifically selected pair of corresponding rays. The stereo imagery (12.02) is registered to the substrate (12.01) at each of these vertices. In between these vertices, where residual surface parallax occurs, varying degrees of depth may be perceived. Due to the principal of textural dominance, discussed earlier, the human visual system ignores the "screen" and sees only the apparent three-dimensional surface (FIG. 13). The CSTM therefore implies, rather than explicitly describes, a perfect substrate.

The coherently stereo-textured model represents a significant paradigm shift in approaches to rendering 3D graphics. Explicit modelling and rendering of complex objects in a real-time environment is notoriously difficult and computationally expensive. The proposed invention provides a solution to this problem by exploiting the fact that modern graphics hardware is capable of rendering and three-dimensionally mapping two-dimensional imagery much faster and in a much greater volume (in terms of the number of elements processed) than the same number of explicit three dimensional elements or polygons.

For example, the conventional approach to creating a realistic 3D/VR model of a tree trunk would be to build the most complex and accurate virtual replica of the shape of the tree trunk possible within the constraints of available technology. This could involve millions of polygons to represent each crack and fissure in the bark, and would require vast processing power to achieve real-time interactivity. A photographic image of the tree would then be applied to the surface of the model, a technique known as texture-mapping. (This is somewhat of a misnomer, however, as the term "texture" implies that a three-dimensional surface texture is being applied to an object, when in fact it refers to the application of a two-dimensional array of values, such as a digital photograph, to the surface of a three-dimensional object.) In a sense, this is the digital equivalent of carving an intricately detailed wooden replica of a tree trunk and then gluing a photo of its bark onto it like wallpaper.

What a CSTM does instead is to create a much simpler facsimile of the original object using a subsample of the available 3D data—perhaps only a hundred polygons in the case of the tree trunk. The stereo imagery is then mapped or rendered onto this model in a way that exploits certain attributes of the human visual system (textural dominance and surface parallax) to create an effect which is extremely realistic to the human eye, but which requires far less computational power to render.

Initial tests have shown that a coherently stereo-textured model is (conservatively) 400 times more efficient at representing complex surfaces compared to conventional techniques. Even if future improvements in computational speed and power allow real-time capture and rendering of many millions of polygons, the invention can still be employed by such systems to yield even greater detail and fidelity. The benefits for lower-end systems, such as stereo-enabled gaming platforms, are even more obvious and immediate, providing them with the capacity to render 400 times the number of three-dimensional elements for the same computing power.

In essence, the invention radically alters the division of labor between the computer and the viewer. By using stereo imagery applied in a specific and coherent way to a greatly simplified version of the original object, a major portion of the processing work involved in visualizing realistic three-dimensional objects and surfaces is transferred from the computer to the human brain.

Existing stereo viewing systems, whether photographic or synthetically-generated, work by emulating the natural processes by which humans see three-dimensionally using binocular vision. However there are some significant differences between natural (real world) and artificially-induced stereoscopic perception, and these differences can cause serious headaches (literally) for those working in the field of stereo graphics. When we look at an object in the real world, our eyes swivel and rotate in their sockets to converge onto a single point of interest. At the same time, the lenses in our eyes change shape to focus on the object, a process known as "accommodation." With natural stereoscopic viewing, the systems of convergence and accommodation reflexively work together to bring into focus, and to enable stereoscopic fusion of, a point of interest.

However in the viewing of stereoscopically projected imagery, the apparent point and its associated convergence angles do not correspond with the distance that the lenses in the eyes would normally adjust to focus to. When the viewer looks at an apparent stereoscopic surface beyond the plane of the screen, the eyes rotate or swivel to positions as if the apparent surface is real. However, while the angles of convergence for the eyes are set to the apparent distance, the lenses in the eyes must focus to the actual distance—the plane of the screen.

There is a limit to the range of parallax which the brain can tolerate at one time, and beyond this threshold the brain can no longer effect stereoscopic fusion. For stereoscopically presented images on screen, the rule of thumb is that corresponding stereo points should be separated by no more than 1.5 degrees of angular difference. For larger values of surface parallax, there can be a break-down between view accommodation and convergence.

When the biological systems for view accommodation and convergence work together naturally by looking at objects in the real world, objects that are sufficiently in front of or behind the plane of interest tend to manifest themselves as double images. These double images are relatively blurry, as these parts of the images (on the retinas) correspond to object distances that are different from the current accommodated principal plane of focus. The mechanisms to effect stereopsis and achieve a three dimensional perception of depth are heavily reliant on high frequency visual texture, i.e., small grain textures and details and sharp edges. The neurological pathways for stereopsis generally do not respond to low frequency features created by out-of-focus blurry imagery. Therefore in the natural viewing system, objects that appear as double images tend to be blurry, and the brain does not find these blurry double images distracting as the neurological pathways for stereopsis are not invoked to any degree compared to sharp images of objects in the (depth) plane of interest.

However, when stereoscopic images are presented on screen, all of the imagery is sharply focused (by the projectors or CRT) at a single plane. While the eyes move to converge on the apparent surface of various points of interest, the lenses in the eyes are focused sharply at the screen. We therefore create an unnatural situation, where parts of the imagery that exceed the basic limits of stereoscopic fusion, (by virtue of containing large surface parallax values) are almost impossible to ignore, and become very distracting and fatiguing to look at. Either the neural pathways are forced to process stereo imagery containing higher degrees of parallax than would normally be accepted, or the neural pathways cannot cope and double images are perceived that are very difficult to ignore since they are sharply in focus. This can cause eye strain and headaches; in extreme cases, severe headaches and dizziness can even occur hours after the viewing event.

Thus the partial breakdown in the coordination of accommodation and convergence results in serious practical limitations to the length of time that observers can work with stereo presented imagery. Most synthetic stereo display and viewing systems (no matter how well they are configured) have severely reduced working times, ranging from twenty minutes to two hours, before stereoscopic fatigue is experienced. (This also assumes a perfectly configured system—other factors can further exacerbate stereoscopic fatigue, such as badly corresponding stereo points caused by Y parallax from various misalignments and uncorrected distortions of the imaging systems.)

The standard solution for reducing stereoscopic viewing fatigue is to render three-dimensional data sets with very small ranges of parallax, by selecting relatively small values for the base separation between the left and right virtual cameras (or viewing frusta). It is generally desirable to have the average position of the apparent objects close to the plane of the screen so that break-down between view accommodation and convergence is minimized. However, many 3D scenes and data sets can be of a large relative size, naturally incurring a large range of surface parallaxes. For example, there would naturally be a huge range of parallax in a simulation of large building interior if a virtual observer is positioned less than a meter away from a column in the foreground, while gazing out a window sixty meters away. In such conditions, the column may be perceived as a distracting double image. To mitigate these effects, the rendered viewing parallax can be further reduced by placing the virtual cameras closer together (reducing the horizontal base separation). However, this has the negative effect of greatly compressing the apparent depth of the whole interior scene. When this happens, fine three-dimensional detail is also compressed and the whole simulation appears artificially flat.

Standard (monoscopic) VR graphics that render a relatively small number of texture-mapped polygons tend to exploit the natural ambiguities of two-dimensional images that can feign surface complexity, as the dimension of depth is basically collapsed. When the same simple models or data sets are viewed stereoscopically, particularly for texture-mapped models, their crudeness and lack of modeling (due to low polygon counts) is completely betrayed, as it is possible to perceive three-dimensionally all of the flat planes that comprise the models. Secondly, monoscopically-rendered video games are very dynamic, with objects and the virtual camera in constant motion. This motion has a strong effect in creating a sense of depth through the well-documented phenomenon of motion parallax. This raises the issue of whether stereo displays using current technology will find widespread acceptance, since their safest modes of operation only provide slightly more compelling graphics than their monoscopic counterparts.

The invention provides a significant solution to the problems associated with the use of interactive stereoscopic display systems by the general public. Coherently stereo-textured models are very realistic and convincing, yet they remain within very safe ranges of viewing parallax. This is because the standard technique used to reduce the range of parallax in stereo VR simulations (moving the virtual cameras closer together) does not effect the stereo texture which is inherent in the model.

A conventional VR model consists of a three-dimensional object with a two-dimensional (monoscopic) image mapped onto it. They are most often viewed monoscopically, and there is no "stereo effect" inherent in the model. A conventional VR model only appears in stereo if a pair of virtual cameras are used to feed separate images to the left and right eyes via an appropriate stereo viewing device (stereo glasses, lenticular screen, etc.). In other words, the stereograms of the object are effectively taken as the information is fed out of the computer to the viewer. A coherently stereo-textured model differs fundamentally from a standard VR model in that the surface textures of the model are inherently stereoscopic. That is, the stereoscopy is an intrinsic part of the model, not just a function of the way that visual information about the model is output from the computer.

As discussed earlier, the CSTM uses a set of specially calculated zero parallax points to determine both the three-dimensional shape of the substrate and the way the stereogram is adhered to it. The degree of residual surface parallax in a CSTM is a function of the original camera positions (when the stereogram was taken) and the number and position of the zero parallax points which are used as polygonal vertices and as registration points for the stereo imagery. The residual surface parallax is inherent in the model and does not change, regardless of any changes in the base separation of the virtual cameras.

As mentioned above, conventional stereo VR applications can reduce parallax to tolerable limits by reducing the base separation between the (virtual) cameras which send the left and right images to the viewer. As a result, all apparent depth in the simulation is seriously reduced and the scene tends to appear flat and artificial. The same technique (reduction of base separation) can be used to reduce the overall, or "macro" parallax in a CSTM, but this will not affect the "micro" (residual surface) parallax, which is an inherent part of the CSTM. This allows the CSTM to retain a very rich three-dimensional appearance even when the overall macro parallax of the scene is severely reduced, something that is not possible via conventional techniques.

FIG. 14 shows a horizontal slice through the apparent surfaces of various stereo rendered models (looking top down). Compared to a conventional monoscopically-textured model, where the complex surface of the object is explicitly represented by a high density of polygons (14.01) the substrate of a CSTM is composed of far fewer polygons (14.02). The perception of depth in the apparent surface (14.03) of the CSTM is a function of the residual surface parallax in the applied stereo imagery. The models in 14.01 and 14.02 are illustrated as if rendered with a viewing parallax equivalent to 10 screen pixels.

When the viewing parallax is reduced to a safer and more comfortable value of 2 pixels, the fine three-dimensional features of the conventional model (14.04) are compressed in proportion to the rest of the model and much of the fine detail is lost, because most of the relative depths of the various fine features fall below a certain threshold for human stereo acuity (the smallest increment of depth that can be perceived). In this sense, the majority of the polygons used to represent the complex undulating topography of the conventional model are wasted, as their differences in depth are far too subtle to be perceived. However, while the macro features of the CSTM have been compressed (14.05), the micro topography from the apparent residual parallax surface (14.06) has not. Therefore, the fine three-dimensional features are clear and easy to perceive. Even if the base separation of the virtual cameras is set to zero (14.08), the three-dimensional texture of the apparent surface of the CSTM remains largely intact (14.09), while all features in the conventional model have been completely flattened (14.07).

The CSTM also allows control over micro parallax, using methods entirely separate from those used to control the macro parallax. The residual surface parallax in a CSTM is basically controlled by shape of the original object's micro topography and the base separation of the cameras used to record the original object. Therefore the apparent depth of the micro topography can be altered by selecting stereo pairs which employ different horizontal base separations, e.g., if one wishes to amplify the apparent depth of the micro topography in a CSTM, then the residual surface parallax can be increased by using stereograms with a larger base separation. For a complex object or scene that was created synthetically, by computer rendering and modeling software, it is possible to pre-render a set of stereograms with varying base separations or to render a new stereogram on demand to be processed in real-time and incorporated into the CSTM of the original object. Changes in the frequency and distribution of zero parallax points and vertices in the polygonal mesh can also increase or decrease the degree of residual surface parallax, hence amplifying or reducing the apparent depth of the surface features on the CSTM.

In essence, the micro parallax of a CSTM is manipulated by controlling the degree of parallax that goes into the model by controlling the base separation of the original cameras (as well as the number and distribution of zero parallax points), while the macro parallax is manipulated by controlling the base separation of the virtual cameras that feed the stereo imagery out to the viewer. The CSTM is the only VR modeling technique that allows independent control of macro and micro levels of surface parallax.

From experimental observations of displaying CSTMs in very safe ranges of viewing parallax, it has been found that because the surface appears so rich and compelling in three-dimensional detail, the observer is much less aware of the deliberate compression of the macroscopic features. Effectively the model has been optimized to completely fill the safe ranges of parallax. Standards for quantifying stereoscopic fatigue and user time have yet to be established. However, comparison tests were carried out for data sets created by the author using stereograms of a complex architectural subject. The comfortable viewing time for the original stereograms when stereo projected onto an eight-foot-wide screen was in the range of twenty minutes to one hour, whereas the CSTM constructed from the same stereogram allowed comfortable viewing for between one and four hours. CSTMs generally have a very life-like appearance and are clear and comfortable to view.

This has obvious implications for stereo film and television. Stereo film and television presentations suffer from the same problems mentioned above, with simultaneously large ranges of viewing parallax when the recorded scenes contain large ranges of spatial depths from foreground to background. Stereo filmmakers generally err on the side of visual impact rather than viewer comfort, as it is assumed that the individual viewers will only be watching the stereo presentation for a short time. However, as noted above, if the degree of parallax is too great, eye strain and headaches can occur within a short period of time, and can even begin hours after the viewing event. A solution to this problem is even more critical if stereo television is to ever find widespread acceptance, as viewers must be able to watch for prolonged periods without fatigue.

In the case of stereo movies, CSTMs can be used to optimize the ranges of viewing parallax for the stereo presented imagery. This would involve digitizing and generating polygonal substrates for various sets of stereo pairs. Naturally, for a given scene, the stereo cameras will move around in different ways (pan, tilt, zoom, dolly etc.) or present completely different shots of the same scene. Therefore polygonal substrates generated may only suffice for a single pair of stereo frames, or may have extended utility with only minor additions or modifications for an entire film sequence.

The substrates could be generated by manual plotting of stereo corresponding points, or by automated means such as the use of various machine vision techniques, or any combination of the two. Normally these automated methods can produce noisy or spurious data from very dense three-dimensional feature extractions. However, in this case only a sparse number of points needs to be extracted, as the substrate required for parallax control need only be a fairly simple approximation.

With coherent stereo-texturing techniques, it is possible to re-render a plurality of presentation stereograms according to better or more comfortable viewing parameters that optimize parallax within a safe range, while preserving the appearance of fine three-dimensional features. This would allow stereo cinematographers to shoot with a relatively wide camera base separation to capture fine three-dimensional detail, then the macro parallax can be reduced without loss of micro detail by using CSTM technology before re-outputting the imagery to film.

Polygonal substrates can be created for stereo videographed scenes using methods similar to those described (above) for the re-sampling of raw stereo movies. The stereo videography can be carried out using multiple cameras at different base separations (a technique that is currently practiced for certain display devices). Here the data sets presented to the stereo television are the various sets of polygonal substrates and their associated streams of stereo imagery (in the form of texture maps with their corresponding sets of zero parallax points). In essence, the stereo television renders the texture maps to fill the frame and the polygonal substrates.

The basic processing power required to render simple polygonal substrates (for display resolutions similar to NTSC or PAL), would not be significantly in excess of that embodied by today's games consoles. Presentation of conventional stereo videography involves the playback of a stream of left and right frames, whereas stereo video using CSTMs involves the playback of stereo-textured polygonal substrates. The playback of streamed CSTMs provides the user with a number of unique features, including the ability to adjust both micro and macro parallaxes according to their own visual preference. The depth of macro features can be scaled according to comfort and visual impact without affecting the discrimination of high frequency elements and fine details. The user can also alter the amplification of apparent depths for the micro features, by selecting a different corresponding stream of stereo textured imagery. This is a useful feature, as every individual user has different stereoscopic viewing characteristics and capabilities. The user thus has complete control over optimizing the various parallaxes and is still able to remain within safe limits.

There is of course an additional, and perhaps more obvious, benefit to using CSTMs in this fashion: the viewer can select different positions from which to view the stereo movie. In other words, the viewer can decide where in the scene he or she would like to look from—essentially (within limits) "calling the shots" just as a film director might. The user can zoom in or out, view the action from different angles, or replay a given scene from a different position. Well-composed coherently stereo-textured models can tolerate differences in angular view of approximately +/−75 degrees without noticeable artifacts of stereoscopic shear.

CSTM technology is particularly useful when virtual sets are used, where actors and presenters are shot against a green or blue screen, and are then later composited (using digital chroma-key techniques) with computer-generated scenery. The use of computer-generated scenery would therefore allow a user of streamed CSTMs (derived from the virtual stage sets) to be able to view the scenes from a greater range of positions while the "live" action is still going on. In the case of streamed CSTMs derived from stereo videography, the mobility of the user may need to be restricted (depending on the number and positions of the original cameras and the complexity of the scene), to prevent the user from moving into parts of the scene that were occluded from the view positions of the original stereo video cameras, as holes or "data shadows" may occur in these areas. The use of virtual sets and scenery would largely eliminate this problem, allowing the user greater access to the virtual scene.

Streamed CSTMs could be transmitted to consumer stereo television sets (comprising an appropriate decoder and graphics renderer) via various internet or broadcast channels and technologies. The streamed CSTMs can also be stored on any of various removable media. The use of CSTMs would grant the ability to re-factor specially selected and prepared stereo videographed scenes into more fully realized and complete virtual environments. These specially prepared scenes would allow the viewer to experience a much greater variety of viewing positions and angles that do not reveal various imaging artifacts or data shadows.

For streamed or broadcast CSTMs, various compression schemes can be devised on the basis of human stereo acuity for various corresponding distances. Since the discrimination of various depths decreases with apparent distance, there is little to be gained by modeling CSTMs that significantly exceed the resolutions of depth that can be perceived. Vertices in a CSTM can be set to pre-defined depth values in the form of a look-up table that corresponds to the ranges of human stereo acuity. Special rendering hardware can be constructed to take advantage of the limits and parameters of human stereoscopic perception in order to define an efficient compression scheme for streamed CSTMs.

Streamed CSTMs derived from dynamic stereo content provide, for the first time, an ergonomically safe and computationally practical means by which the film or television viewer can effectively enter into the movie or program they are watching. The CSTM thus represents a major step towards the goal of realizing a practical convergence between standard linear narratives (such as movies) and interactive technologies (such as computer games) in a fully three-dimensional environment.

Practical Methods for the Creation and Operation of Coherently Stereo-Textured Models There are three primary methods for creating coherently stereo-textured models: image-derived, object-derived, and synthetically-derived. In the image-derived method, the data for constructing the three-dimensional substrate is derived from the stereo imagery. In the object-derived method, the data is derived from measurements taken from the original object by other means, such as laser theodolite measurements or 3D laser scanning processes. The third major process involves the creation of CSTMs from synthetically generated and rendered computer graphics models, and is basically a hybrid of the first and second processes, where the imagery for the stereogram (to be mapped) is synthetically rendered "inside" the computer.

The Image-Derived Method

This method is primarily applicable to the representation and display of complex real-world objects in a VR environment (i.e., on a stereoscopically-rendered, interactive 3D computer graphics system). The basic steps of this process are as follows:

1. A stereogram is taken of a three-dimensional object that is conducive to human stereoscopic viewing. If a film-based technology is used, the stereogram should be digitized by scanning. If a digital imaging system is used, then the imagery can be used directly.
2. The stereogram is loaded into a system that permits the plotting of stereo corresponding points. Ideally this would be a custom-built digital stereo plotting system designed specifically for the creation of CSTMs, such as that developed by the author. Alternatively, a photogrammetric workstation and software that permits stereo viewing and plotting of stereo corresponding image coordinates can be used or adapted.
3. While viewing the stereo imagery, stereo pairs of left and right points that are capable of representing the basic macro features of the object are selected and plotted.
4. Before the stereo plotted points can be converted into a 3D polygonal mesh, one must determine for the left and right cameras their spatial position and orientation and the effective calibrated focal length of the lenses used. Preferably camera calibration data should also be used, such as the radial and tangential distortion of the lenses, as well as the coordinates for the intersection point of the axis of the lens to the coordinate system of the image plane. Additionally, a 2D affine transformation needs to be found or determined for the conversion of the plotted vertices of the left and right meshes (in plotter coordinates) to image frame coordinates (i.e., the actual spatial x and y coordinates referenced to the original photo frames).
5. With the above parameters being known, it is possible (using standard photogrammetric equations, see Eqns 1.5-1.30) to calculate the location where corresponding stereo rays (projected from stereo plotted points) intersect in three dimensional space.

6. From the total set of calculated stereo ray intersection points, various groupings of individual points are selected to compose individual face sets of various polygons. In other words, each selected stereo ray intersection point becomes a vertex in the polygonal mesh, thus creating a zero parallax point when the imagery is applied to the substrate. The sets of derived polygons are used to represent the basic macro features and surfaces of the original object.

7. The left and right stereo imagery is composed and processed in such a way that the imagery can be mapped onto the surfaces of the polygonal substrate, preserving the original geometric projective relationship of the stereogram to the original stereo-recorded object. This is generally (but not always) carried out by applying the standard computer rendering technique known as texture mapping. The left and right images have to be decomposed into either a single pair of left and right texture maps, or a larger set of left and right texture maps (depending on the size of the imagery). A set of left texture mapping coordinates needs to be calculated, as well as a set of right texture mapping coordinates, to effect the correct stereo "projective" mapping.

8. The final step is to view and render the CSTM data sets on an interactive 3D computer graphics system capable of stereo rendering (i.e., a true VR system). Even using standard proprietary data and file formats for the CSTM, there are no commercially available software products that can render a CSTM. This is because commercial graphics software programs generally assume that 3D models have single sets of texture maps and texture coordinates. Therefore a special VR viewer application has to be created, as the author has done. (See below, *Rendering Coherently Stereo-Textured Models*.)

As its name suggests, the "image-derived" method uses data extracted from the original stereograms to determine the shape of the substrate. Since the vertices of the substrate must be placed so that they will function as zero parallax points when the stereo imagery (in the form of texture maps) is applied, it is necessary to determine the location where selected pairs of stereo rays intersect in three-dimensional space. However, even when a stereogram is physically projected into space (e.g., using an optical stereo projection system) it is not normally possible to see or experience where a projected pair of rays intersect. The intersection point must therefore be determined indirectly through the knowledge of certain parameters governing the ray geometry of the stereo imagery.

The position of the perspective center for a given camera can be determined by various photogrammetric calibration techniques. It is given as distance from the film or image plane, and is usually designated as being the "effective" focal length, i.e., the shortest distance from the image plane to the calibrated rear nodal point of the lens. In photogrammetry, the system is calibrated in such a way that it can be defined as a set of perfectly projecting rays. This is usually referred to as the "collinearity condition," which states that (a) a specific object point in three-dimensional space, (b) the perspective center of the camera, and (c) the image point corresponding to the object point all lie on the same tine in three-dimensional space. The equations that enforce this condition are usually referred to as the "collinearity equations" and many photogrammetric techniques are based upon these equations. (See the Equation section, below.)

Therefore, for each left and right image point, a mathematically-determined ray is projected from the image point through the respective camera's perspective center and out into three-dimensional space. Theoretically, the two projected rays should intersect in three-dimensional space in a location that is highly congruent with respect to the original object point (Eqns 1.5-1.30). This concept is illustrated in FIG. 10.

In some procedures for the creation of coherently stereo-textured models, a rigorous photogrammetric approach is assumed, i.e., well-calibrated equipment is used and the three-dimensional position and orientation of the left and right cameras can be determined, ideally with reference to a single external world coordinate system. (The orientation and position of the various camera stations can be determined by other photogrammetric techniques known as bundle adjustment, which generally concerns what is referred to as image restitution. These are common photogrammetric techniques, but are beyond the scope of this paper.)

It is possible to produce CSTMs even if rigorous photogrammetric techniques are not used, but various undefined elements and un-calibrated distortions may result in varying degrees of distortion in the polygonal substrate. In other words, the locations of the zero parallax points on the polygonal substrate may not correspond exactly to the location of the original object point in three-dimensional space. If necessary, these distortions can be corrected by various transformations on the polygonal substrate itself.

One method by which CSTMs can be produced even if precise camera data is not available is to have 3D control targets imaged in the frame of the stereogram. If the positions of the targets are known, then even if the orientation of the left and right cameras is unknown and the focal length of the camera is not known precisely, one can still construct a reasonable three-dimensional model and substrate. The stereo plotted points are used to calculate intermediate values for corresponding points in 3D space using arbitrary values for all camera and camera position parameters. These intermediate values are calculated using simple parallax equations, and are used to produce a scaled model that corresponds to the plotter coordinate system.

If the control targets are also plotted and converted into three dimensions then they represent a referenced set of control targets in the plotter coordinate system. It is therefore possible to calculate a 3D affine transformation, from the control targets referenced to the plotter system to the control targets in the real-world 3D coordinate system. The calculated 3D affine transformation can then be applied to the whole set of 3D plotter coordinate points so that they are transformed into the proper world coordinate system. The 3D affine transformation allows for separate scaling in the XYZ directions along with the regular rotation and translation parameters of a conformal transformation.

If the radial distortion of the lenses is compensated, then models of a very reasonable spatial fidelity can be achieved. The derived points are then used to form the surfaces of the polygonal substrate and the usual processes for the CSTM are carried out to calculate the correct texture coordinates. Basically, in this system, an intermediate set of 3D values is created in the plotter coordinate system which are then directly transformed into the real world coordinate system (via the control points) using a computed 3D affine transformation. This means that even though most of the relevant camera parameters were unknown, it is still possible to arrange the various elements so that the original stereo projective relationship of the imaging system is reasonably well preserved.

Even in the most rigorous approaches, however, it is possible to have stereo projected rays that do not perfectly intersect in three-dimensional space. Several mathematical approaches can be adopted that effectively determine the most "probable" location in three-dimensional space for the intersection of various stereo rays, using iterative least squares adjustment techniques practiced in photogrammetry and surveying. These types of corrections would be particularly relevant for models that contain multiple CSTMs derived from multiple stereograms of the same object—various arbitrary adjustments and statistical techniques (such as 3D least squares adjustments) can be applied to the model so that all of the pieces fit together properly.

The main principal of the CSTM is that each zero parallax point exists at the theoretical location in three-dimensional space where a pair of stereo corresponding rays intersect. Therefore even if the system is spatially ill-defined, a zero parallax point will still eliminate parallax at the surface of the substrate for that pair of stereo corresponding rays. What this means is that various models of varying degrees of spatial fidelity can be further distorted into new shapes and still function as CSTMs, as they still adhere to the principals governing CSTMs.

One of the most important things to get right in the creation of CSTMs is to take stereograms that are highly conducive to human stereopsis, since the main functional component of the system is a human viewer capable of stereopsis. It is therefore highly desirable to have stereograms which are taken such that the left and right imagery are coplanar, and that the principal axes of the left and right lenses are arranged so that they are parallel. Convergent systems are also possible but are more limited in application. Even if the stereo imagery is badly configured, it is still possible to resample the imagery, using a photogrammetric technique known as "epipolar re-sampling." This technique can transform the imagery in such a way that there is the minimum of unwanted Y parallax between left and right corresponding scan lines. However this processing step should be avoided, if at all possible, as it will result in further visual degradation of the CSTM.

Probably the fastest and most intuitive method of selecting the image points which will be used to define the substrate of a CSTM utilizes what is known as a digital stereo plotter. Using any standard stereo viewing apparatus, the operator employs a "stereo-cursor," which is essentially a target pointer that appears to float in the three-dimensional space of the displayed stereogram. The stereo cursor's apparent xy position is generally controlled via a mouse, while the apparent depth of the cursor is controlled via another device, such as a z-wheel or keys on the keyboard that will move the cursor in or out by various increments of depth.

The operator positions the floating cursor onto the apparent three-dimensional point of interest as viewed in the stereogram, then presses another key to plot a stereo or apparent 3D point at the location of the cursor. FIG. 15 represents a stereo plotting system, with a stereo-enabled viewing monitor (15.01), eyewear (15.05, 15.06) that feeds separate views to the left and right eyes (15.07, 15.08), an apparent three-dimensional object lying beyond the plane of the monitor screen (15.02), and a stereo cursor (15.09) to plot a point of interest on the apparent three-dimensional object. In reality the stereo cursor is composed of a left and right identical marker object (15.03, 15.04), and the screen parallax between the displayed left and right marker objects creates the sense of relative depth.

Each time a stereo point is plotted, the system records and displays a marker referenced to the left image's xy coordinate system, and also records and displays a marker on the right image's xy coordinate system. The stereo approach to plotting corresponding points can be very sensitive, to allow very sparse or indistinct visual textures to be plotted in three dimensions. For example it would be possible to plot geometries for stereo-imaged clouds and gasses, such as steam or smoke, whether imaged from real life or synthetically rendered on a particle rendering system. This would be very difficult to achieve on a digital mono-comparator.

FIG. 16 represents the general stereo imaging relationship between a fragment of a complex surface (16.01) and the left and right imagery of the associated stereogram (16.02, 16.03), including the effective calibrated focal length of the left and right imaging system (16.06). The images in FIG. 16 are represented as positive images, or what are known as diapositives. Normally when rays from three dimensional points project through the perspective center of an imaging system, the image formed in the camera is essentially flipped both horizontally and vertically. It is customary to present the images as diapositives (i.e., right way up) on a stereo viewing screen. The projective geometry of the diapositive is the same as that of the negative except for the fact that the diapositive lies in front of the perspective center on the imaging system as depicted in FIG. 16. The perspective centers for the left and right diapositives (16.04, 16.05) lie behind the plane of the imagery. This scheme shall be used for purposes of illustration since, once the basics are understood, it is much easier to represent the projective relationships between all of the various elements that compose the CSTM. This diapositive projective relationship is used in many photogrammetric illustrations and calculations.

FIG. 17 shows the progression of the stereo plotting processes used to create CSTMs. Normally the left and right images are sequentially superimposed using a rendering scheme known as "frame sequential stereo." LCD shutter glasses are used (such as CrystalEyes™ eye wear) that alternately show the left and right images to their respective eyes. This is carried out at a sufficiently fast rate that flicker is not apparent, and the imagery is viewed with apparent depth. The sequential superimposition of the stereo imagery allows for global image shifts of one image with respect to the other. Here horizontal screen parallax can be globally controlled to optimize the apparent object in the view frame, so that the object appears relatively close to the plane of the screen. In the diagrammatic representations for the stereo imagery and the associated processes for the creation of CSTMs, the stereograms are shown side by side, although in the actual interface they are normally rendered as a sequential superimposition of the stereo imagery on the view screen or monitor, with only a minor global horizontal shift of the left and right images with respect to each other.

The left and right digitized stereo images (17.01, 17.02, shown side by side) are presented and sequentially rendered to the left and right eyes; the brain fuses these into a single three-dimensional image of the apparent surface of the original stereo-recorded object (17.03, 17.04). Specific points are selected and plotted on the apparent three-dimensional surface using a stereo cursor (17.09, 17.10), which is perceived as a single floating object. For each point plotted in apparent three-dimensional space, a pair of corresponding points is simultaneously plotted on the left and right images (17.05, 17.06). Other stereo corresponding points are plotted in locations that seem to enable the definition of the basic macro features of the stereoscopically perceived object. Marker objects are created to represent the positions where the points were plotted. These plotted markers correspond to stereo plotter coordinates which in turn are referenced to the original image coordinates.

There are various additional steps, outlined below, involved in the creation of CSTMs. However, while it may be possible to carry out some of these steps on a conventional digital stereo photogrammetric workstation and software, one would be advised to create a custom stereo plotting interface. What follows represents the way the author has constructed CSTMs for the image-derived process, but other methods may be possible by re-factoring existing photogrammetric software. The prototype software that the author created to build CSTMs shall be referred to as the prototype CSTM plotter.

In the prototype CSTM plotter, various sets of previously stereo plotted points are selected to compose triangular polygonal surfaces (17.07, 17.08). This is currently accomplished using manual point selection techniques to compose individual polygons. Generally the polygonal representations used for the CSTMs tend to be very compact and efficient. Standard automated triangulation algorithms have difficulty in connecting the correct 3D vertices together to form the appropriate surface, as the automated algorithms do not know what surfaces are actually intended, since many surfaces are possible from a single set of 3D vertices (especially for very efficient representations of a given surface).

In the prototype CSTM plotter, the connectivity or face sets of the vertices are represented by physically drawing or rendering various triangles superimposed onto the rendered stereograms (17.07, 17.08). A single polygon for example is rendered orthographically to the screen, and the values for its vertices are extracted from the positional information corresponding to the left or right plotted points. The selection of previously plotted stereo corresponding points to define a triangular polygon is carried out stereoscopically using the stereo cursor. Therefore for each grouping of three pairs of left and right corresponding points, a pair of left and right triangles is created. The left triangle is presented on the left image and the right triangle is presented on the right image.

These 3D triangles are orthographically rendered so that they are in effect flat, in the same plane as the viewing screen and the stereo imagery. The left and right sets of triangles are therefore automatically composed into left and right corresponding flat meshes. The vertices of the flat meshes contain the same image parallaxes as their corresponding plotted vertices or stereo markers. Therefore, the flat stereoscopic meshes in fact have a three dimensional appearance that precisely stereoscopically overlays the stereoscopically perceived complex object. The left and right flat meshes are rendered as wire frame models, so that only their edges are apparent and the stereo imagery is not occluded.

The next set of processes involves the creation of a three-dimensional polygonal substrate from the left and right flat meshes (18.09, 18.10). FIG. 18 represents the relationship between the plotted stereo points, the vertices of the respective flat meshes, and the original image coordinates referenced to the original left and right image frames (18.01, 18.02). As mentioned above, using standard photogrammetric techniques it is possible to calculate the three-dimensional position in space for a point that corresponds to the left and right stereo points from a pair of corresponding flat meshes. This is calculated from the X and Y coordinates of the left and right stereo corresponding points (18.03, 18.04) and from a known set of imaging parameters that include the interior and exterior orientation for each left and right camera station (18.07, 18.08).

Computationally, what is done is to create a duplicate copy of either the left or right flat mesh and to store it in memory (i.e., this third mesh is not displayed). The values comprising a single pair of stereo corresponding vertices in the stereo meshes are converted from the plotter coordinate system to the true image coordinate system using a pre-computed two-dimensional affine transformation. The true image coordinates may then be adjusted for radial distortion and other calibrated offsets and systematic errors (Eqns 1.30-1.31). The pairs of adjusted image coordinates are used to calculate the three dimensional position in space of the projected stereo rays.

The computed three-dimensional X, Y and Z values are then assigned to the corresponding vertex on the third mesh. This is carried out systematically for all the vertices of the left and right stereo "flat" meshes until a new three-dimensionally shaped mesh is created. This therefore means that the three-dimensionally shaped mesh is of exactly the same structure as that of the two stereo flat meshes. FIG. 19 illustrates the construction of the 3D mesh (19.10) from the left and right stereo flat meshes (19.11, 19.12).

When the original stereo plotted points are selected to compose individual triangles, automatic algorithms are used to order the vertices in a spatially anti-clockwise manner irrespective of the order in which the vertices are connected. This is done for two reasons: (1) to enforce a consistent system so that all of the vertices between corresponding meshes genuinely correspond with each other and (2), if all the vertices of all the triangles are ordered in an anti-clockwise manner their vertex-normals for the planes of the polygons will point outwards (towards the viewer) and will hence not be rejected by the rendering software as a disparate set of backwards-facing polygons. This is also important because polygons that face the wrong way cannot be texture mapped, or for them to be made visible requires double-sided texture mapping, which is very inefficient. (Certain special effects that can be generated by texture mapping the reverse faces of the polygonal substrates of CSTMs are discussed below.)

Once the polygonal substrate has been created it is necessary to carry out the third major set of processes that determine how the left and right stereo imagery can be mapped correctly onto the surface of the substrate. The enabling schemes for the preferred embodiments of the invention mainly cite the use of the standard 3D computer graphics process known as "texture mapping" as the primary practical method by which the imagery is applied to the substrate for real-time applications. However there are other schemes that can render, apply and sample 2D imagery that do not use pre-defined texture maps, e.g., an "off-line" rendering scheme. The off-line method of rendering is currently applicable to embodiments of the invention that are used as various physical hardcopy outputs for the CSTM (discussed in greater detail below).

Generally, real-time systems and their associated graphics hardware (i.e., a graphics card with dedicated texture memory) more readily accept arrays of images (i.e., texture maps with arrays of texture elements, commonly referred to as texels), whose linear number of elements in terms of width and height correspond to powers of 2. The maximum dimensions of an individual texture map is typically 1024 by 1024 elements (texels). In the application of the invention, if the individual left and right stereo images are relatively large, then they need to be decomposed into various subsets of overlapping tiled images that comprise a set of texture maps. However, in off-line rendering schemes, individual texture maps do not need to be defined, and the correct sampling of the imagery is carried out on the left and right images as a whole. (Future developments in graphics hardware technology may well obviate the need to create pre-specified arrays of texture maps of standard pixel dimensions; the use of texture mapping is therefore presented as one possible set of principal enabling steps for particular embodiments of the invention.)

Assuming one is employing the technique of texture mapping to implement the invention, there is a set of left texture maps and a set of corresponding right texture maps. For illustrative purposes, a single pair of texture maps will be used. FIG. 20 shows the left and right stereo images (20.01, 20.02). The left and right corresponding texture maps are created by sampling a rectangle (or square) of pixels as a pair of sub-images that are stored as image arrays (20.03, 20.04).

The standard method of mapping texture imagery onto an associated polygon or set of polygons is by using a special set of two-dimensional mapping coordinates, commonly referred to as 2D "texture coordinates." For a given polygon, each vertex is assigned a pair of (U,V) texture mapping coordinates. For a set of three vertices (used to construct an individual polygon in the derived 3D substrate), the 3D vertices have a set of corresponding two-dimensionally plotted points on the left and right imagery. The positions of these plotted image points naturally correspond to the extracted polygonal vertices, by virtue of the initial perspective projection created by the cameras that were used to capture the original stereogram. The 3D polygon, therefore, is naturally projectively mapped into two-dimensional image space, and will also (if arranged correctly) be projected within the boundaries of a particular texture map.

It is therefore a simple matter to convert the two-dimensional plotted coordinates for the projected polygon into texture-mapping coordinates, assuming the spatial position (20.07, 20.08) of the sub-rectangle of pixels that constitute the texture map is defined or known. Generally, texture coordinates are of a parametric form, meaning that the values for the position of an individual texture coordinate are scaled from 0 to a maximum value of 1. FIG. 20.05 shows the position of a left plotted image point. Here it can be seen that the X and Y coordinates of the image point (20.05) correspond to U and V coordinates within the frame of the texture map (20.03). Relative to the position of the left texture map, a left set of texture coordinates are calculated for the plotted left hand image points. Similarly a set of right hand texture coordinates are calculated from the positions of the right hand stereo plotted points with respect to the position of the right texture map in the right image. We now therefore arrive at a complete set of elements from which a CSTM can be composed or rendered.

The complete minimum set of elements is a three-dimensional substrate, a left texture map with an associated set of left texture coordinates, and a right texture map with an associated set of right texture coordinates. Normally the texture coordinates are assigned to the individual vertices of the geometry or substrate. However most real-time rendering systems and graphics software do not provide an easy interface or access to the geometry database to allow two sets of texture mapping coordinates to be assigned per vertex. There are ways around this problem, and the rendering and assignment of texture coordinates is dealt with in more detail in a later section (Rendering Coherently Stereo-Textured Models).

In a conventional system (presenting standard VR models), a single texture map and a single set of texture coordinates would be used to map the corresponding image back onto the three-dimensional substrate or geometry (FIG. 21). The relationship between the texture coordinates and the substrate are such that the imagery is mapped onto the substrate as if it had been projected. With this conventional scheme, when the model is stereoscopically rendered in a VR system it generally has a crude appearance unless a high density of (computationally burdensome) polygons are used to effect a reasonable representation of the complex surface.

In the coherently stereo-textured model, the left and right stereo imagery is texture-mapped onto the substrate as shown in FIG. 22.0; the substrate is shown as it would appear without being stereo viewed (i.e., with images overlapping rather than fused). As discussed in the previous section, the vertices of the substrate act as zero parallax points, eliminating surface parallax for pairs of projectively mapped corresponding image points. For pairs of image points that do not intersect perfectly at the surface of the approximate substrate, the larger portion of their surface parallaxes are eliminated, but there is still some three-dimensional surface parallax that remains. These residual surface parallaxes form a continuous and contiguous set of apparent points, which are capable of representing the fine three-dimensional features of the original complex object.

As mentioned above, the texture maps are applied to the polygonal substrate as a real-time process during the rendering and viewing of the CSTM geometry. Even using standard proprietary data and file formats for the CSTM, there is no commercially available software that can render a CSTM, since most commercial graphics software assume that three-dimensional models have single sets of texture maps and texture coordinates. Therefore a special VR viewer application has to be created. (See *Rendering Coherently Stereo-Textured Models* for further detail in this regard.)

One of the less obvious aspects of the texture mapping used in the CSTMs is that through the use of texture mapping coordinates, it is possible to enforce the original projective relationship between the extracted zero parallax points and the corresponding image points in the left and right images of the stereogram. In other words, the true projective relationship is maintained for all image points that are projected onto the surface of the substrate, whether or not they have specific U,V texture mapping coordinates created for them. In effect as the polygons are rendered to the view screen (or port), the screen image points that correspond to the image points in the texture imagery are correctly sampled and calculated in real-time. The individual mapping coordinates for an individual polygon's vertices are used as an accurate guide, from which all other texture image points can be correctly sampled to fill in the entire area of the polygon, scan line by scan line, as the polygon is rendered.

FIG. 23 illustrates this basic relationship between screen space (23.04), the 3D polygon to be textured (23.02), the position in 2D texture space (23.09) for the projected polygon (23.08), and the sampling of intermediate texels (texture pixels) to fill the whole polygon. It can be seen that the three-dimensional vertex (23.10) of the polygon corresponds with the mapping coordinates (23.17) in the texture map (23.09). This mapping coordinate also corresponds to the left hand component of the image point that was stereo-plotted on the imagery.

The 3D vertex, its corresponding texture coordinate (and therefore its plotted image coordinate) and the perspective center (23.07) of the left image (23.06) (and hence the texture map) all lie on the same line in three-dimensional space and are said to be collinear. There is therefore a true projective relationship between the texture coordinates and the 3D vertices of the texture-mapped polygon. Similar correspondences also exist between the other vertices of the 3D polygon and their corresponding 2D texture mapping coordinates, (i.e., 23.11 to 23.16, and 23.12 to 23.18).

The projected position (23.03) of the 3D polygon into 2D screen space (23.04) is governed by the position of the virtual camera's perspective centre (23.05). The same vertices of the polygon in 3D space have corresponding mapping points that effectively project into 2D texture space, defining a second theoretical polygon (23.08). In a second diagram showing the same arrangement, FIG. 24 shows the position of a current rendering scan line (24.01) in screen space. When rendering occurs, the color values for each screen pixel are calculated. When the view projection for a particular screen pixel effectively "strikes" a polygon, it is then a question for the rendering hardware and software to determine what set of color values that the corresponding screen pixel should be turned to. The rendering engine will determine that the screen pixel in question corresponds to a polygon that has been designated as one that must be texture mapped.

Effectively, an individual pixel (24.11) on the scan line is projected into 3D space to determine where it would project onto the 3D polygon (24.12). The rendering system then calculates the correct corresponding location of the 3D-projected 2D pixel (on the polygon) to its correct corresponding location in 2D texture space (24.13). Although there are many technical texts on 3D computer graphics, very few show the specific equations and algorithms to accomplish the required transformation and sampling of the texel data, as it is often only carried out on specialized hardware. Often what is shown is a direct linear interpolation of the screen space coordinates of the projected polygon directly into texture space (similar in fashion to the standard shading technique known as Gouraud shading). However, this transformation is incorrect for our purposes, as the texture image points would be incorrectly mapped.

There is a more correct method for texture rendering, sometimes referred to as "perspective texturing," and this is the technique to be employed for best results. CSTMs could be rendered using the computationally less expensive direct linear transformations (from screen space into texture space), but they would have a visually distorted appearance (perhaps something that could be used for lower-end graphics). One can see from FIG. 24 the correspondence from the 3D polygon into a 2D triangle on the texture map. Many different algorithms could be used to effect the correct texture mapping, but it is possible that the 3D triangle can be considered as a 2D flat triangle (in its own plane) that has 2D vertices corresponding to the 2D texture coordinates in 2D texture space.

It is therefore possible to calculate a 2D affine transformation for the 3D polygon (referenced to its own plane as a 2D triangle) to convert it from its own planar space to the 2D planar space of the texture map. In other words, the transformation is calculated from the three vertices of the polygon (in their own 2D planar space), to the three corresponding texture coordinates. Once the basic affine transformation has been calculated, it is possible to apply the same set of transformations for all the calculated screen pixels (that have been projected onto the 3D polygon). The specific algorithms for this are somewhat illusive and are generally of a proprietary nature, but nevertheless it is shown that it is definitely possible to calculate the correct point or set of points that need to be sampled in the texture map. Experimental results have confirmed that these sampled texture points are indeed correctly determined, at least for the technique of perspective texturing.

Sampling of specific values from the texture map can be carried out in a variety of ways. Probably the best method, in terms of visual quality, is tri-linear interpolation, a well-known technique in 3D computer graphics. This means that all of the sampled texels (texture pixels) between the specified texture coordinates also adhere to the projective relationship originally created by the left image and camera. In other words, the texture mapping is calculated in such a way for all texels that there exists a virtual perspective photographic center. However, the texture mapping does not use the positional information of the original perspective center for the left image or texture map, it only uses the defined corresponding texture coordinates of the 3D polygon. This true projective mapping for texels that do not have explicit texture coordinates created for them is further demonstrated by projecting a ray from a corresponding point on the surface of the stereo-recorded object (24.19) to the perspective center (24.10) of the left image from the original stereogram. It can be seen that this ray passes through the corresponding point (24.12) on the substrate's surface and the point for sampling texels on the texture map (24.13). This sampling can be carried out by the rendering engine without any direct knowledge of the original object point or the 3D position of the perspective center of the left image.

The general mechanism by which the correct texture mapping is implemented shall be referred to as having the texture coordinates and texture rendering calculated in such as manner as to preserve the original projective relationship and geometry between the extracted 3D vertices that form the substrate and the stereo corresponding left and right image points. The correct mapping of all the texture imagery is an important feature as it allows the extraction of accurate three dimensional measurements from the apparent surface of the CSTM (discussed in detail below).

The Object-Derived Method

In this process, the substrate is composed of 3D data derived from measurements of the object itself, rather than from the stereogram that was used to record the object. This three-dimensional data can be gathered from a variety of sources, such as hand measurements, plans, diagrams, laser theodolite mapping, laser rangefinder scanning, etc. The derived points, which will function as zero parallax points, are used to construct the vertices of polygonal face sets or meshes. The relative orientation of the stereograms to the object of interest should be known. The orientation of the independently derived 3D data should also be known to a common reference frame for the original object and the camera stations that captured the original stereogram.

It is then therefore possible, using standard projective transformation equations (Eqns 1.1-1.4), to project the 3D meshes, or their 3D vertices into the 2D image space of the left and right digitized images or photos. A set of 2D corresponding left and right image coordinates will be generated by this process. A set of texture maps can be defined for each left and right image. Therefore it is possible to convert the 2D corresponding left and right image coordinates into texture coordinates referenced to their respective texture map's position in the larger imagery. The whole compliment of data sets needed for a CSTM have then been created: one three-dimensional substrate, a left set of texture coordinates and texture maps, and a right set of texture coordinates and texture maps.

The basic methods for implementation, creation, and rendering are very similar to the methods described above for the image-derived process. Certain data sets, such as very dense or unwieldy point cloud data from laser scans, can be down-sampled to effect a much more efficient representation as a CSTM. Laser point clouds can contain many millions of points, the majority of which could be discarded, as all that is required for the CSTM is a substrate that represents the basic macro features of the object. The point cloud could be edited into a set of points that best represent the macro features of the object by stereoscopically superimposing the projected 3D points onto the stereo imagery. Laser scans frequently contain many positional errors, so any laser 3D points that do not occur on the apparent surface of the stereo viewed object could be edited or removed.

Generally, higher spatial precisions can be achieved for specific features using photogrammetric techniques, as compared to the general under-sampling of a large number of 3D points generated by laser scanning. Better points and edges of various features could be manually plotted in the same environment as the displayed stereoscopically superimposed 3D-projected laser-scanned points.

One potential problem with the object-derived process is the difficulty in achieving an exact "fit" between the substrate and the stereograms, since the data used to generate the vertices of the substrate are not derived from the stereograms themselves. Various adjustment techniques could be implemented to effect a more favorable fit. The main advantage of the image-derived method is that the substrates and the stereo plotted image coordinates always make a perfect fit.

Also, despite the fact that the image-derived process is primarily a manual technique, it is generally much faster at making very clean and compact polygonal substrates from very complex data sources than automated techniques such as 3D laser scanning or autocorrelation methods used in machine vision and photogrammetric systems. This is a key point, and again it represents a fundamental shift away from conventional techniques in building 3D models, which tend to assume that improvements in speed and accuracy are reliant on the continual development of faster and more powerful computer processing tools. There are some things the human brain can do much more efficiently and accurately than a computer can, and in both the creation and rendering of CSTMs the division of labor between human and computer is significantly altered to exploit what each does best.

The Synthetically-Generated Method

This method refers to the creation of CSTMs from synthetically-generated computer graphic models and renderings (e.g. models made in a 3D modelling and rendering program). This technique is essentially very similar to the image-derived process, except that the stereogram of the original object is taken with a virtual camera (or cameras) in a 3D modeling or graphics program. If the stereo rendering of a pair of left and right images is created, then these can be used in exactly the same way as the image-derived process for the creation of a CSTM. However, since the stereograms are used to "record" a synthetic computer graphics model, most of the data that is needed to create the CSTM already exists in the model itself.

In the 3D modeling and rendering environment it is possible to create very complex surfaces composed of many millions of polygons, and have many different complex rendering and particle and lighting effects applied to them, including data sets that cannot be rendered in a real-time fashion. Once the virtual stereogram has been taken, it is then possible to directly extract the underlying geometry of the 3D rendered model for use as a polygonal substrate in the CSTM. If the model contains many polygons it is possible to execute various polygon reduction and optimization techniques, so that the only the basic and most important macro features of the object are represented in the substrate. The result of this process is to produce a set of polygons or meshes that act as the polygonal substrate of the CSTM.

The vertices of the 3D mesh or objects can be projected (using standard projective transformation equations, see Eqns 1.1-1.4) into the effective view frames of the rendered stereograms. (The transformation matrices for the stereo viewframes are already known to the rendering system). The stereograms can then be decomposed into various tiled and overlapping texture maps, as described for the image-derived process. The projected 3D vertices give rise to a set of 2D image coordinates on the left and right images of the stereogram, which can be converted into the required texture coordinates referenced to their respective texture map. It is therefore a fairly quick and efficient process to create the full compliment of data sets needed for the CSTM: a polygonal substrate, a left set of texture coordinates and texture maps, and a right set of texture coordinates and texture maps.

For computer games, many particle-based rendering effects can be converted into CSTMs, such as miasmas, water, fire, and explosions. It should also be noted that the stereo plotting interface for the image-derived process makes a very efficient method for creating computer graphic models of real-world objects that would otherwise be very difficult and time-consuming to explicitly model from scratch.

Re-Sampling of Volumetric Data to Produce CSTMs

There are other three dimensional techniques used in computer graphics to effect three-dimensional representations. One such method is to use volumetric imagery, such as that created by CAT and MRI medical scans. Here the imagery is created as slices through a solid object, with each slice composed of a two-dimensional array of image values. When the flat planes of imagery are stacked on top of each other and rendered, a volumetric representation is produced. Instead of pixels, one has voxels. Using methods similar to those for synthetically-generated CSTMs, volumetric data can be re-sampled to create a CSTM. Here left and right virtual cameras are used to image the volumetric data from specific relative positions. The CSTM can be then be created using the image-derived process.

Alternatively, if a suitable method of sub-sampling the 3D positions of a special subset of voxels is provided, then the CSTM can be created using techniques similar to the object-derived method. Various stacked layers of volumetric data can be set to varying degrees of opacity or transparency. Alternatively each layer of pixels can be represented as an array of slightly spaced 3D dots, which permit the viewing of lower layers from various angles. CSTMs created from volumetric data may provide an efficient method for representing complex volumetric data across the internet. A stereo-enabled internet browser could be configured to display CSTMs, allowing the transmission of small data sets that represent very complex models when viewed, and which would otherwise be too data intensive to transmit, process, or view.

Rendering Coherently Stereo-Textured Models

Depending on the rendering hardware and software used, the basic data sets that comprise the CSTM may be utilized in a number of different ways. The schemes adopted mainly assume what is known as a "frame sequential rendering mode." In frame sequential stereo, the left and right rendered views are presented on screen alternately. With the use of special eye wear such as LCD shutter glasses (e.g. Crystal-Eyes™), it is possible to present the correct rendered left and right views to their respective eyes without flicker or cross-talk.

In the CSTM rendering scheme, the basic principal is to map the left texture map to the polygonal substrate when the left view is rendered in the VR system, and then to apply the right texture map to the polygonal substrate when the right view is rendered. For most CSTM viewing processes, two sets of texture coordinates are required. Texture coordinates really belong to the geometry and not to the texture map. Many people think of the texture map as being "glued" to the model before it is rendered, but in fact texture mapping is a real-time process and the imagery is only applied to the geometry as it is rendered, using the mapping coordinates stored or assigned to the particular sets of corresponding vertices.

However, the author knows of no commercially available software which allows the assignment of two texture coordinates to a single polygonal vertex. One solution to this problem (besides developing specialist software) is to create two identical polygonal substrates, one designated as the left substrate and one as the right substrate. In this scheme, the left substrate's vertices are assigned the left set of texture coordinates, and the right substrate's vertices are assigned the right set of texture coordinates. The left texture map is then assigned to the left substrate, and the right texture map is assigned the right substrate. The left and right substrates are made to occupy exactly the same position in three dimensional space when rendered; however, when the left eye view is rendered the right substrate is turned off (via a switch node capable of fast geometry rejection) so that only the left data sets are visible to the left eye, and when the right eye view is rendered, the left substrate is turned off. In other words, the left and right data sets are always in computer memory, but it is just a case of alternately changing various settings to enable or disable their rendering.

Other rendering schemes are also possible where only one set of texture mapping coordinates is used. This can be accomplished by a variety of means; one such method is described below. (For a general discussion of monoscopic methods of image warping, see Crane, R., 1997, *A Simplified Approach to Image Processing*, pp. 203-244, Prentice Hall, Upper Saddle River, N.J.; and Kilgard, M., 1996, OpenGL Programming for the X Window System, pp. 207-216, Addison-Wesley Developers Press, Reading, Mass.)

Once a CSTM model has been created, using any of the methods outlined here, the values of the mapping coordinates of one image (the right image, for purposes of illustration) or some function of those values are used as spatial coordinate values to define the location in space for the vertices of a new (intermediate) flat substrate. The mapping coordinates used to map the right image onto the original substrate are assigned to the corresponding vertices of the intermediate substrate with the purpose of mapping the right image onto the intermediate substrate.

The mapping coordinate values of the left image, or some function of these, are used as spatial coordinate values to change or redefine the previously set spatial positions of the vertices of the intermediate flat substrate. The intermediate substrate is then rendered using an orthogonal view projection or is resampled at the same scale and resolution of the left image to produce a new right image, which is now warped so that the right image's plotted stereo corresponding points fit the left image's mapping coordinates.

The resulting data sets are organized so that the left image's texture coordinates are assigned to the vertices of the original three-dimensional substrate. When the resampled CSTM is stereo-rendered, the left image is applied to the original substrate using the left set of mapping coordinates, and the newly warped right image is also applied to the original substrate using the left image's mapping coordinates, which were originally assigned to the vertices of the original substrate.

This presents a very efficient rendering solution (e.g., for gaming applications), but the warping of the right image will degrade visual quality overall. It is also possible to have a rendering scheme where one polygonal substrate is used, and the left and right texture coordinates are dynamically assigned to the vertices for when the corresponding eye view is rendered. This technique may prove less efficient for large models. For dual pipe rendering systems that employ the technique known as dual passive stereo rendering (rather than frame sequential stereo), the dual model/dual texture map approach may be more useful.

The four main rendering schemes for CSTMS may thus be characterized by the number and relationship of the component parts, as follows:
1. Two substrates, two sets of texture coordinates, two texture maps, used for frame sequential rendering
2. One substrate, two sets of texture coordinates, two texture maps, used for frame sequential rendering
3. One substrate, one set of texture coordinates, two texture maps, used for (lower-end) frame sequential rendering
4. Two substrate, two sets of texture coordinates, two texture maps, used for dual pipe passive stereo rendering A novel and useful effect can be achieved with CSTMs if the stereo texture mapping is carried out on both sides of a given polygonal substrate. Double-sided texture mapping can usually be enabled using high-level rendering commands. Assuming a CSTM that is comprised of a non-enclosed surface, it is possible to move to the back of the surface (in the VR environment) and effectively perceive the "inside out" surface of the CSTM. In other words, if the front surface was of a face, double-sided texture mapping might allow the viewer to walk around the image and look out through the back of the face. Here the texture imagery is applied as if it was painted on a glass surface of negligible thickness. This means that what was once positive relief now becomes negative relief and vice versa. This can be useful for the interpretation of dense complex features. This technique is analogous to the standard photogrammetric stereoscopic technique of creating a pseudoscopic stereogram where the left image is replaced with the right, and right image is replaced with the left.

Forced Convergence

Once a CSTM has been created by one of the processes outlined above, it can be subjected to further modifications, such as distorting or transforming the polygonal substrate into different shapes. It is assumed that the CSTM used is one that initially conforms to the natural stereo projective geometry of the original stereogram (i.e., the zero parallax points are positioned at the natural stereo intersection of the corresponding stereo rays). The deformations of the substrate are carried out by changing the individual values of the vertices that compose the polygonal substrate. Because the texture coordinates are assigned to the polygonal substrate it is possible to deform the substrate's mesh and still have the texture imagery correspondingly mapped to the surfaces. In other words, the stereo corresponding left and right points are still made to converge at the zero parallax points even though the substrate is distorted into a new shape.

It is useful to think of the stereo corresponding points being "forced" to converge at the zero parallax points on the surface of the substrate, rather than thinking of the zero parallax points as being positioned at the natural intersection points (in 3D space) of the stereo rays. FIG. 25 illustrates this concept: FIG. 25.01 is a cross-sectional view of a CSTM substrate created by the image-derived process, FIG. 25.02 shows the position of the apparent surface (created by the perception of residual surface parallax), and FIG. 25.03 shows the position of one of the zero parallax points. When the substrate is flattened (25.06) by changing the values of its 3D vertices, the residual surface parallax still functions to create an apparent 3D surface, but it has been distorted along with the substrate (25.07). The flattened CSTM is distorted into a new shape (25.09), and the apparent surface features from the residual surface parallax have again been distorted accordingly (20.08). Thus, complex surfaces can be recorded using the image-derived technique and can then be further edited and modified to suit specific needs, where CSTMs can be combined with other 3D and modeling data.

Another approach to deforming CSTMs eliminates the step of creating a 3D substrate conforming to the natural stereo projective geometry. For example, in the image-derived process one plots stereo pairs of points which are turned into corresponding left and right flat meshes. It is then possible to copy either the left or right plotted mesh to form a new flat substrate for the CSTM. Texture coordinates for the left and right texture maps and imagery are calculated in the normal way (as described for the image-derived process). The texture coordinates are then assigned to the vertices of the copied flat mesh that acts as the polygonal substrate for the CSTM. What results is a flattened polygonal substrate for the CSTM, which still exhibits an apparent 3D surface, due to the residual surface parallax. This flattened CSTM can then be taken and further distorted into the required shapes. Here, stereo corresponding points are still "forced" to converge at the zero parallax points, without having to create an initial substrate that conforms to the natural stereo projective geometry of the original stereogram.

FIG. 30 illustrates the relationship between a CSTM that complies with the natural stereo projective geometry governed by the original stereogram (26.01), and with an arbitrary substrate (26.03) derived from the left image's flat mesh. The texture mapping is carried out using the same texture coordinates as that of the stereo ray compliant substrate (26.01), resulting in the same stereo image points being mapped to the same corresponding vertices (zero parallax points) on the arbitrary substrate (26.03). The effective new projective relationship is represented by the "imaginary" rays (26.06) that are "forced" to converge onto the arbitrary substrate. The fine and complex features of the apparent 3D surface of the arbitrary substrate are distorted accordingly (26.05). This arbitrary substrate can then be taken and further deformed into various shapes depending on the application.

The two methods for producing a distorted CSTM can be regarded as similar and related variants of the same principal for forcing the convergence of stereo corresponding points onto their respective zero parallax points in their respective substrates. However, the second method (creation of an arbitrary substrate from the left or right stereo plotted points) does not require the extraction of stereo ray intersection points from the original stereograms to compose the initial substrate. Conversely, the stereo ray compliant CSTM can be transformed into the same shape as the arbitrary substrate created from the left or right plotted 2D mesh.

Extraction of Accurate Spatial Measurements from the Apparent Surface of a Coherently Stereo-Textured Model Since a stereogram only represents a single view, a stereoscopic model will distort slightly as the observer moves relative to the viewing screen, a phenomenon known as stereoscopic shear. A certain degree of stereoscopic shear will still occur in a coherently stereo-textured model, although compared to a conventional stereogram the overall effect of shear is significantly reduced, just as the surface parallax is reduced, by the fact that the substrate is a much closer approximation of the original object than a flat screen or substrate would be.

In the VR environment, the direction and magnitude of shear is largely dependant on the relative position of the original cameras that captured the stereogram with respect to the position of the virtual stereo cameras in the simulation. For planar surfaces that face the original stereo cameras directly, an angular difference of +/−75 degrees between the virtual stereo cameras and the original cameras can be easily tolerated without noticeable shear. More complex objects can be recorded by several stereograms, so that surfaces that are very oblique to one stereogram can be imaged from more appropriate angles by another.

For metric or other very accurate embodiments of the invention (e.g., those using rigorous photogrammetric techniques), the zero parallax points remain in a constant position that accurately reflects the exact three-dimensional position of the corresponding point on the original object. This is true regardless of whether the zero parallax points are those specially selected to serve as vertices of the polygonal substrate or whether they are "coincidental" zero parallax points occurring between the vertices, where pairs of stereo rays happen to converge at the surface of the substrate. In areas where residual surface parallax occurs, there may be a very minor degree of shear. However, the apparent surfaces of the CSTM (i.e., the surfaces as they are perceived by the human viewer) still represent the same fine three-dimensional spatial frequencies of the complex topography found on the original object, and it is possible to extract accurate XYZ coordinates for the apparent point.

FIG. 27 illustrates the specific geometric relationships between the stereoscopically-sheared surface and the true position of the surface. An apparent point is viewed on the CSTM's surface at an apparent location P(a). Because of stereoscopic shear relative to the original positions of the left and right camera positions (27.04, 27.05) of the original stereo imagery, P(a) does not occur at the correct spatial 3D position of its corresponding point on the original object. By using a stereo cursor, represented as C(l) and C(r) on the left and right view frames (27.01, 27.02) of the stereo rendered images, it is possible to plot the position for the apparent point. Alternatively a 3D cursor object can be placed at the apparent position of P(a). Either way, it is possible to calculate the points where a left and right ray projected from the left and right virtual cameras' perspective centers, POV(l) and PoV(r), intersect with the surface of the substrate (27.03). These intersection points therefore give the 3D positions on the substrate for the pair of image points B(l) and B(r) that are projectively mapped onto the surface of the substrate from the left and right images (27.04, 31.05) of the original stereogram.

Assuming the orientation and position of the left and right camera stations are known for the left and right imagery, it is possible to mathematically project a pair of rays from the perspective centers of the (real) left and right images O(l) and O(r) through the 3D positions of the stereo projected image points B(l) and B(r). If one now calculates the intersection point of the aforementioned rays, then it is possible to determine the true 3D spatial position, P(t), of the corresponding apparent point, P(a), as viewed in the VR system. The branch of mathematics concerning the use and application of vectors is eminently suitable for this task (see Eqns 2.1-2.3).

When a 3D cursor is used (as opposed to a stereo cursor), in some situations it is necessary to place the 3D cursor underneath a particular polygon's plane on the substrate. In normal graphics rendering with depth testing enabled, the 3D cursor would be clipped out and would disappear as it is underneath the polygon. To solve this problem it is possible to enable multipass rendering techniques that will superimpose the 3D cursor into the scene after all the main graphical elements have been drawn, before the frame buffers are cleared. It is also possible to temporarily disable depth testing so that the 3D cursor remains visible when it is underneath a particular part of the substrate. In the scheme using a true 3D cursor, rays can be formed with respect to the left and right view-frame's perspective centers to calculate the 3D positions of the stereo projected points on the surface of the substrate.

The above-mentioned techniques can be used to extract accurate spatial measurements from the apparent surface of a CSTM, or to three-dimensionally plot and insert new points in the substrate's mesh. The surface of the mesh can be re-triangulated to incorporate the new points by redefining the polygonal surface. A new set of left and right texture coordinates can be computed to be assigned to the new vertex. This therefore means that a newly inserted point now functions as zero parallax point and it occurs at a location that is highly congruent with respect to its corresponding point on the original object's surface.

These newly plotted points can also be used as the insertion point of various 3D arrows that point to various surface features of interest on the CSTM. Groupings of newly plotted true points from apparent points can be used as vectorially connected (e.g. color coded) lines in 3D space to annotate various regions of the CSTM. Additional procedures to further manipulate and annotate the CSTM may be carried out (e.g., annotating a CSTM of an archeological site or museum object with notes, references, measurements, etc.).

Analog CSTMs

It is possible to create a CSTM that is composed of a physically built substrate, and to have the stereo imagery mapped, projected, or printed onto the surface of the substrate. Providing there is a method for enabling separate left and right views of the projected stereo imagery (e.g., circular or linear polarization, or anaglyphic techniques), then the whole system will function as a CSTM. One possible hard copy output of the CSTM would be a paper or cardboard model with the stereo imagery printed onto it in the form an anaglyphic stereogram (i.e., one that uses the glasses with separate filters for the left and right eye). One possible method of accomplishing this is described below.

Generally, the three-dimensional CSTM would first be realized in digital form. The polygonal mesh for the substrate has to be flattened in such a way that all the vertices of a particular polygon are not spatially deformed relative to its own plane. It is therefore necessary to determine how to individually rotate various connected polygons along their joining edges so that they flatten out to a single plane. For certain groupings of polygons it is not possible to flatten out all connected and adjoining polygons, without them overlapping in the 2D plane. In such cases it is necessary to determine various break lines in the mesh so that the whole mesh is decomposed into sub meshes, that can be flattened out without having parts of a single subgroup overlapping each other.

Once the flattened subgroups have been defined, it is then possible to texture map the individual subgroups of polygons. The same texture mapping coordinates that were used in the original (non-flattened) CSTM can be used unaltered for the mapping of the flattened sub groups. Other sampling techniques can also be used that do not require pre-sampled sub-images of texture maps, but rather sample from the whole image using image mapping coordinates, since the cardboard CSTM can be created by off-line processes.

In an example of the anaglyph technique using red and green colored lenses, it would be necessary to composite the left and right stereo imagery onto a single flattened substrate, where the left texture map's luminance values are rendered in green, and the right texture map's luminance values are rendered in red. Basically the left and right texture maps are treated as black and white tonal imagery. For practical purposes it easier to render the specially flattened substrates separately as left and right rendered images. Then the two rendered images can be composited into a single image using a standard 2D image processing application. Various tabs can be added to various sub mesh edges to enable the model's edges to be glued or stuck together.

It is generally practical to construct such models using a small number of polygons to effect a 3D representation. Therefore a single 2D image is produced of the rendered flattened texture mapped submeshes. This image can then be printed onto paper or any other appropriate substrate. Various polygon edges can be pre-scored to enable the easy folding of the flat polygons. The various edges are then folded and break line edges are joined to reform the original 3D shape of the CSTM substrate. Various submeshes can be joined together to form a larger model. The model can then be viewed using the anaglyph glasses. The red filter (on the left eye) shows the patterns of imagery that were printed in green as various tones of grey to black, and the green (right) filter shows the red patterns of imagery as tones from grey to black. Therefore an apparent 3D surface is created when the model is viewed, and the vertices of the polygons composing the substrate act as zero parallax points for correspondingly mapped pairs of stereo points. If the model is evenly lit, the polygonal cardboard substrate is effectively invisible, and all that is perceived is the illusion of complex topography created by the residual surface parallax.

Physical anaglyph CSTMs produced from the image-derived process can be used to represent highly complex surfaces, such as architectural subjects, natural history subjects, or anatomical models for medical didactic purposes. Their uses as novelty items, e.g., for sale at museums and historic sites, are obvious, but their potential as educational tools should not be underestimated.

Another embodiment of an analog CSTM would involve creating a simple three-dimensional substrate capable of presenting separate stereo views to the left and right eyes without specialist eyewear. In other words, the substrate itself would comprise an autostereoscopic display (e.g. using a lenticular screen), with the stereo imagery projected, rendered, or printed onto it, as appropriate.

Note Regarding Terminology

In the initial filing for this invention [U.K. Patent Application 0322840.0, "Stereoscopic Imaging" (filing date 30 Sep. 2003) & U.S. Priority Filling U.S. Ser. No. 60/507,727 (filing date Sep. 30, 2003)], the term "Tri-Homologous Point" was used to refer to the point in three-dimensional space where a pair of stereo corresponding rays intersect and the corresponding vertex of the substrate is placed. In the interests of clarity, this terminology has been dropped in favor of referring to a vertex of the substrate as a "zero parallax point" and referring to the point where a pair of rays intersect (also previously referred to as a "Bi-Homologous Point") as the "stereo ray intersection point." For similar reasons, the terms "Coherently Stereo-Textured Entity" and "Photo-Projective Stereo-Textured Collinear Polygonal Substrate" have been dropped in favor of the single term "coherently stereo-textured model."

EQUATIONS

Useful Derivations of the Collinearity Equations

The perspective projection of an object point in 3D space onto a 2D image plane is calculated as follows. A three dimensional point in space $X_a, Y_a, Z_a$, is projected onto the two dimensional image plane of a camera or imaging system (see FIG. 28), where the following definitions apply:

$X_a, Y_a, Z_a$ is an object point in 3D space $X_o, Y_o, Z_o$ is the 3D position of the perspective centre of the imaging system $\omega, \phi, \kappa$ define the rotation and orientation of the imaging system $x_a, y_a$ the coordinates of the projected image point referenced to the image plane $\lambda$ scale, or magnification factor for the projection of a single point These are related by the equation:

$$\begin{bmatrix} X_a \\ Y_a \\ Z_a \end{bmatrix} = \begin{bmatrix} X_o \\ Y_o \\ Z_0 \end{bmatrix} - \lambda \cdot \begin{bmatrix} r_{11} & r_{21} & r_{31} \\ r_{12} & r_{22} & r_{32} \\ r_{13} & r_{23} & r_{33} \end{bmatrix} \begin{bmatrix} x_a \\ y_a \\ -f \end{bmatrix} \quad \text{Eqn 1.1}$$

Where $r_{11}, r_{12}, r_{13}$ etc. denotes the rotation matrix and is defined as:

$$\begin{bmatrix} \cos\phi\cos\kappa & \sin\omega\sin\phi\cos\kappa + \cos\omega\sin\kappa & -\cos\omega\sin\phi\cos\kappa + \sin\omega\sin\kappa \\ -\cos\phi\sin\kappa & -\sin\omega\sin\phi\sin\kappa + \cos\omega\cos\kappa & \cos\omega\sin\phi\sin\kappa + \sin\omega\cos\kappa \\ \sin\phi & -\sin\omega\cos\phi & \cos\omega\cos\phi \end{bmatrix}$$

Note—because the rotation matrix is orthogonal the inverse is equal to the transpose, i.e. $R^{-1} = R^T$ Rearranging the equation 1.1 gives:

$$\begin{bmatrix} x_a \\ y_a \\ -f \end{bmatrix} = \lambda^{-1} \cdot \begin{bmatrix} r_{11} & r_{12} & r_{13} \\ r_{21} & r_{22} & r_{23} \\ r_{31} & r_{32} & r_{33} \end{bmatrix} \begin{bmatrix} (X_o - X_a) \\ (Y_o - Y) \\ (Z_o - Z_a) \end{bmatrix} \quad \text{Eqn 1.2}$$

These equations are solved for $X_a$ and $Y_a$, by eliminating $\lambda$ to give:

$$x_a = \frac{-f \cdot [r_{11}(X_o - X_a) + r_{12}(Y_o - Y_a) + r_{13}(Z_o - Z_a)]}{[r_{31}(X_o - X_a) + r_{32}(Y_o - Y_a) + r_{33}(Z_o - Z_a)]} \quad \text{Eqn 1.3}$$

And:

$$y_a = \frac{-f \cdot [r_{21}(X_o - X_a) + r_{22}(Y_o - Y_a) + r_{23}(Z_o - Z_a)]}{[r_{31}(X_o - X_a) + r_{32}(Y_o - Y_a) + r_{33}(Z_o - Z_a)]} \quad \text{Eqn 1.4}$$

The above equations can be used for the projection of known 3D points into the left and right 2D image planes of a stereogram.

Determination of a point in 3d space formed by the intersection of a pair of stereo rays, formed by the projection of a corresponding pair of left and right stereo image points is carried out as follows. In a stereo system there are two cameras or imaging systems, defined as:

$X_{ol}, Y_{ol}, Z_{ol}$ 3D position of the perspective centre of the left imaging system $\omega_l, \phi_l, \kappa_l$ rotation and orientation of the left imaging system.

$x_{pl}, y_{pl}$ coordinates of the projected image point referenced to the left image plane $X_{or}, Y_{or}, Z_{or}$ 3D position of the perspective centre of the right imaging system $\omega_r, \phi_r, \kappa_r$ rotation and orientation of the right imaging system $x_{pr}, y_{pr}$ coordinates of the projected image point referenced to the right image plane $X_p, Y_p, Z_p$ intermediate terms and final calculated intersection point in 3D space $\lambda$ scale, or magnification factor for the projection of a single point Equations 1.1-1.4 define the relationship between the point $(X_p, Y_p, Z_p)$ in 3D space and the two points on the respective left and right image planes ($x_{pl}, y_{pl}$ and $x_{pr}, y_{pr}$):

$$\begin{bmatrix} X_{ol} - X_p \\ Y_{ol} - Y_p \\ Z_{ol} - Z_p \end{bmatrix} = \lambda \cdot \begin{bmatrix} rl_{11} & rl_{21} & rl_{31} \\ rl_{12} & rl_{22} & rl_{32} \\ rl_{13} & rl_{23} & rl_{33} \end{bmatrix} \begin{bmatrix} x_{pl} \\ y_{pl} \\ -f \end{bmatrix} \quad \text{Eqn 1.5}$$

$$\begin{bmatrix} X_{or} - X_p \\ Y_{or} - Y_p \\ Z_{or} - Z_p \end{bmatrix} = \lambda \cdot \begin{bmatrix} rr_{11} & rr_{21} & rr_{31} \\ rr_{12} & rr_{22} & rr_{32} \\ rr_{13} & rr_{23} & rr_{33} \end{bmatrix} \begin{bmatrix} x_{pr} \\ y_{pr} \\ -f \end{bmatrix} \quad \text{Eqn 1.6}$$

The rotation matrices are denoted rl and rr for left and right respectively. Equation 1.5 and 1.6 can be expanded to give equations 1.7 through 1.12:

$X_p - X_{ol} = \lambda[rl_{11} \cdot x_{pl} = rl_{21} \cdot y_{pl} = rl_{31} \cdot (-f)]$ $Y_p - Y_{ol} = \lambda[rl_{12} \cdot x_{pl} = rl_{22} \cdot y_{pl} = rl_{32} \cdot (-f)]$ $Z_p - Z_{ol} = \lambda[rl_{13} \cdot x_{pl} = rl_{23} \cdot y_{pl} = rl_{33} \cdot (-f)]$ $X_p - X_{or} = \lambda[rl_{11} \cdot x_{pr} = rl_{21} \cdot y_{pr} = rl_{31} \cdot (-f)]$ $Y_p - Y_{or} = \lambda[rl_{12} \cdot x_{pr} = rl_{22} \cdot y_{pr} = rl_{32} \cdot (-f)]$ $Z_p - Z_{or} = \lambda[rl_{13} \cdot x_{pr} = rl_{23} \cdot y_{pr} = rl_{33} \cdot (-f)]$ \quad Eqns. 1.7-1.12

These are simplified using the following substitutions:

$A_l = rl_{11} \cdot x_{pl} = rl_{21} \cdot y_{pl} = rl_{31} \cdot (-f)$ $B_l = rl_{12} \cdot x_{pl} = rl_{22} \cdot y_{pl} = rl_{32} \cdot (-f)$ $C_l = rl_{13} \cdot x_{pl} = rl_{23} \cdot y_{pl} = rl_{33} \cdot (-f)$ $A_l = rl_{11} \cdot x_{pr} = rl_{21} \cdot y_{pr} = rl_{31} \cdot (-f)$ $B_l = rl_{12} \cdot x_{pr} = rl_{22} \cdot y_{pr} = rl_{32} \cdot (-f)$ $C_l = rl_{13} \cdot x_{pr} = rl_{23} \cdot y_{pr} = rl_{33} \cdot (-f)$ \quad Eqns. 1.13-1.18

So that:

$X_p = \lambda \cdot A_l = X_{ol}$ $Y_p = \lambda \cdot B_l = Y_{ol}$ $Z_p = \lambda \cdot C_l = Z_{ol}$ $X_p = \lambda \cdot A_r = X_{or}$ $Y_p = \lambda \cdot B_r = Y_{or}$ $Z_p = \lambda \cdot C_r = Z_{or}$ \quad Eqns. 1.19-1.24

By equating any pair of expressions for the point co-ordinates $(X_p, Y_p, Z_p)$, these equations can be solved for $\lambda$ so that:

$X_p = \lambda \cdot A_l + X_{ol} = \lambda \cdot A_r = X_{or}$ $Y_p = \lambda \cdot B_l = Y_{ol} = \lambda \cdot B_r = X_{or}$ $Z_p = \lambda \cdot C_l = Z_{ol} = \lambda \cdot C_r = Z_{or}$ \quad Eqns. 1.25-1.28

However, an appropriate pair must be selected based on the appropriate general camera orientation with respect to the object point positions in 3D space. One such solution is given as:

$$\lambda = \frac{[B_r \cdot (X_{or} - X_{ol}) - A_r \cdot (Y_{or} - Y_{ol})]}{A_1 \cdot B_r - B_1 \cdot A_r}. \qquad \text{Eqn 1.29}$$

The value of λ can then be substituted in to equations 1.7 and 1.8, or equations 1.9 to 1.12 to calculate the values of $X_p$, $Y_p$, $Z_p$, which is the position of the desired point in 3D space.

The following are some expressions used to correct for radial lens distortion. Radial lens distortion can be approximated to:

$$D = K_1 \cdot R + K_2 \cdot R^3 + K_3 \cdot R^5 + K_4 \cdot R^7 \qquad \text{Eqn 1.30}$$

Where:

$$R = \sqrt{(x_a^2 - y_a^2)} \qquad \text{Eqn 1.31}$$

Corrected positions for $x_a$ and $y_a$ can be used for the various image point related calculations, such as those shown above for improved accuracy.

Calculation of a True Point in 3D Space from an Apparent Surface Point on a Coherently Stereo-Textured Model Two points PoV(left) and Pov(right) are the perspective centres of the left and right viewing frustums used to render the left and right perspective views of the CSTM (see FIG. 27). The stereo cursor introduced into the field of view can be used to calculate the 3d position of the apparent point, or a 3d cursor can be used that is spatially positioned at the apparent point. Once the 3d position of the apparent point has been determined, rays can be constructed from the apparent point P(a) to PoV(left) and PoV(right). A surface plane on the substrate is defined by P1, P2, and P3. Therefore the next step is to calculate the intersection point of the two rays with the surface plane of the substrate to yield the three dimensional positions of the projected image points, B(left) and B(right). It also possible for the projected points to occur on two different polygons, and procedures can be developed that take into account the projection of stereo corresponding points being on two different planes. The general set of equations used, are those that pertain to the intersection point of a line with a plane, both in three dimensional space, as shown below. The true position for the apparent point P(t) is calculated by the intersection point of a second pair of rays. One ray is constructed from the 3d position of the left image's perspective centre O(left) through the left projected image point B(left), the other intersecting ray being constructed from the right image's perspective centre O(right) and the projected right image point B(right). Both rays intersecting at P(t), the true position for the apparent point, being calculated using the equations below for determining the intersection point of two lines (or rays) in three dimensional space. The same principals can be used for procedural stereo-texturing of CSTMs.

The calculation of the intersection point of a line with a plane in 3D space is calculated as follows. A plane is defined as passing through the non collinear points P1, P2 and P3 where:

$$P1 = [x_1 \, y_1 \, z_1]$$

$$P2 = [x_2 \, y_2 \, z_2]$$

$$P3 = [x_3 \, y_3 \, z_3]$$

A line is defined as passing through P4 and P5 where:

$$P4 = [x_4 \, y_4 \, z_4]$$

$$P5 = [x_5 \, y_5 \, z_5]$$

Calculate a unit vector n that is normal to the surface of the plane:

$$n' = (P1 - P2) \times (P2 - P3)$$

$$n' = \frac{n'}{|n'|}$$

The vector n is now defined as n=[a b c] for any point on the surface P(x, y, z):

$$a \cdot x + b \cdot y + c \cdot z - (a \cdot x_1 + b \cdot y_1 + c \cdot z_1) = 0$$

$$\therefore a \cdot (x - x_1) + b \cdot (y - y_1) + c \cdot (z - z_1) = 0 \qquad \text{Eqn 2.1}$$

Any point on the line P4, P5 is defined by:

$$P(t) = P4 + t \cdot (P5 - P4)$$

$$\therefore x(t) = x_4 + t \cdot (x_5 - x_4)$$

$$\therefore y(t) = y_4 + t \cdot (y_5 - y_4)$$

$$\therefore z(t) = z_4 + t \cdot (z_5 - z_4) \qquad \text{Eqn 2.2}$$

These values are substituted into equation 2.1 to give:

$$a \cdot [x_4 + t \cdot (x_5 - x_4) - x_1] + b \cdot [y_4 + t \cdot (y_5 - y_4) - y_1)] + c \cdot z_4 + t \cdot (z_5 - z_4) - z_1] = 0$$

Simplifying and solving for t:

$$t = \frac{a \cdot (x_4 - x_1) + b \cdot (y_4 - y_1) + c \cdot (z_4 - z_1)}{a \cdot (x_4 - x_5) + b \cdot (y_4 - y_5) + c \cdot (z_4 - z_5)}$$

This can be rewritten as:

$$t = \frac{n \cdot (P_4 - P_1)}{n \cdot (P_4 - P_5)}$$

The point of intersection is then calculated by using this value of t in equation 2.2.

The calculation of the intersection point of two lines in 3D space is calculated as follows. Two lines P1-P2 and P3-P4 where the points are defined:

$$P1 = [x_1 \, y_1 \, z_1]$$

$$P2 = [x_2 \, y_2 \, z_2]$$

$$P3 = [x_3 \, y_3 \, z_3]$$

$$P4 = [x_4 \, y_4 \, z_4]$$

The vector cross product will produce a vector orthogonal to both lines:

$$V = (P1 - P2) \times (P3 - P4) \qquad \text{Eqn 2.3}$$

If this is added to P1, then P1, P2 and (V+P1) all form a plane that is orthogonal to P3-P4. The above solution can be used to find the point of intersection. If the point is on both lines then the lines meet, otherwise it is the point on P3-P4 that is nearest to P1-P2, because V is orthogonal to both lines.

REFERENCE NUMERALS IN FIGURES

FIG. 1. Stereo recording of a complex object using left and right cameras:
- 1.01 Left and right cameras
- 1.02 Complex, real world object FIG. 2. Top-down sectional view of a stereo-recorded object, showing the relationship between object points and image points:
- 2.01 Surface of complex object
- 2.02 Perspective center of left camera/image
- 2.03 Perspective center of right camera/image
- 2.04 Base separation between left and right cameras which recorded the original stereogram
- 2.05 Left image plane
- 2.06 Right image plane FIG. 3. Stereo projection and viewing of left and right images:
- 3.01 Left and right stereo projectors
- 3.02 Stereo eye-wear
- 3.03 Flat projection screen FIG. 4. Viewer perception of apparent depth in projected stereogram:
- 4.01 Flat projection screen
- 4.02 Apparent surface of object FIG. 5. Viewer perception of apparent depth in projected stereogram, top-down sectional view:
- 5.01 Plane of screen
- 5.02 Cross section of apparent surface FIG. 6. Surface parallax for various pairs of image points:
- 6.01 Cross section of apparent surface
- 6.02 Screen parallax distance for apparent object point A
- 6.03 Screen parallax distance for apparent object point B
- 6.04 Screen parallax distance for apparent object point C
- 6.05 Plane of flat screen
- 6.06 Perspective center of left image
- 6.07 Perspective center of right image
- 6.08 Distance between projectors/cameras
- 6.09 Left image plane
- 6.10 Right image plane FIG. 7. Screen positioned to eliminate surface parallax for the image points corresponding to an apparent point (B):
- 7.01 Cross section of apparent surface
- 7.02 Plane of flat screen
- 7.03 Screen parallax distance of zero for the apparent object point B
- 7.04 Left image point corresponding to apparent object point B
- 7.05 Right image point corresponding to apparent object point B
- 7.06 Perspective center of left image
- 7.07 Perspective center of right image
- 7.08 Distance between projectors/cameras FIG. 8. Individual screens positioned to eliminate surface parallax for three pairs of image points:
- 8.01 Small screen positioned at apparent point A
- 8.02 Small screen positioned at apparent point B
- 8.03 Small screen positioned at apparent point C
- 8.04 Left image
- 8.05 Right image
- 8.06 Perspective center of left image
- 8.07 Perspective center of right image
- 8.08 Distance between projectors/cameras FIG. 9. Theoretical "perfect" substrate positioned to eliminate surface parallax for all pairs of image points:
- 9.01 "Perfect" substrate
- 9.02 Perspective center of left image
- 9.03 Perspective center of right image
- 9.04 Distance between projectors/cameras
- 9.05 Left image
- 9.06 Right image FIG. 10. Theoretical intersection points for three pairs of stereo rays:
- 10.01 Intersection points of three pairs of stereo rays, shown in relation to the surface of the original stereo-recorded object
- 10.02 Perspective center of left image
- 10.03 Perspective center of right image
- 10.04 Base separation between left and right cameras which recorded the original stereogram
- 10.05 Left image
- 10.06 Right image FIG. 11. Elimination of surface parallax by calculation of zero parallax points, and generation of an apparent residual parallax surface:
- 11.01 Polygonal substrate (invisible to viewer)
- 11.02 Apparent surface of object, as perceived by viewer
- 11.03 Perspective center of left image
- 11.04 Perspective center of right image
- 11.05 Base separation between left and right cameras which recorded the original stereogram
- 11.06 Left image
- 11.07 Right image
- 11.08 Incidental zero parallax points
- 11.09 Apparent surface resulting from (positive and negative) residual surface parallax FIG. 12. Perspective view of the relationship between substrate and stereogram, where selected pairs of stereo ray intersection points have been mapped to the vertices of substrate:
- 12.01 Polygonal substrate
- 12.02 Apparent surface, where each vertex serves as a zero parallax point for the applied stereogram FIG. 13. Viewer perceives only the apparent surface and not the substrate, due to principal of textural dominance.

FIG. 14. Effect of reducing overall depth (macro parallax) in conventional models versus coherently stereo-textured models (CSTMs):
- 14.01 Complex surface explicitly modelled by conventional means
- 14.02 Simplified CSTM substrate created by deliberate under-sampling of stereo-recorded 3D shape
- 14.03 Apparent surface of CSTM
- 14.04 Apparent surface of conventional model when overall depth (macro parallax) is significantly reduced
- 14.05 CSTM substrate (invisible to viewer) when overall depth (macro parallax) is significantly reduced
- 14.06 Apparent surface of CSTM when overall depth (macro parallax) is significantly reduced
- 14.07 Apparent depth for the conventional model when overall depth (macro parallax) is reduced to zero
- 14.08 CSTM substrate (invisible to viewer) when overall depth (macro parallax) is reduced to zero
- 14.09 Apparent surface of CSTM when overall depth (macro parallax) is reduced to zero FIG. 15. Plotting of apparent stereoscopic features using a stereo cursor:
- 15.01 Stereo capable display
- 15.02 Apparent surface of stereo recorded object
- 15.03 Left component of stereo cursor
- 15.04 Right component of stereo cursor
- 15.05 Left component of stereoscopic eye-wear 15.06 Right component of stereoscopic eye-wear
15.07 Left eye
15.08 Right eye
15.09 Apparent position of stereo cursor FIG. 16. Stereo-photographic recording of a fragment of a complex surface:
16.01 Fragment of true 3D complex surface
16.02 Left image
16.03 Right image
16.04 Perspective center of left image/imaging system
16.05 Perspective center of right image/imaging system
16.06 Effective focal length for left and right images FIG. 17. Progression of steps for stereo-plotting left and right flat polygonal meshes:
17.01 Left image frame
17.02 Right image frame
17.03 Left image of recorded object
17.04 Right image of recorded object
17.05 Plotted left image point
17.06 Plotted corresponding right image point
17.07 Left "flat" mesh
17.08 Right "flat" mesh
17.09 Left component of stereo cursor
17.10 Right component of stereo cursor FIG. 18. Relationship between the vertices of the flat meshes with their respective image coordinate values:
18.01 Left image frame
18.02 Right image frame
18.03 Left image point
18.04 Right corresponding image point
18.05 Left image/camera's effective focal length
18.06 Right image/camera's effective focal length
18.07 Perspective center of left image/imaging system
18.08 Perspective center of right image/imaging system
18.09 Left "flat" mesh
18.10 Right "flat" mesh FIG. 19. Calculation and construction of a three-dimensional substrate from the stereo corresponding left and right flat meshes:
19.01 Left image frame
19.02 Right image frame
19.03 Perspective center of left image/imaging system
19.04 Perspective center of right image/imaging system
19.05 Left vertex and image point
19.06 Right corresponding vertex and image point
19.07 Mathematically projected left ray
19.08 Mathematically projected right ray
19.09 Stereo ray intersection point and placement of substrate vertex in 3D space
19.10 Derived mesh of 3D shape FIG. 20. Relationship between stereo plotted image coordinates, the left and right flat meshes, and the left and right sets of texture mapping coordinates:
20.01 Left image
20.02 Right image
20.03 Left texture map
20.04 Right texture map
20.05 Left plotted image point, texture image point, and vertex on the substrate
20.06 Right corresponding plotted image point, texture image point, and vertex on the substrate
20.07 Vertical offset
20.08 Horizontal offset
20.09 Number of pixels per row, or image stride length.

FIG. 21. Projective mapping of a single (monoscopic) texture image map onto a three-dimensional polygonal substrate:
21.01 Texture-mapped 3D substrate
21.02 Left image frame
21.03 Position of left texture map
21.04 Left plotted image point, texture image point, and vertex on the substrate FIG. 22. Projective mapping of a corresponding pair of (stereoscopic) texture image maps onto a three-dimensional polygonal substrate:
22.01 Coherently stereo-textured polygonal substrate
22.02 Projectively mapped left and right images FIG. 23. Relationship between rendered screen space, 3D VR object space, true object space, and 2D texture image space:
23.01 Effective position of a fragment of the recorded object
23.02 3D polygon representing basic surface of recorded object
23.03 2D screen space position of projected/rendered polygon
23.04 Display screen/view-port/image to be rendered
23.05 Pre-determined perspective center of viewing frustum
23.06 Effective position of image frame with respect to the original recorded object
23.07 Perspective center of image frame and camera/recording system
23.08 Position of polygon in 3D space mapped into texture space
23.09 Position and boundaries of texture map
23.10 First vertex of 3D polygon
23.11 Second vertex of 3D polygon
23.12 Third vertex of 3D polygon
23.13 Projected "screen" position of first vertex
23.14 Projected "screen" position of second vertex
23.15 Projected "screen" position of third vertex
23.16 Calculated mapping of texture image point corresponding to the second vertex
23.17 Calculated mapping of texture image point corresponding to the first vertex
23.18 Calculated mapping of texture image point corresponding to the third vertex FIG. 24. Correct sampling of texture data:
24.01 Scan-line for rendering
24.02 Intersection of scan line with "left" edge of view-projected polygon
24.03 Intersection of scan line with "right" edge of view-projected polygon
24.04 Pre-determined perspective center of viewing frustum
24.05 Starting point of three-dimensionally projected scan line segment
24.06 Three-dimensionally projected scan line segment
24.07 End point of three-dimensionally projected scan line segment
24.08 Starting point of projected line segment for sampling in texture space
24.09 End point of projected line segment for sampling in texture space
24.10 Perspective center of image frame and camera/recording system
24.11 Current view-port/rendered image display pixel
24.12 Three dimensionally projected position of current scan line pixel
24.13 Transformed position of current sampling point
24.14 Transformed position of "projected" scan-line segment in texture space
24.15 Calculated mapping coordinate corresponding to the first vertex 24.16 Corner of texture map
24.17 Position of texture frame within larger image
24.18 Projection of current scan-line pixel into 3D coordinate space
24.19 Effective recorded object point in real world 3D space
24.20 3D position of first vertex
24.21 Effective projection from image texture space to real world object space FIG. 25. Progression of various user specified spatial deformations of a CSTM:
25.01 Substrate of CSTM
25.02 Apparent surface of CSTM
25.03 Zero parallax point
25.04 Zero parallax point
25.05 Zero parallax point
25.06 Flattened substrate
25.07 Apparent surface of stereo textured substrate
25.08 Apparent surface of transformed CSTM
25.09 Transformed substrate of CSTM FIG. 26. Spatial relationship between a CSTM with an image-derived substrate and one using an arbitrary substrate:
26.01 CSTM substrate generated by the image-derived method.
26.02 Apparent surface of image-derived CSTM
26.03 Arbitrary substrate of a second CSTM
26.04 Zero parallax point formed by forced convergence
26.05 Apparent residual parallax surface of second CSTM
26.06 Forced mapping or convergence of selected ray from right image
26.07 Perspective center of left image
26.08 Perspective center of right image
26.09 Base separation of left and right cameras/imaging systems
26.10 Left image and image plane.
26.11 Right image and image plane.

FIG. 27. Method of extracting true 3D measurements from the apparent surface of a CSTM:
27.01 Right rendered view image of CSTM
27.02 Left rendered view image of CSTM
27.03 3D substrate of CSTM
27.04 Left image of stereogram of recorded object
27.05 Right image of stereogram of recorded object FIG. 28. Photogrammetric relationships and parameters for stereo recording of a 3D object:
28.01 Surface of three-dimensional object
28.02 Surface point of three-dimensional object
28.03 Recorded image point on left image.
28.04 Frame and orientation of left image
28.05 Frame and orientation of right image
28.06 Recorded image point on right image
28.07 Ray projected from object point, through left perspective center, to left image point
28.08 Ray projected from object point, through right perspective center, to right image point
28.09 Perspective center of left image and imaging system
28.10 Perspective center of right image and imaging system
28.11 Effective or calibrated focal length of left imaging system/camera
28.12 Effective or calibrated focal length of right imaging system/camera FIG. 29. Basic processes in the creation of a coherently stereo-textured model by the image-derived method:
29.01 Recording the stereogram
29.02 Stereo-plotting selected pairs of corresponding image points
29.03 Mathematically projecting stereo rays from each pair of selected corresponding image points, and forming the substrate by placing a vertex at each intersection point
29.04 Sampling of imagery to derive texture maps
29.05 Calculating mapping instructions and coordinates
29.06 Rendering of coherently stereo-textured model, with each pair of selected corresponding image points applied to their corresponding vertex, eliminating parallax for the selected pairs of points and resulting in residual surface parallax for other pairs of nonselected points
29.07 Stereoscopic fusion of displayed residual surface parallaxes

The invention claimed is:

1. A method for forming a stereoscopic representation of a three-dimensional object, comprising the steps of:
   (a) providing a stereogram comprising first and second views of the object;
   (b) selecting from the first and second views a plurality of pairs of corresponding image points relating to three-dimensional features which represent a basic shape of the object, and determining image coordinates for each selected point with reference to an image coordinate system of its respective view;
   (c) determining a location of a natural convergence point or forced convergence point related thereto in three-dimensional space for each selected pair of corresponding image points;
   (d) providing a substrate having a surface defined by a set of coordinates in three-dimensional space, the set of coordinates corresponding to locations of the natural convergence points or forced convergence points, wherein the substrate is a three-dimensional representation of surface features of the basic shape of the object; and
   (e) providing a data structure embodied on at least one of a record medium, a computer memory, or a read-only memory containing a set of instructions for applying the first and second views to the substrate with each pair of corresponding image points applied to their respective coordinates on the surface of the substrate such that surface parallax is substantially, eliminated for each selected pair of corresponding image points, and residual surface parallax occurs for at least some nonselected pairs of corresponding image points.

2. A method according to claim 1, wherein the substrate comprises a plurality of discrete surface elements.

3. A method according to claim 2, wherein the discrete surface elements are polygons.

4. A method according to claim 2, wherein each selected pair of corresponding image points is applied to a corresponding vertex of a discrete surface element.

5. A method according to claim 1, wherein the substrate is created using data derived from the stereogram.

6. A method according to claim 5, wherein the substrate is created by:
   (f) determining a set of points in three-dimensional space at which pairs of mathematically projected rays passing respectively from each pair of corresponding image points, and through their respective perspective centers, intersect in three-dimensional space; and
   (g) using the determined set of points in three-dimensional space to create the surface of the substrate, whereby the determined set of points on the surface correspond to the set of coordinates.

7. A method according to claim 1, wherein the substrate is created using data derived directly from the object.

8. A method according to claim 7, wherein the step of selecting a plurality of pairs of corresponding image points comprises:
(f) determining the position and orientation of the substrate with respect to the perspective center of each of the first and second views; and
(g) selecting the plurality of pairs of corresponding image points by mathematically projecting rays from each of the coordinates defined by the surface of the substrate and through the respective perspective centers of the first and second views.

9. A method according to claim 1, wherein the object is a virtual object (e.g. digital entity), and the stereogram is created by rendering of left and right views of the object.

10. A method according to claim 1, wherein the substrate is a tangible entity existing in physical space.

11. A method according to claim 10, wherein the substrate is configured of a material presenting a stereoscopic representation of the object to a user without using stereoscopic eyewear.

12. A method according to claim 11, wherein the substrate comprises a lenticular screen.

13. A method according to claim 1, wherein the substrate is a virtual substrate (e.g. digital entity).

14. A method according to claim 13, further comprising the step of providing a set of user controls allowing a viewer to adjust the base separation between the rendered left and right views.

15. A method according to claim 1, wherein the stereogram is one of a plurality of stereograms of a given view of the object, each stereogram of the plurality having a different base separation; and further providing a set image coordinates for applying each stereogram of the plurality to the substrate.

16. A method according to claim 15, further comprising the step of providing a set of user controls allowing a viewer to select which of the available stereograms should be applied to the substrate.

17. A method according to claim 1, wherein the stereogram is provided with a first base separation which exceeds a range of parallax normally considered comfortable for human viewing; and further comprising the steps of:
(f) digitally rendering the stereoscopic representation of the object using first and second virtual cameras having a second base separation which produces a range of parallax considered comfortable for human viewing; and
(g) recording and storing the digitally rendered stereoscopic representation of the object as a new stereogram.

18. A method according to claim 1, further comprising displaying the stereoscopic representation using a system allowing selection of at least one additional pair of corresponding image points.

19. A method according to claim 18, further comprising using the additionally selected pair of corresponding image points to create a new set of coordinates on the surface of the substrate to further define the surface of the substrate.

20. A method according to claim 18, further comprising using at least one additionally selected pair of corresponding image points to derive measurements from points on the substrate corresponding to surface features of the object.

21. A method according to claim 1, further comprising displaying the stereoscopic representation using a system allowing at least one of manipulation and annotation of the stereoscopic representation in three dimensions.

22. A method according to claim 1, further comprising the steps of:
(f) providing a first set of image coordinates for applying the first view of the stereogram onto the substrate; and
(g) providing a second set of image coordinates for applying the second view onto the substrate.

23. A method according to claim 22, wherein the stereoscopic representation is rendered such that the first set of coordinates is used to apply the first view to the substrate when the first view is displayed, and the second set of coordinates is used to apply the second view to the substrate when the second view is displayed.

24. A method according to 22, wherein the substrate comprises first and second substrate components, each substrate component representing a basic shape of the object and having a surface, defining a set of coordinates in three-dimensional space, and wherein the step of applying the first and second views of the stereogram to the substrate comprises using the first set of image coordinates to apply the first view to the first substrate component and using the second set of image coordinates to apply the second view to the second substrate component.

25. A method according to claim 1, wherein:
(f) the second view is warped such that each selected image point is made to coincide positionally with its corresponding image point in the first view;
(g) a set of image coordinates is provided for applying the first view of the stereogram onto the substrate; and
(h) the stereoscopic representation is rendered such that both the first view and the warped second view are applied to the substrate using the image coordinates of the first view.

26. A method according to claim 22, further comprising repeating as necessary for real-time rendering using a simulation loop.

27. A method according to claim 1, wherein the provided substrate is of an arbitrary shape.

28. A method according to claim 1, where the substrate is subjected to a spatial transformation to provide a new shape.

29. A method according to claim 10, further comprising physically printing the stereogram onto the substrate.

30. An article of manufacture having stored thereon a computer program or a data structure operable with a computer to allow the computer to form from data in the data structure or the computer program, a stereoscopic representation of an object made in accordance with the method of claim 1.

31. An apparatus for forming a stereoscopic representation of an object, comprising a programmed computer with a program that when executed by the computer provides the following elements:
(a) a stereogram generator for generating a stereogram comprising first and second views of the object;
(b) a selector module for selecting from the first and second views a plurality of pairs of corresponding image points relating to three-dimensional features which represent a basic shape of the object, and for determining image coordinates for each selected point with reference to an image coordinate system of its respective view;
(c) a locator module for determining a location of a natural convergence point or a forced convergence point related thereto in three-dimensional space for each selected pair of corresponding image points;
(d) a substrate generator for generating a substrate having a surface defined by a set of coordinates in three-dimensional space, the set of coordinates corresponding to locations of the natural convergence points or forced convergence points, wherein the substrate is a three-dimensional representation of surface features of the basic shape of the object; and (e) an applicator module for applying the first and second views to the generated substrate with each pair of corresponding image points applied to their respective coordinates on the surface of the substrate such that surface parallax is substantially eliminated for each selected pair of corresponding image points, and residual surface parallax occurs for at least some nonselected pairs of corresponding image points.

32. An apparatus for forming a stereoscopic representation of an object, comprising an item comprising at least one of a record medium, a computer memory, or a read-only memory, the item having the following two elements stored therein:

(a) a stereogram comprising first and second views of the object; and (b) a substrate having a surface defined by a set of coordinates in three-dimensional space, the set of coordinates corresponding to the location of at least one of natural convergence points and forced convergence points for each of a plurality of pre-selected pairs of corresponding image points relating to three-dimensional features which represent a basic shape of the object; and (c) a computer programmed to (i) select from the first and second views a plurality of pairs of corresponding image points relating to three-dimensional features which represent a basic shape of the object, and determining image coordinates for each selected point with reference to an image coordinate system of its respective view;

(ii) determine a location of a natural convergence point or forced convergence point related thereto in three-dimensional space for each selected pair of corresponding image points;

(iii) provide a substrate having a surface defined by a set of coordinates in three-dimensional space, the set of coordinates corresponding to locations of the natural convergence points or forced convergence points, wherein the substrate is a three-dimensional representation of surface features of the basic shape of the object; and (iv) apply the first and second views to the substrate with each pair of corresponding image points applied to their respective coordinates on the surface of the substrate such that surface parallax is substantially eliminated for the pre-selected pairs of corresponding image points and residual surface parallax occurs for at least some other pairs of corresponding image points.

33. A method according to claim 25, further comprising repeating as necessary for real-time rendering using a simulation loop.

34. A method for forming a series of temporally sequenced stereoscopic representations of an object, comprising the steps of:

(a) providing a plurality of stereoscopic representations each formed in accordance with the method of any any of claims 1-28 or claim 33; and (b) arranging the plurality of stereoscopic representations in a sequence for viewing at a specified frame rate.

35. A method according to claim 34, wherein a single substrate is used for forming a plurality of representations.

* * * * *